US011953855B2

(12) United States Patent
Sato et al.

(10) Patent No.: US 11,953,855 B2
(45) Date of Patent: Apr. 9, 2024

(54) IMAGE FORMING APPARATUS INCLUDING LOCKING MEMBER CONFIGURED TO LOCK PHOTOSENSITIVE DRUM RELATIVE TO DRAWER

(71) Applicant: BROTHER KOGYO KABUSHIKI KAISHA, Nagoya (JP)

(72) Inventors: Shougo Sato, Seto (JP); Yasuo Fukamachi, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/682,140

(22) Filed: Feb. 28, 2022

(65) Prior Publication Data

US 2022/0276604 A1 Sep. 1, 2022

(30) Foreign Application Priority Data

Mar. 1, 2021 (JP) ................................ 2021-032136
Mar. 18, 2021 (JP) ................................ 2021-044549

(51) Int. Cl.
*G03G 21/18* (2006.01)

(52) U.S. Cl.
CPC ................................ *G03G 21/1857* (2013.01)

(58) Field of Classification Search
CPC ....... G03G 21/1842; G03G 2221/1654; G03G 21/1853
See application file for complete search history.

(56) References Cited

U.S. PATENT DOCUMENTS

| | | | | |
|---|---|---|---|---|
| 5,452,072 A * | 9/1995 | Ichinokawa | ....... | G03G 15/1635 399/297 |
| 8,934,828 B2 * | 1/2015 | Sato | ..................... | G03G 21/105 399/119 |
| 9,519,262 B1 * | 12/2016 | Tonges | .............. | G03G 21/1871 |
| 2011/0076056 A1 | 3/2011 | Sato | | |
| 2014/0037335 A1 * | 2/2014 | Mushika | ............ | G03G 21/1619 399/119 |
| 2014/0093273 A1 * | 4/2014 | Hayakawa | ............. | G03G 21/18 399/111 |

(Continued)

FOREIGN PATENT DOCUMENTS

| | | | |
|---|---|---|---|
| JP | 2011-075887 A | 4/2011 | |
| JP | 2013054061 A * | 3/2013 | ........... G03G 15/751 |
| JP | 2019-86729 A | 6/2019 | |

*Primary Examiner* — Sevan A Aydin
(74) *Attorney, Agent, or Firm* — Merchant & Gould P.C.

(57) ABSTRACT

An image forming apparatus includes: a housing; a drum cartridge as a first cartridge including a photosensitive drum; a second cartridge accommodating toner; and a drawer movable between an inside position where the drawer in its entirety is positioned inside the housing and an outside position where at least a part of the drawer is positioned outside the housing. The drum cartridge is attachable to and detachable from the drawer. The drawer includes: a side plate configured to receive the photosensitive drum; and a locking member supported by the side plate. The locking member is movable relative to the side plate between a locking position where the locking member locks the photosensitive drum to the side plate and an unlocking position where the locking member unlocks the photosensitive drum from the side plate in an attached state of the drum cartridge to the drawer.

29 Claims, 26 Drawing Sheets

(56) References Cited

U.S. PATENT DOCUMENTS

| | | | | |
|---|---|---|---|---|
| 2019/0146405 | A1 | 5/2019 | Itabashi et al. | |
| 2019/0302681 | A1* | 10/2019 | Wang | G03G 15/0889 |
| 2020/0356046 | A1* | 11/2020 | Yoshimura | G03G 21/1803 |
| 2021/0216037 | A1* | 7/2021 | Dai | G03G 21/1825 |
| 2021/0382432 | A1* | 12/2021 | Yamaguchi | G03G 21/1647 |

* cited by examiner

5Y

FIRST DIRECTION

FIRST DIRECTION

IMAGE FORMING APPARATUS INCLUDING LOCKING MEMBER CONFIGURED TO LOCK PHOTOSENSITIVE DRUM RELATIVE TO DRAWER

CROSS REFERENCE TO RELATED APPLICATION

This application claims priorities from Japanese Patent Application Nos. 2021-032136 filed Mar. 1, 2021, and 2021-044549 filed Mar. 18, 2021. The entire contents of the priority applications are incorporated herein by reference.

BACKGROUND

There has been known an image forming apparatus in which a toner cartridge is attachable to and detachable from a drawer including a photosensitive drum.

Further, also known is another conventional image forming apparatus including a drum cartridge provided with a photosensitive drum, and a developing cartridge provided with a developing roller. The drum cartridge and the developing cartridge are attachable to and detachable from a drawer.

SUMMARY

With such one conventional image forming apparatus, there may be a demand of modification in that a drum unit including the photosensitive drum and a developing roller is attachable to and detachable from the drawer, and the toner cartridge is attachable to and detachable from the drum unit. In such a modification, displacement of the drum unit with respect to the drawer may likely to occur when a user attaches or detaches the toner cartridge to or from the drum unit that is attached to the drawer. Hence, positioning accuracy of the photosensitive drum relative to a housing of the image forming apparatus may be lowered due to displacement of the drum unit with respect to the drawer.

Further, according to the other conventional image forming apparatus, a user attaches or detaches the developing cartridge to or from the drawer in a state where the drum cartridge is attached to the drawer. In such attachment or detachment, the drum cartridge may likely to be displaced relative to the drawer. Hence, positioning accuracy of the photosensitive drum relative to a housing of the image forming apparatus may be lowered due to displacement of the drum cartridge with respect to the drawer.

In view of the foregoing, it is an object of the disclosure to provide an image forming apparatus capable of suppressing degradation of the positioning accuracy of the photosensitive drum relative to the housing.

In order to attain the above and other objects, the disclosure provides an image forming apparatus including: a housing; a drum cartridge as a first cartridge including a photosensitive drum; a second cartridge in which toner is accommodatable; and a drawer. The drawer is movable between an inside position where the drawer in its entirety is positioned inside the housing and an outside position where at least a part of the drawer is positioned outside the housing. The drum cartridge is attachable to and detachable from the drawer. The drawer includes: a side plate configured to receive the photosensitive drum; and a locking member supported by the side plate. The locking member is movable relative to the side plate between a locking position where the locking member locks the photosensitive drum to the side plate and an unlocking position where the locking member unlocks the photosensitive drum from the side plate in an attached state of the drum cartridge to the drawer.

With this structure, in case of exchange of the second cartridge for a new second cartridge in the state where the drum cartridge is attached to the drawer, exchange of the second cartridge for the new second cartridge can be performed relative to the drum cartridge while the photosensitive drum is locked to the drawer by the locking member. Hence, displacement of the photosensitive drum relative to the drawer can be suppressed during exchanging work of the second cartridge. As a result, lowering positioning accuracy of the photosensitive drum relative to the housing due to the exchanging work can be restrained. According to the first embodiment the second cartridge is a toner cartridge configured to accommodate therein toner, and according to the second embodiment the second cartridge is a developing cartridge including a developing roller.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

First Embodiment

An image forming apparatus according to a first embodiment will be described with reference to FIGS. 1 through 16.

1. Image Forming Apparatus 1

Figure 1:
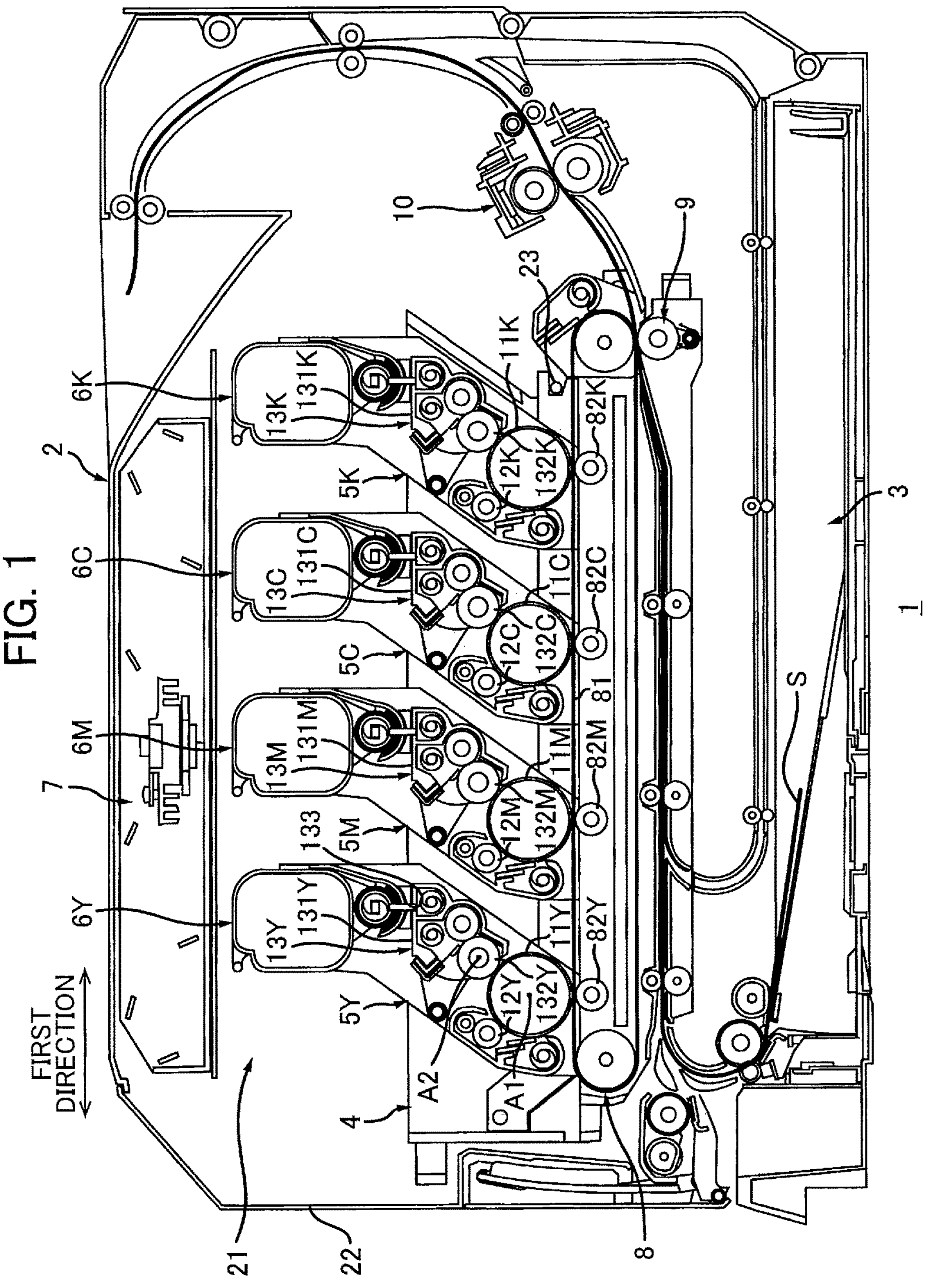
FIG. 1 is a schematic view illustrating a general structure of an image forming apparatus.

An outline of the image forming apparatus will be described with reference to FIGS. 1 through 3. As illustrated in FIG. 1, the image forming apparatus 1 includes a housing 2, a sheet cassette 3, a drawer 4, a plurality of drum cartridges 5Y, 5M, 5C, 5K, a plurality of toner cartridges 6Y, 6M, 6C, 6K, an exposure unit 7, a belt unit 8, a transfer roller 9, and a fixing unit 10. Each of the drum cartridges 5Y, 5M, 5C, 5K is an example of a "first cartridge," and each of the toner cartridges 6Y, 6M, 6C, 6K is an example of a "second cartridge."

1.1 Housing 2

The housing 2 accommodates therein the sheet cassette 3, the drawer 4, the plurality of drum cartridges 5Y, 5M, 5C, 5K, the plurality of toner cartridges 6Y, 6M, 6C, 6K, the exposure unit 7, the belt unit 8, the transfer roller 9, and the fixing unit 10. The housing 2 has an opening 21, and includes a cover 22 and a positioning member 23.

The housing has one end in a first direction provided with a side wall where the opening 21 is formed. The cover 22 is movable between a closed position as illustrated in FIG. 1 and an open position as illustrated in FIG. 2. The cover 22 closes the opening 21 when the cover 22 is at the closed position. The cover 22 opens the opening 21 when the cover 22 is at the open position.

The positioning member 23 extends in the axial direction. The axial direction will be described later. The positioning member 23 has a solid cylindrical shape. The positioning member 23 is made from metal such as stainless steel.

1.2 Sheet Cassette 3

As illustrated in FIG. 1, the sheet cassette 3 is configured to accommodate therein a sheet S. The sheet S stored in the sheet cassette 3 is configured to be conveyed to the transfer roller 9.

1.3 Drawer 4

Figure 2:
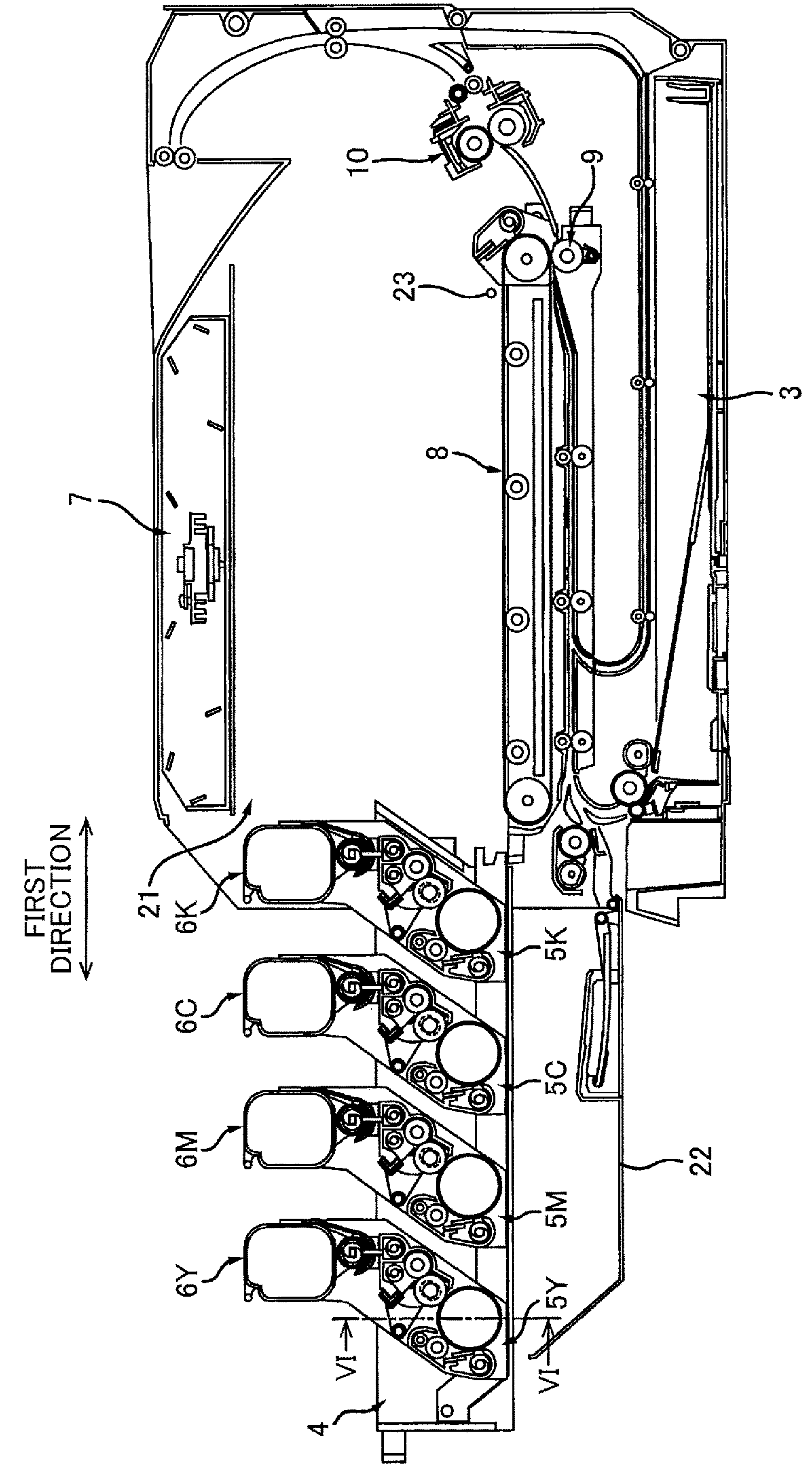
FIG. 2 is a schematic view for description of movement of a drawer illustrated in FIG. 1, and particularly illustrating a state where a cover is at its open position and the drawer is at its outside position.

As illustrated in FIG. 2, the drawer 4 is movable in the first direction through the opening 21 between an inside position illustrated in FIG. 1 and an outside position illustrated in FIG. 2 in a state where the cover 22 is at the open position. As illustrated in FIG. 1, the drawer 4 in its entirety is positioned inside the housing 2 when the drawer 4 is at the inside position. As illustrated in FIG. 2, at least a part of the drawer 4 is positioned outside the housing 2 when the drawer 4 is at the outside position.

1.4 Drum Cartridges 5Y, 5M, 5C, 5K

Each of the drum cartridges 5Y, 5M, 5C, 5K is attachable to and detachable from the drawer 4. Specifically, each of the drum cartridges 5Y, 5M, 5C, 5K is attachable to and detachable from the drawer 4 when the drawer 4 is at the outside position.

Incidentally, description as to each of the drum cartridges 5M, 5C, 5K is the same as the description of the drum cartridge 5Y. Therefore, description of the drum cartridges 5M, 5C, 5K will be omitted.

As illustrated in FIG. 1, the drum cartridge 5Y includes a photosensitive drum 11Y, a charger 12Y, and a developing unit 13Y.

1.4.1 Photosensitive Drum 11Y

The photosensitive drum 11Y extends in the axial direction. The axial direction crosses the first direction in the attached state of the drum cartridge 5Y to the drawer 4. Preferably, the axial direction is perpendicular to the first direction in the attached state of the drum cartridge 5Y to the drawer 4. The photosensitive drum 11Y is rotatable about a drum axis A1. The drum axis A1 extends in the axial direction. As illustrated in FIG. 3, the photosensitive drum 11Y includes a coupling 111Y.

The coupling 111Y is positioned at one end portion in the axial direction of the photosensitive drum 11Y. The coupling 111Y is rotatable along with the rotation of the photosensitive drum 11Y. The coupling 111Y is fitted with a main coupling (not illustrated) provided in the housing 2 in a state where the drawer 4 is positioned at the inside position and the drum cartridge 5Y is attached to the drawer 4. The coupling 111Y is rotated upon receipt of driving force from the main coupling.

1.4.2 Charger 12Y

As illustrated in FIG. 1, the charger 12Y is configured to charge a peripheral surface of the photosensitive drum 11Y. In the present embodiment, a charge roller is provided as the charger 12Y. However, a Scorotron charger is also available as the charger 12Y.

1.4.3 Developing Unit 13Y

The developing unit 13Y is configured to supply toner to the photosensitive drum 11Y. Specifically, the developing unit 13Y includes a developing casing 131Y and a developing roller 132Y.

1.4.3.1 Developing Casing 131Y

The developing casing 131Y is configured to accommodate therein toner supplied from the toner cartridge 6Y. The developing casing 131Y is formed with a developing opening 133. Toner in the toner cartridge 6Y is entered in the developing casing 131Y through the developing opening 133. The developing casing 131Y supports the developing roller 132Y.

1.4.3.2 Developing Roller 132Y

The developing roller 132Y is configured to supply toner in the developing casing 131Y to the photosensitive drum 11Y. The developing roller 132Y is in contact with the photosensitive drum 11Y. However, the developing roller 132Y may be movable away from the photosensitive drum 11Y. The developing roller 132Y extends in the axial direction. The developing roller 132Y is rotatable about a developing axis A2 extending in the axial direction.

1.6 Toner Cartridges 6Y, 6M, 6C, 6K

The toner cartridge 6Y is configured to accommodate therein toner to be supplied to the photosensitive drum 11Y. The toner cartridge 6Y is attachable to and detachable from the drum cartridge 5Y. The toner cartridge 6Y is configured to supply toner to the developing unit 13Y in the attached state of the toner cartridge 6Y to the drum cartridge 5Y.

The toner cartridge 6M is configured to accommodate therein toner to be supplied to the photosensitive drum 11M. The toner cartridge 6M is attachable to and detachable from the drum cartridge 5M. The toner cartridge 6M is configured to supply toner to the developing unit 13M in the attached state of the toner cartridge 6M to the drum cartridge 5M.

The toner cartridge 6C is configured to accommodate therein toner to be supplied to the photosensitive drum 11C. The toner cartridge 6C is attachable to and detachable from the drum cartridge 5C. The toner cartridge 6C is configured to supply toner to the developing unit 13C in the attached state of the toner cartridge 6C to the drum cartridge 5C.

The toner cartridge 6K is configured to accommodate therein toner to be supplied to the photosensitive drum 11K. The toner cartridge 6K is attachable to and detachable from the drum cartridge 5K. The toner cartridge 6K is configured to supply toner to the developing unit 13K in the attached state of the toner cartridge 6K to the drum cartridge 5K.

1.7 Exposure Unit 7

The exposure unit 7 is configured to expose each peripheral surface of each of the photosensitive drums 11Y, 11M, 11C, 11K to lights in a state where the drawer 4 is at the inside position and the drum cartridges 5Y, 5M, 5C, 5K are attached to the drawer 4. A laser scanner unit is provided as the exposure unit 7.

1.8 Belt Unit 8

The belt unit 8 is positioned below the drum cartridges 5Y, 5M, 5C, 5K in the state where the drawer 4 is at the inside position and the drum cartridges 5Y, 5M, 5C, 5K are attached to the drawer 4. The belt unit 8 includes an intermediate transfer belt 81 and a plurality of transfer rollers 82Y, 82M, 82C, 82K.

The intermediate transfer belt 81 is in contact with the photosensitive drums 11Y, 11M, 11C, 11K in the state where the drawer 4 is at the inside position and the drum cartridges 5Y, 5M, 5C, 5K are attached to the drawer 4.

The transfer roller 82Y is configured to transfer toner on the photosensitive drum 11Y to the intermediate transfer belt 81. The transfer roller 82M is configured to transfer toner on the photosensitive drum 11M to the intermediate transfer belt 81. The transfer roller 82C is configured to transfer toner on the photosensitive drum 11C to the intermediate transfer belt 81. The transfer roller 82K is configured to transfer toner on the photosensitive drum 11K to the intermediate transfer belt 81.

1.9 Transfer Roller 9

The transfer roller 9 is configured to transfer toner on the intermediate transfer belt 81 to the sheet S. Specifically, the sheet S conveyed from the sheet cassette 3 toward the transfer roller 9 is moved past a portion between the transfer roller 9 and the intermediate transfer belt 81 and is conveyed to the fixing unit 10. At this time, the transfer roller 9 transfers the toner on the intermediate transfer belt 81 to the sheet S.

1.10 Fixing Unit 10

The fixing unit 10 is configured to heat and press the sheet S on which toner is transferred to fix toner to the sheet S. The sheet S moved past the fixing unit 10 is discharged on an upper surface of the housing 2.

2. Details of Drum Cartridge 5Y

Next, the drum cartridge 5Y will be described in detail with reference to FIGS. 3 through 6. Incidentally, the "first direction" described below as to the drum cartridge 5Y is the defined in the attached state of the drum cartridge 5Y to the drawer 4.

Figure 3:
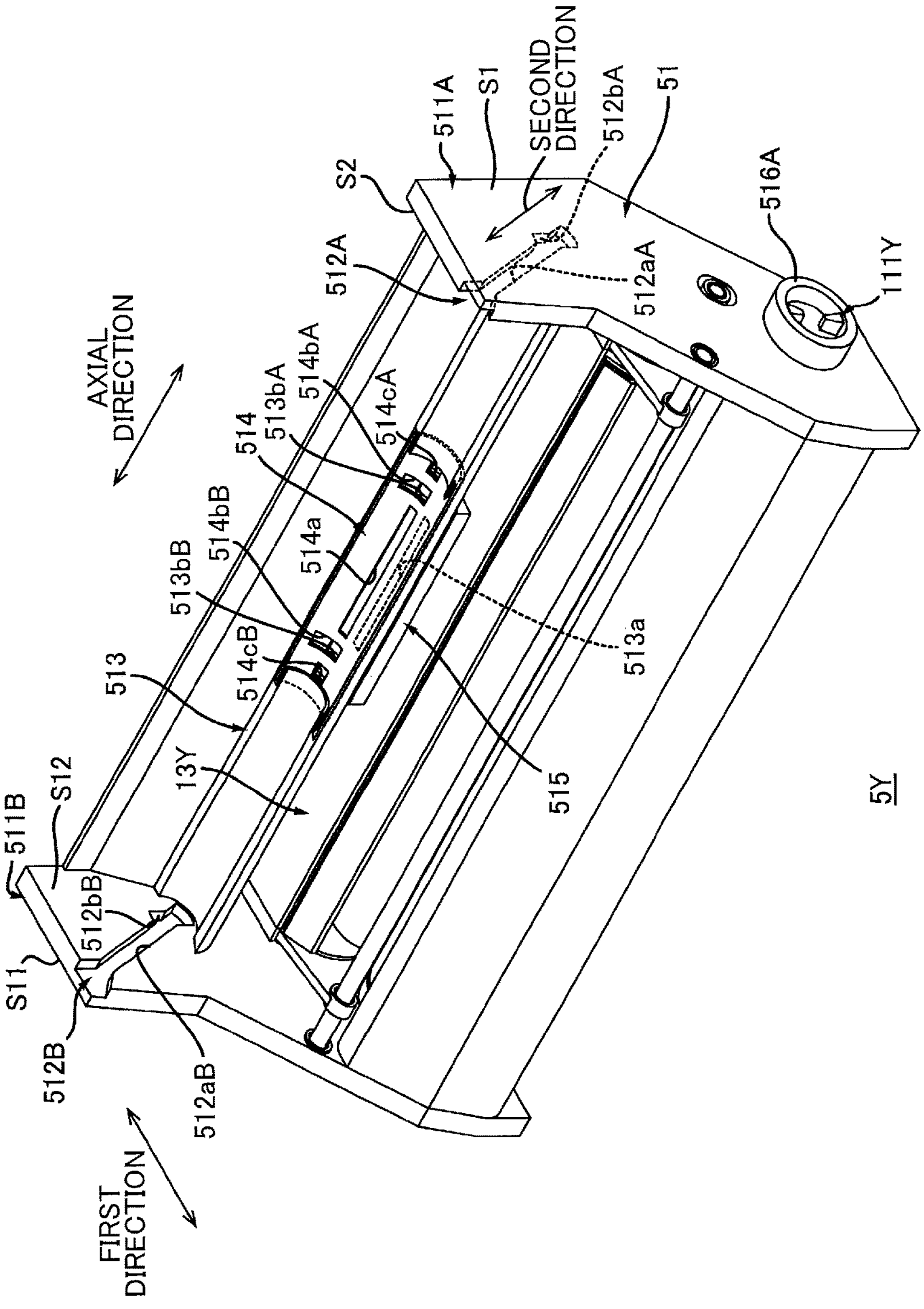
FIG. 3 is a perspective view of a drum cartridge, and particularly illustrating a state where a toner shutter of the drum cartridge is at its closed position.

As illustrated in FIG. 3, the drum cartridge 5Y includes a drum frame 51 in addition to the above-described photosensitive drum 11Y, the charger 12Y, and the developing unit 13Y.

The drum frame 51 supports the photosensitive drum 11Y, the charger 12Y, the developing unit 13Y, and a drum cleaner 52. The drum frame 51 includes drum side plates 511A, 511B, toner guides 512A, 512B, a receiving portion 513, a toner shutter 514, a sealing member 515, and sleeve portions 516A, 516B (see FIG. 6).

2.1 Drum Side Plates 511A, 511B

The drum side plate 511A is positioned at one end portion in the axial direction of the drum cartridge 5Y. The drum side plate 511A has an outer surface 51 and an inner surface S2. The inner surface S2 is positioned between the outer surface 51 and the drum side plate 511B in the axial direction.

The drum side plate 511B is positioned at another end portion in the axial direction of the drum cartridge 5Y. The drum side plate 511B is positioned apart from the drum side plate 511A in the axial direction. The drum side plate 511B has an outer surface S11 and an inner surface S12. The inner surface S12 is positioned between the outer surface S11 and the drum side plate 511A in the axial direction.

2.2 Toner Guides 512A, 512B

The toner guide 512A is positioned on the inner surface S2 of the drum side plate 511A. The toner guide 512A is positioned opposite to the developing unit 13Y with respect to the receiving portion 513. The toner guide 512A is in the form of a groove. The toner guide 512A includes a guide portion 512*a*A and a locking portion 512*b*A.

The guide portion 512*a*A extends in a second direction. The second direction crosses the first direction and the axial direction. Specifically, the second direction crosses the first direction and is perpendicular to the axial direction. As will be described later, the toner cartridge 6Y has protrusions 62A, 62B (see FIG. 12). When the toner cartridge 6Y is attached to the drum cartridge 5Y, the guide portion 512*a*A guides the travel of the protrusion 62A. The guide portion 512*a*A has one end portion and another end portion in the second direction. The other end portion of the guide portion 512*a*A is positioned between the one end portion of the guide portion 512*a*A and the receiving portion 513 in the second direction.

The locking portion 512*b*A is positioned at the other end portion of the guide portion 512*a*A. The locking portion 512*b*A extends in a direction crossing the second direction. The locking portion 512*b*A also extends in a direction perpendicular to the first direction and the axial direction.

The toner guide 512B is positioned on the inner surface S12 of the drum side plate 511B. The toner guide 512B includes a guide portion 512*a*B and a locking portion 512*b*B. The guide portion 512*a*B has a configuration the same as that of the guide portion 512*a*A. The locking portion 512*b*B has a configuration the same as that of the locking portion 512*b*A. When the toner cartridge 6Y is attached to the drum cartridge 5Y, the guide portion 512*a*B guides the travel of the protrusion 62B.

2.3 Receiving Portion 513

As will be described later, the toner cartridge 6Y further includes a second accommodating portion 612 (see FIG. 12). The receiving portion 513 receives the second accommodating portion 612 in a state where the toner cartridge 6Y is supported by the drum cartridge 5Y. The receiving portion 513 extends in the axial direction. The receiving portion 513 has one end portion in the axial direction connected to the drum side plate 511A. The receiving portion 513 has another end portion in the axial direction connected to the drum side plate 511B. The receiving portion 513 has a semi cylindrical shape. The receiving portion 513 has a toner inlet opening 513*a* and a plurality of holes 513*b*A, 513*b*B.

The toner inlet opening 513*a* is positioned at a center portion in the axial direction of the receiving portion 513. The toner inlet opening 513*a* is in communication with the developing opening 133 (see FIG. 5) of the developing casing 131Y.

The hole 513*b*A is positioned between the toner inlet opening 513*a* and the drum side plate 511A in the axial direction. The hole 513*b*A is positioned apart from the toner inlet opening 513*a* in the axial direction.

The hole 513*b*B is positioned between the toner inlet opening 513*a* and the drum side plate 511B in the axial direction. The hole 513*b*B is positioned opposite to the hole 513*b*A with respect to the toner inlet opening 513*a* in the axial direction. The hole 513*a*B is positioned apart from the toner inlet opening 513*a* in the axial direction.

2.4 Toner Shutter 514

Figure 4:
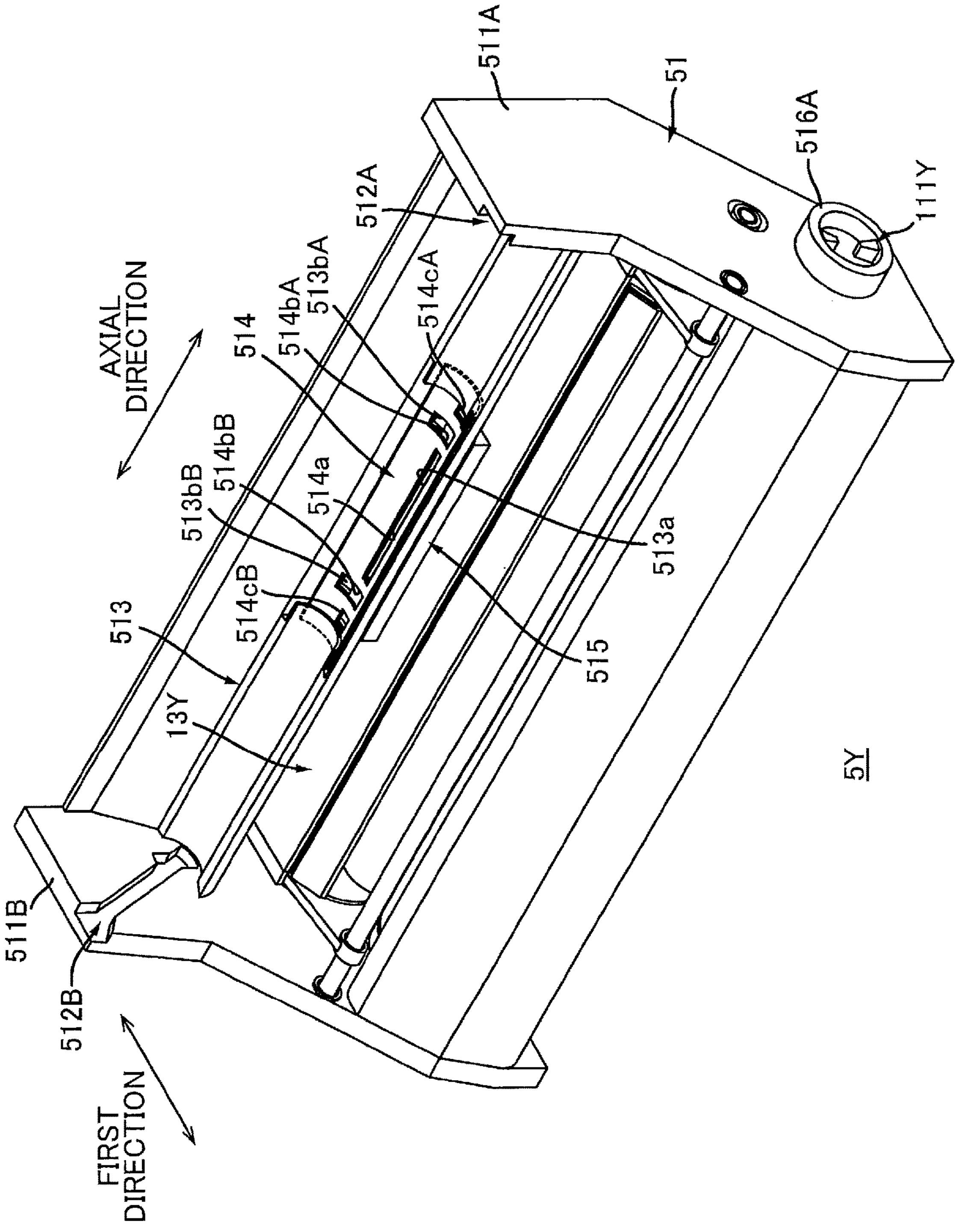
FIG. 4 is a perspective view of the drum cartridge illustrated in FIG. 3, and particularly illustrating a state where the toner shutter is at its open position.

The toner shutter 514 is attached to the receiving portion 513. The toner shutter 514 is movable between a closed position (see FIG. 3) and an open position (see FIG. 4). As illustrated in FIG. 3, the toner shutter 514 closes the toner inlet opening 513*a* when the toner shutter 514 is at the closed position. As illustrated in FIG. 4, the toner shutter 514 opens the toner inlet opening 513*a* when the toner shutter 514 is at the open position. The toner shutter 514 has a toner shutter opening 514*a*, a plurality of through-holes 514*b*A, 514*b*B, and a plurality of through-holes 514*c*A, 514*c*B.

The toner shutter opening 514*a* extends in the axial direction. At least a part of the toner shutter opening 514*a* is in communication with the toner inlet opening 513*a* in a state where the toner shutter 514 is at the open position. Hence, the toner inlet opening 513*a* is opened in the state of open position of the toner shutter 514. On the other hand, as illustrated in FIG. 3, the toner shutter opening 514*a* is positioned away from the toner inlet opening 513*a* in the state of closed position of the toner shutter 514.

The through-hole 514*b*A is positioned between the toner shutter opening 514*a* and the drum side plate 511A in the axial direction. The through-hole 514*b*A is positioned apart from the toner shutter opening 514*a* in the axial direction. The through-hole 514*b*A extends in the moving direction of the toner shutter 514. As illustrated in FIGS. 3 and 4, the through-hole 514*b*A is in communication with the hole 513*b*A not only in the state where the toner shutter 514 is at the closed position but also in the state where the toner shutter 514 is at the open position.

As illustrated in FIG. 3, the through-hole 514*b*B is positioned between the toner shutter opening 514*a* and the drum side plate 511B in the axial direction. The through-hole 514*b*B is positioned opposite to the through-hole 514*b*A with respect to the toner shutter opening 514*a* in the axial direction. The through-hole 514*b*B is positioned apart from the toner shutter opening 514*a* in the axial direction. The through-hole 514*b*B extends in the moving direction of the toner shutter 514. As illustrated in FIGS. 3 and 4, the through-hole 514*b*B is in communication with the hole 513*b*B not only in the state where the toner shutter 514 is at the closed position but also in the state where the toner shutter 514 is at the open position.

As illustrated in FIG. 3, the through-hole 514*c*A is positioned between the through-hole 514*b*A and the drum side plate 511A in the axial direction. The through-hole 514*c*A is positioned opposite to the toner shutter opening 514*a* with respect to the through-hole 514*b*A in the axial direction.

The through-hole 514*c*B is positioned between the through-hole 514*b*B and the drum side plate 511B in the axial direction. The through-hole 514*c*B is positioned opposite to the toner shutter opening 514*a* with respect to the through-hole 514*b*B in the axial direction.

2.5 Sealing Member 515

Figure 5:
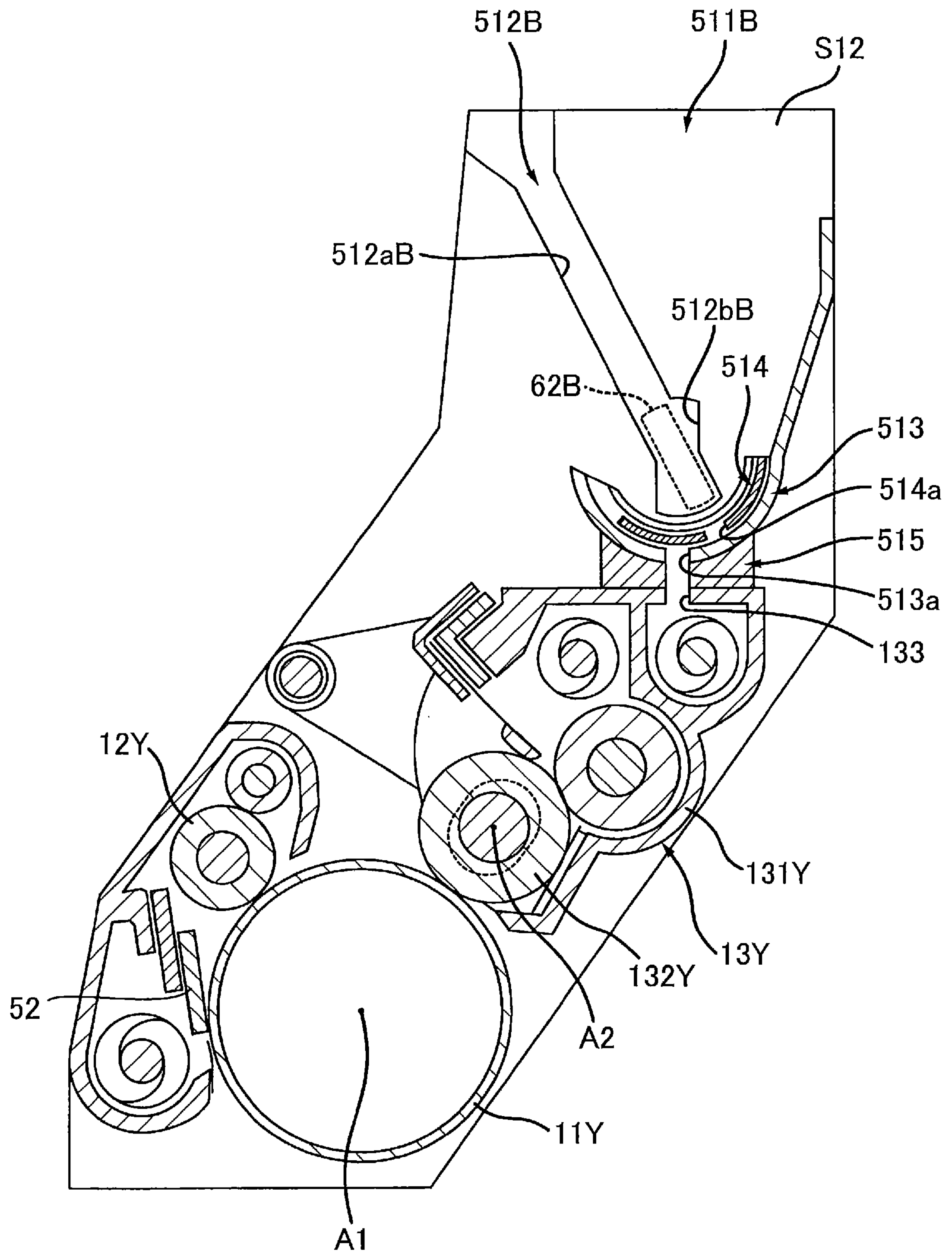
FIG. 5 is a cross-sectional view of the drum cartridge illustrated in FIG. 3 taken along a plane passing through a toner inlet opening.

As illustrated in FIGS. 3 and 5, the sealing member 515 is interposed between the receiving portion 513 and the developing casing 131Y. The sealing member 515 is configured to seal a gap between the receiving portion 513 and the developing casing 131Y. The sealing member 515 encompasses the toner inlet opening 513*a* and het developing opening 133. A sponge is one example of the sealing member 515.

2.6 Sleeve Portions 516A, 516B

As illustrated in FIG. 3, the sleeve portion 516A is positioned opposite to the drum side plate 511B with respect to the drum side plate 511A in the axial direction. The sleeve portion 516A extends from the outer surface 51 of the drum side plate 511A. The sleeve portion 516A is integral with the drum side plate 511A. However, the sleeve portion 516A may be a segment attached to the drum side plate 511A. The sleeve portion 516A extends in the axial direction. The sleeve portion 516A supports one end portion in the axial direction of the photosensitive drum 11Y.

Figure 6:
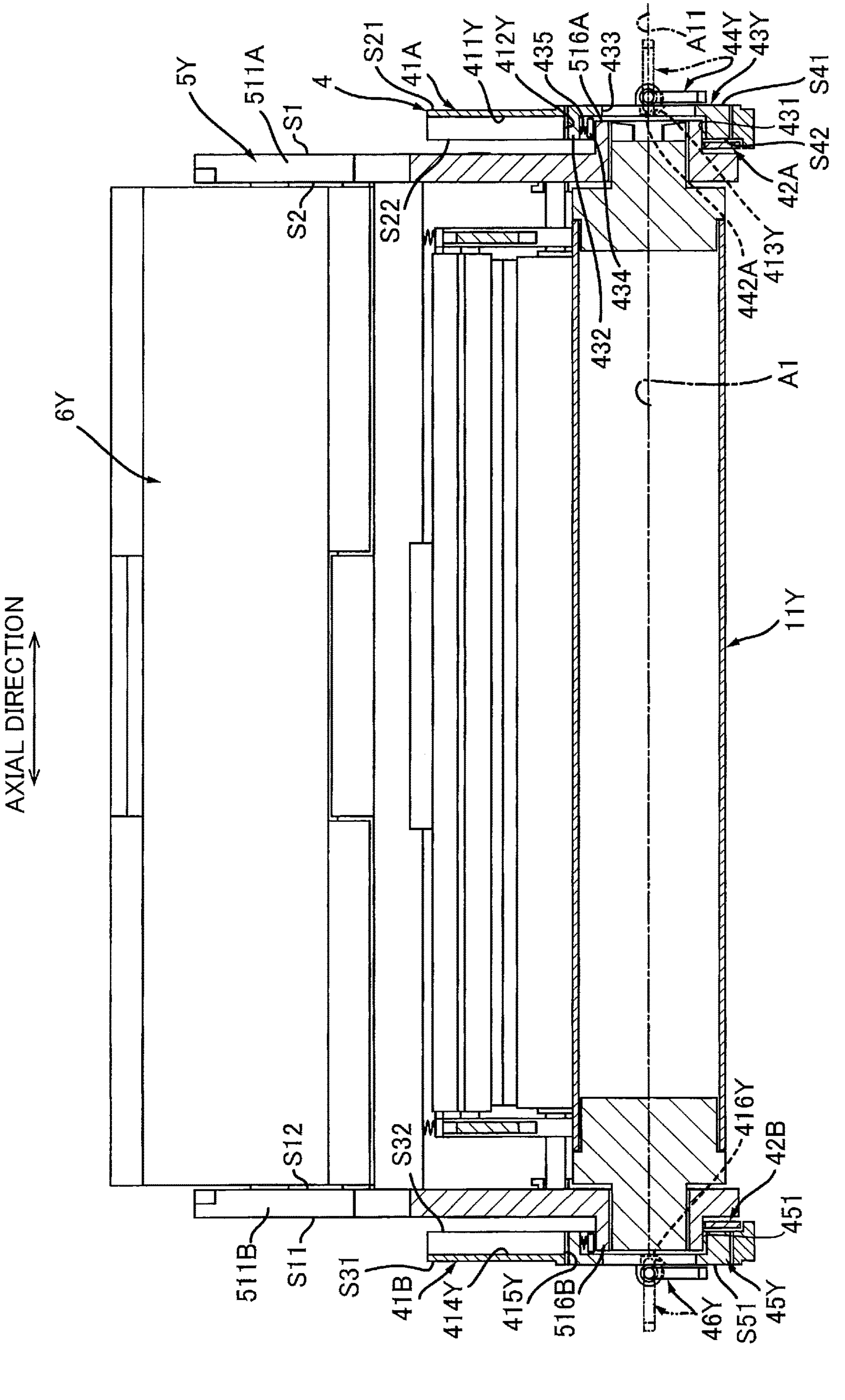
FIG. 6 is a cross-sectional view of the drawer and the drum cartridge taken along the line VI-VI in FIG. 2.

As illustrated in FIG. 6, the sleeve portion 516B is positioned opposite to the drum side plate 511A with respect to the drum side plate 511B in the axial direction. The sleeve portion 516B extends from the outer surface S11 of the drum side plate 511B. The sleeve portion 516B is integral with the drum side plate 511B. However, the sleeve portion 516B may be a segment attached to the drum side plate 511B. The sleeve portion 516B extends in the axial direction. The sleeve portion 516A supports another end portion in the axial direction of the photosensitive drum 11Y.

3. Details of Drawer 4

The drawer 4 will be described in detail with reference to FIGS. 6 through 11.

Incidentally, the "axial direction" described below as to the drawer 4 is defined in the attached state of the drum cartridge 5Y to the drawer 4.

The drawer 4 includes two side plates 41A, 41B (see FIG. 6), two positioning plates 42A, 42B (see FIG. 6), a plurality of locking members 43Y, 43M, 43C, 43K (see FIG. 7), a plurality of levers 44Y, 44M, 44C, 44K (see FIG. 7), a plurality of locking members 45Y (see FIG. 6), 45M, 45C, 45K, and a plurality of levers 46Y (see FIG. 6), 46M, 46C, 46K. Incidentally, the locking members 45M, 45C, 45K and the levers 46M, 46C, 46K are not illustrated.

3.1 Side Plate 41A

As illustrated in FIG. 6, the side plate 41A constitutes one end portion in the axial direction of the drawer 4. The side plate 41A faces the drum side plate 511A in the axial direction in the attached state of the drum cartridge 5Y to the drawer 4. In the attached state of the drum cartridge 5Y to the drawer 4, the side plate 41A is positioned opposite to the drum side plate 511B with respect to the drum side plate 511A in the axial direction.

The side plate 41A has an outer surface S21 and an inner surface S22. In the attached state of the drum cartridge 5Y to the drawer 4, the outer surface S21 is positioned opposite to the drum cartridge 5Y with respect to the inner surface S22 in the axial direction. The inner surface S22 is positioned between the outer surface S21 and the side plate 41B in the axial direction. The inner surface S22 faces the drum cartridge 5Y in the attached state of the drum cartridge 5Y to the drawer 4.

Figure 7:
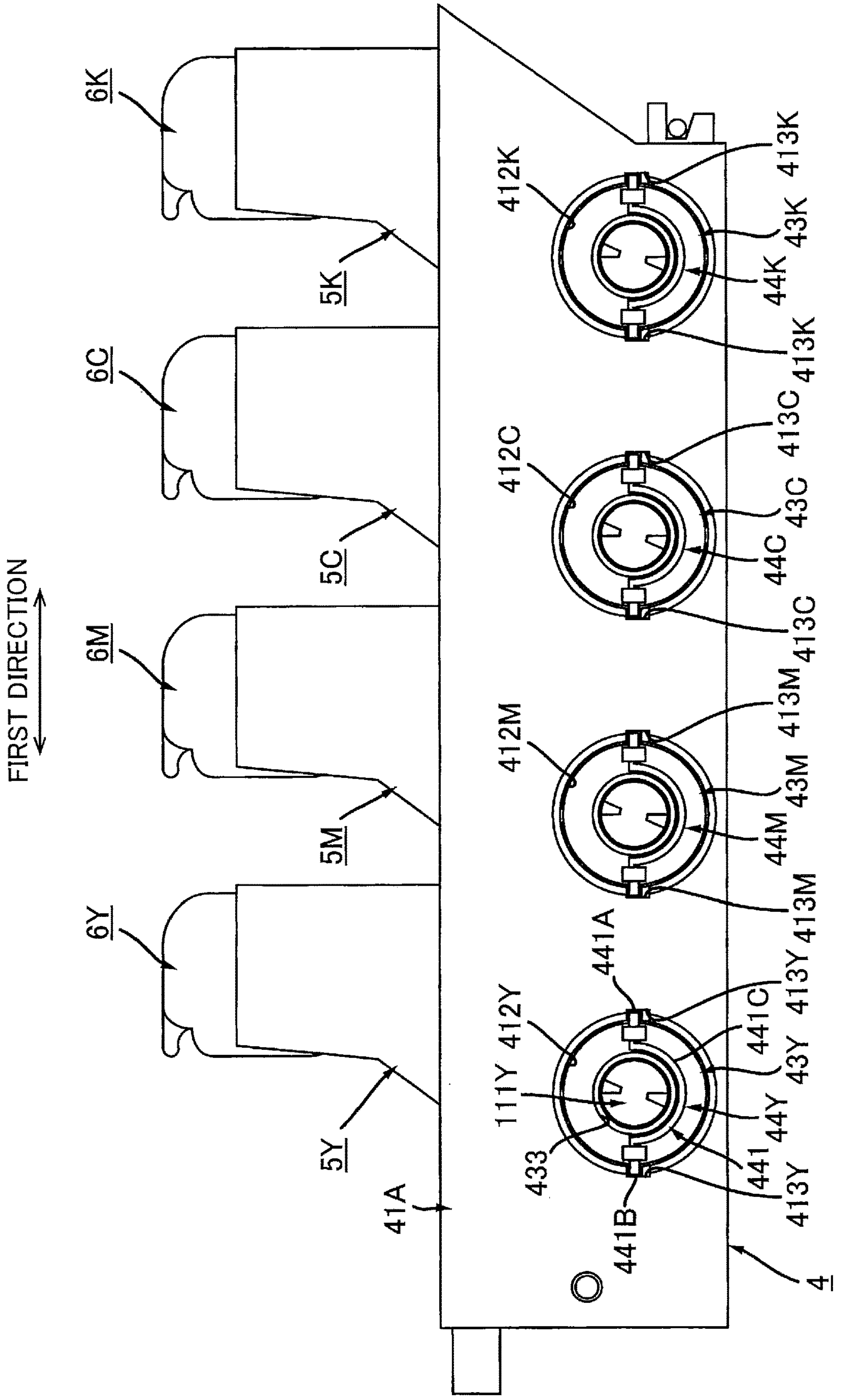
FIG. 7 is a side view of the drawer illustrated in FIG. 6.
Figure 8:
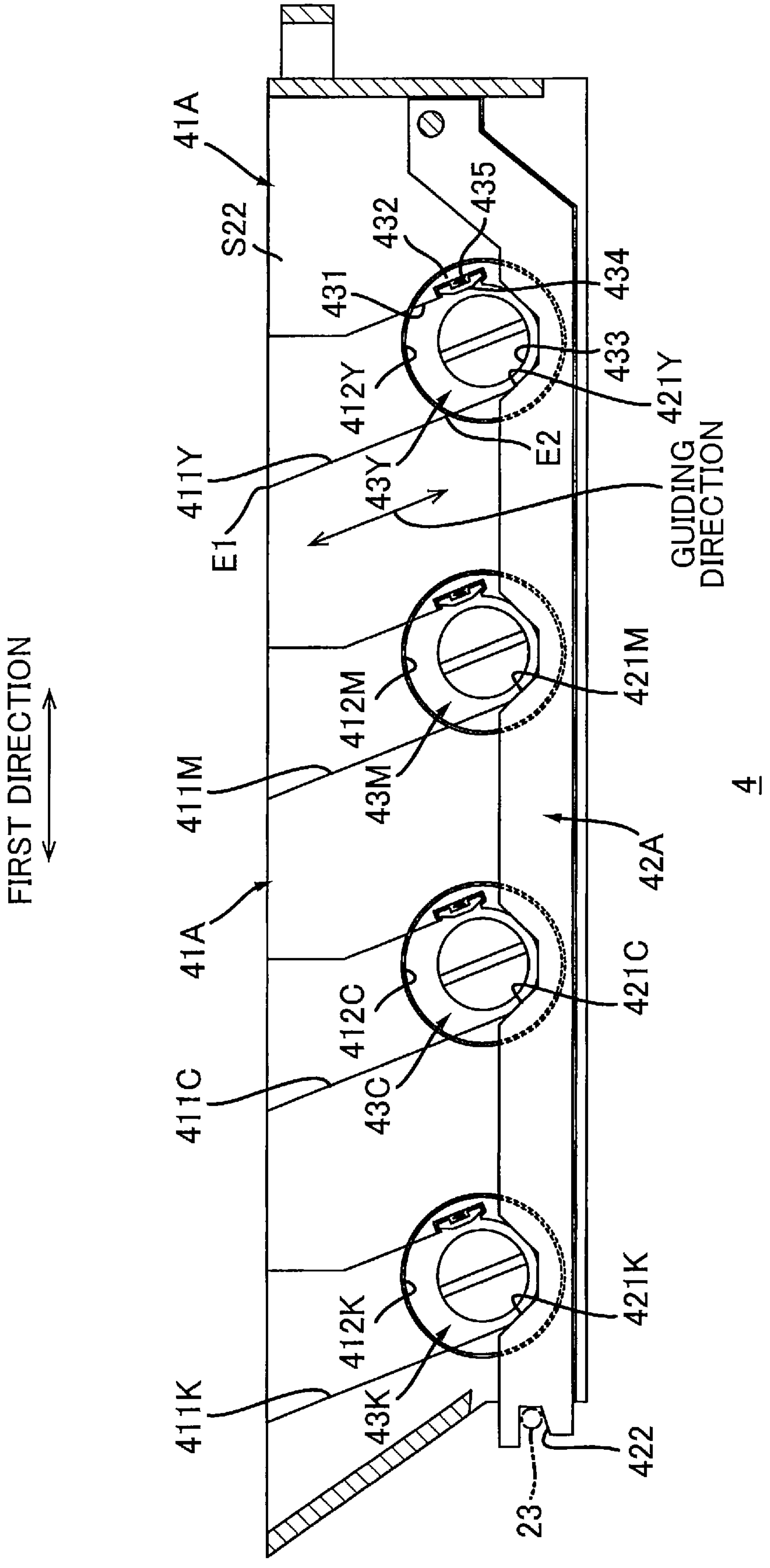
FIG. 8 is a cross-sectional view of the drawer taken along a plane passing through a center in an axial direction of the drawer.

As illustrated in FIG. 8, the side plate 41A has a plurality of drawer guides 411Y, 411M, 411C, 411K, a plurality of through-holes 412Y, 412M, 412C, 412K, a plurality of holes 413Y (see FIG. 7), a plurality of holes 413M (see FIG. 7), a plurality of holes 413C (see FIG. 7), and a plurality of holes 413K (see FIG. 7). In other words, the drawer 4 has the plurality of drawer guides 411Y, 411M, 411C, 411K, the plurality of through-holes 412Y, 412M, 412C, 412K, the plurality of holes 413Y, the plurality of holes 413M, the plurality of holes 413C, and the plurality of holes 413K.

3.1.1 Drawer Guides 411Y, 411M, 411C, 411K

The drawer guides 411Y, 411M, 411C, 411K are arrayed with each other at intervals in the first direction.

The drawer guide 411Y is configured to guide travel of the drum cartridge 5Y relative to the drawer 4. Specifically, the drawer guide 411Y guides travel of the one end portion in the axial direction of the photosensitive drum 11Y in the attached state of the drum cartridge 5Y to the drawer 4. The drawer guide 411Y is positioned in the inner surface S22 of the side plate 41A. The drawer guide 411Y extends in a guiding direction crossing the first direction and the axial direction. Specifically, the guiding direction crosses the first direction and is perpendicular to the axial direction.

The drawer guide 411Y has one end portion E1 and another end portion E2 in the guiding direction. The other end portion E2 is positioned between the one end portion E1 and the locking member 43Y in the guiding direction. The drawer guide 411Y is in the form of a recess. However, the drawer guide 411Y may be a rib. The sleeve portion 516A (see FIG. 6) of the drum cartridge 5Y is fitted with the drawer guide 411Y when the drum cartridge 5Y is attached to the drawer 4.

The drawer guides 411M, 411C, 411K each have a configuration the same as that of the drawer guide 411Y. Therefore, further description as to the drawer guides 411M, 411C, 411K will be omitted.

3.1.2 Through-holes 412Y, 412M, 412C, 412K

The through-hole 412Y is positioned at a deep side of the drawer guide 411Y in the guiding direction. In other words, the through-hole 412Y is positioned opposite to the one end portion E1 of the drawer guide 411Y with respect to the other end portion E2 of the drawer guide 411Y in the guiding direction. The through-hole 412Y has a circular shape. As illustrated in FIG. 6, the through-hole 412Y extends throughout the thickness of the side plate 41A, i.e., from the inner surface S22 to the outer surface S21.

The through-holes 412M, 412C, 412K each have a configuration the same as that of the through-hole 412Y. Therefore, further description as to the through-holes 412M, 412C, 412K will be omitted.

3.1.3 Holes 413Y, 413M, 413C, 413K

As illustrated in FIGS. 6 and 7, the holes 413Y are positioned in the outer surface S21 of the side plate 41A. The holes 413Y are positioned at an edge of the through-hole 412Y. The holes 413Y are recessed from the outer surface S21 toward the inner surface S22 in the axial direction. However, a through-hole is also available as the hole 413Y.

The description as to the holes 413Y is also applied to the holes 413M, 413C, 413K. Therefore, further description as to the holes 413M, 413C, 413K will be omitted.

3.2 Side Plate 41B

As illustrated in FIG. 6, the side plate 41B constitutes another end portion in the axial direction of the drawer 4. The side plate 41B is positioned apart from the side plate 41A. in the axial direction. The side plate 41B faces the drum side plate 511B in the axial direction in the attached state of the drum cartridge 5Y to the drawer 4. In the attached state of the drum cartridge 5Y to the drawer 4, the side plate 41B is positioned opposite to the drum side plate 511A with respect to the drum side plate 511B in the axial direction. The side plate 41B has an outer surface S31 and an inner surface S32. The inner surface S32 is positioned between the outer surface S31 and the side plate 41A in the axial direction.

The side plate 41B has a plurality of drawer guides 414Y, 414M, 414C, 414K, a plurality of through-holes 415Y, 415M, 415C, 415K, a plurality of holes 416Y, a plurality of holes 416M, a plurality of holes 416C, and a plurality of holes 416K. The drawer guides 414M, 414C, 414K, the through-holes 415M, 415C, 415K, and holes 416M, 416C, 416K are not illustrated.

3.2.1 Drawer Guides 414Y, 414M, 414C, 414K

The drawer guides 414Y, 414M, 414C, 414K are arrayed with each other at intervals in the first direction.

The drawer guide 414Y is configured to guide the travel of the drum cartridge 5Y relative to the drawer 4 in cooperation with the drawer guide 411Y. The drawer guide 414Y is positioned in the inner surface S32 of the side plate 41B. The drawer guide 414Y extends in the guiding direction. The drawer guide 414Y is in the form of a recess. However, the drawer guide 414Y may be a rib. The sleeve portion 516B of the drum cartridge 5Y is fitted with the drawer guide 414Y when the drum cartridge 5Y is attached to the drawer 4.

The drawer guides 414M, 414C, 414K each have a configuration the same as that of the drawer guide 414Y. Therefore, further description as to the drawer guides 414M, 414C, 414K will be omitted.

3.2.2 Through-Holes 415Y, 415M, 415C, 415K

The through-hole 415Y is positioned at a deep side of the drawer guide 414Y in the guiding direction. The through-hole 415Y has a circular shape. The through-hole 415Y extends throughout the thickness of the side plate 41B, i.e., from the inner surface S32 to the outer surface S31.

The through-holes 415M, 415C, 415K have configuration the same as that of the through-hole 415Y. Therefore, further description as to the through-holes 415M, 415C, 415K will be omitted.

3.2.3 Holes 416Y, 416M, 416C, 416K

As illustrated in FIG. 6, the holes 416Y are positioned in the outer surface S31 of the side plate 41B. The holes 416Y are positioned at an edge of the through-hole 415Y in the same manner of the holes 413Y relative to the through hole 412Y. The holes 416Y are recessed from the outer surface S31 toward the inner surface S32 in the axial direction. However, a through-hole is also available as the hole 416Y.

The description as to the holes 416Y is also applicable to the holes 416M, 416C, 416K. Therefore, further description as to the holes 416M, 416C, 416K will be omitted.

3.3 Positioning Plates 42A, 42B

As illustrated in FIG. 5, the positioning plate 42A is positioned at the one end portion in the axial direction of the drawer 4. The positioning plate 42A is positioned inward of the inner surface S22 of the side plate 41A in the axial direction. In other words, the positioning plate 42A is positioned between the side plate 41A and the side plate 41B in the axial direction. As illustrated in FIG. 8, the positioning plate 42A extends in the first direction, and is made from metal such as stainless steel and iron.

As illustrated in FIG. 6, in the attached state of the drum cartridges 5Y, 5M, 5C, 5K to the drawer 4, the positioning plate 42A is in contact with each one end portion of each of the photosensitive drums 11Y, 11M, 11C, 11K to fix positions of the photosensitive drums 11Y, 11M, 11C, 11K. Specifically, as illustrated in FIG. 8, the positioning plate 42A has a plurality of recessed portions 421Y, 421M, 421C, 421K and a counterpart positioning portion 422.

The positioning plate 42B is positioned at the other end portion in the axial direction of the drawer 4. The positioning plate 42B is positioned inward of the inner surface S32 of the side plate 41B in the axial direction. In other words, the positioning plate 42B is positioned between the side plate 41A and the side plate 41B in the axial direction. In the state where the drum cartridges 5Y, 5M, 5C, 5K are attached to the drawer 4, the positioning plate 42B is in contact with each other end portion of each of the photosensitive drums 11Y, 11M, 11C, 11K to fix positions of the photosensitive drums 11Y, 11M, 11C, 11K. The positioning plate 42B extends in the first direction.

3.3.1 Recessed Portions 421Y, 421M, 421C, 421K

The one end portion of the photosensitive drum 11Y is fitted with the recessed portion 421Y in the attached state of the drum cartridge 5Y to the drawer 4. The recessed portion 421Y is overlapped with the locking member 43Y in the axial direction. Specifically, in a state where the locking member 43Y is positioned at its locking position, the recessed portion 421Y is overlapped with a lock guide 431 (see FIG. 10) of the locking member 43Y in the axial direction. Details of the locking position and the lock guide 431 will be described later.

The recessed portions 421Y, 421M, 421C, 421K are arrayed with each other in the first direction at intervals. Description as to the recessed portion 421Y is applicable to the recessed portions 421M, 421C, 421K. Therefore, further description as to the recessed portions 421M, 421C, 421K will be omitted.

3.3.2 Counterpart Positioning Portion 422

The counterpart positioning portion 422 is subjected to positioning by the positioning member 23 provided in the housing 2 when the drawer 4 is at its inside position. In other words, the positioning member 23 of the housing 2 fixes a position of the positioning plate 42A relative to the housing 2 when the drawer 4 is at the inside position.

The counterpart positioning portion 422 is positioned at one end portion in the first direction of the positioning plate 42A. The counterpart positioning portion 422 contacts the positioning member 23 in a state where the drawer 4 is at the inside position. According to the present embodiment, the counterpart positioning portion 422 is in the form of a notch. The positioning member 23 of the housing 2 is fitted with the notch when the drawer 4 is at the inside position.

3.4 Locking Members 43Y, 43M, 43C, 43K

As illustrated in FIG. 7, the locking member 43Y is positioned in the through-hole 412Y of the side plate 41A. The locking member 43Y has a disc-like shape. The locking member 43Y is movable between a locking position (see FIG. 9) and an unlocking position (see FIG. 10) in the attached state of the drum cartridge 5Y to the drawer 4. Specifically, the locking member 43Y is rotatable about a first axis A11 (see FIG. 6) between the locking position and the unlocking position. The first axis A11 extends in the axial direction. According to the present embodiment, the first axis A11 is coincident with the drum axis A1 (see FIG. 6). That is, the locking member 43Y is rotatable about the drum axis A1 between the locking position and the unlocking position. Incidentally, the first axis A11 may be offset from the drum axis A1.

Figure 9:
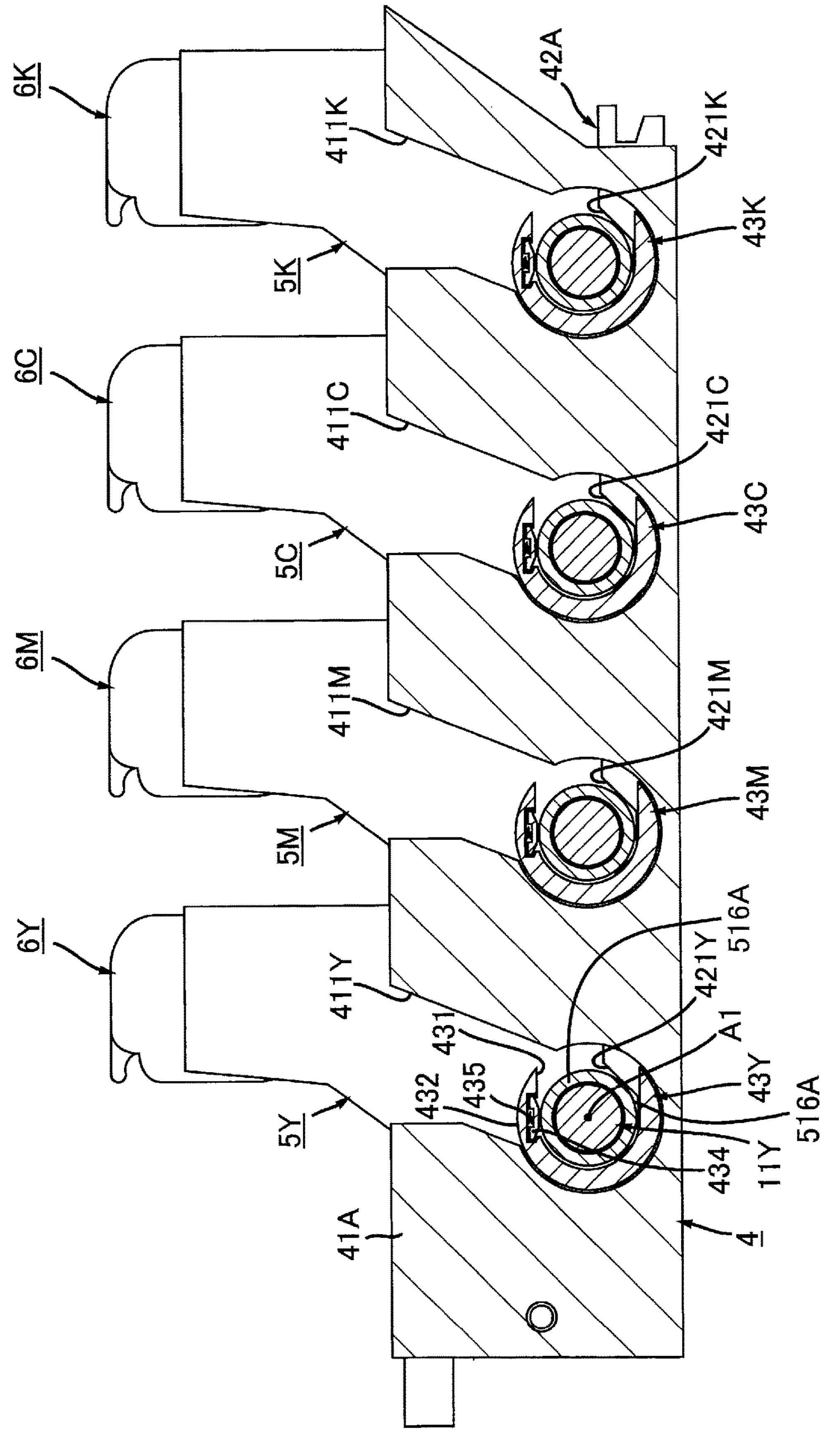
FIG. 9 is a cross-sectional view of the drawer illustrated in FIG. 6 taken along a plane passing through a drawer guide and a lock guide.

As illustrated in FIG. 9, the locking member 43Y locks the photosensitive drum 11Y to the drawer 4 in a case where the locking member 43Y is positioned at the locking position in the attached state of the drum cartridge 5Y to the drawer 4. The expression "the locking member 43Y locks the photosensitive drum 11Y to the drawer 4" implies that the locking member 43Y permits the photosensitive drum 11Y to be immovable in the direction of separating the photosensitive drum 11Y from the drawer 4.

Figure 10:
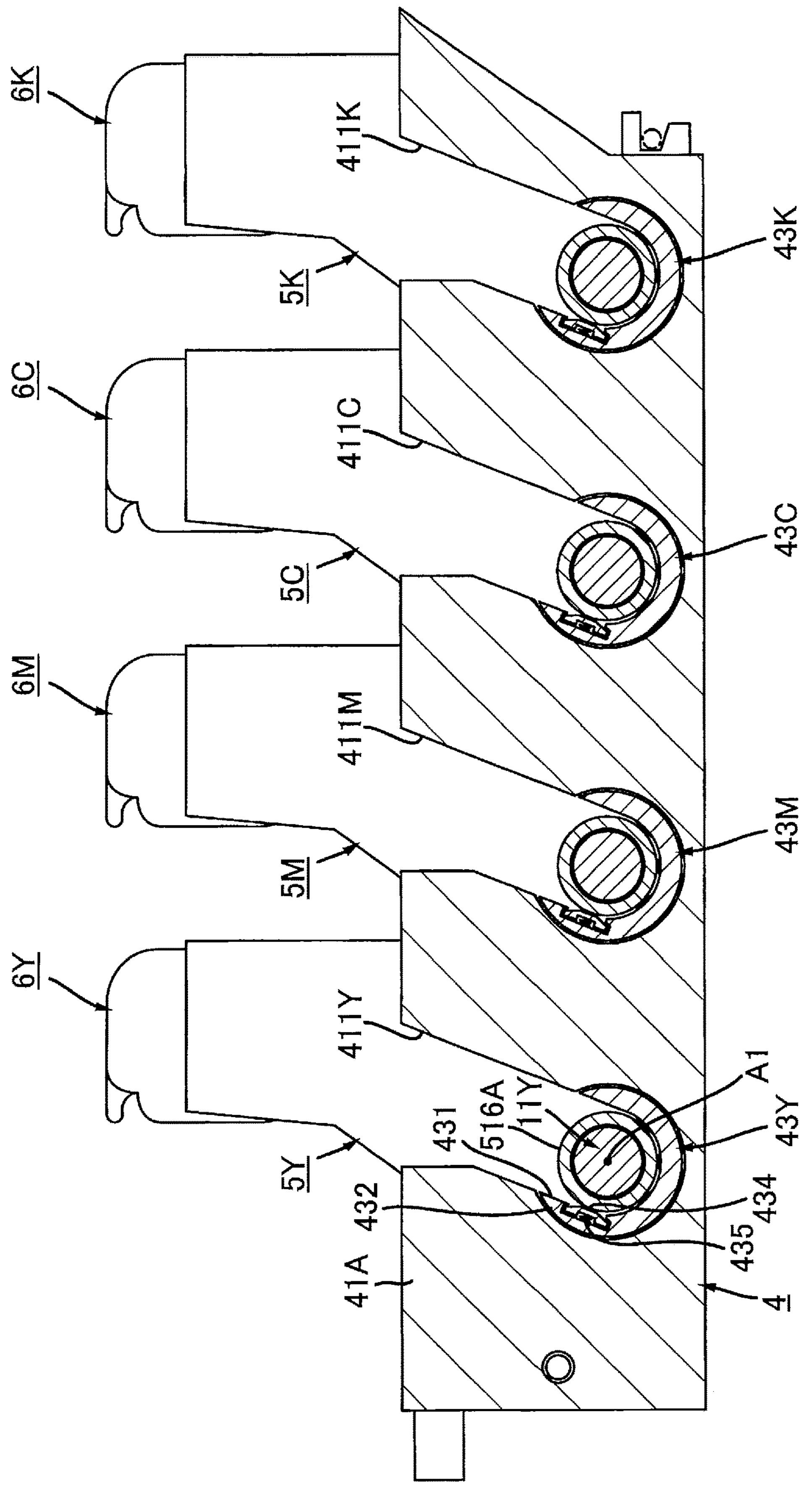
FIG. 10 is a cross-sectional view of the drawer and particularly illustrating a state where a lock member is at its unlock position.

As illustrated in FIG. 10, the photosensitive drum 11Y is released from the drawer 4 in a case where the locking member 43Y is positioned at the unlocking position in the attached state of the drum cartridge 5Y to the drawer 4.

As illustrated in FIG. 6, the locking member 43Y has an outer surface S41 and an inner surface S42. The inner surface S42 is positioned between the outer surface S41 and the side plate 41B of the drawer 4. The inner surface S42 faces the outer surface S1 of the drum side plate 511A in the attached state of the drum cartridge 5Y to the drawer 4. As illustrated in FIG. 8, the locking member 43Y has a through-hole 433, and includes the lock guide 431, a locking portion 432, a pressure member 434, and a spring 435.

Incidentally, the description as to the locking member 43Y is applicable to the locking members 43M, 43C, 43K. Therefore, further description as to the locking members 43M, 43C, 43K will be omitted.

3.4.1 Lock Guide 431

The lock guide 431 extends in a direction crossing the drum axis A1 corresponding to the locking member 43Y. The sleeve portion 516A (see FIG. 3) of the drum cartridge 5Y is fitted with the lock guide 431 in the attached state of the drum cartridge 5Y to the drawer 4. Hence, the one end portion in the axial direction of the photosensitive drum 11Y (see FIG. 6) is fitted with the lock guide 431 in the attached state of the drum cartridge 5Y to the drawer 4.

As illustrated in FIG. 9, the lock guide 431 extends in a direction crossing the guiding direction in a state where the locking member 43Y is at its locking position. In other words, the lock guide 431 extends in a direction crossing the extending direction of the drawer guide 411Y in the state where the locking member 43Y is at its locking position. The lock guide 431 is disconnected from the drawer guide 411Y in the state where the locking member 43Y is at its locking position.

Hence, the sleeve portion 516A cannot be moved past the lock guide 431 in case of displacement of the drum cartridge 5Y in the guiding direction in a state where the drum cartridge 5Y is attached to the drawer 4 and the locking member 43Y is at its locking position. Accordingly, the drum cartridge 5Y is incapable of being released from the drawer 4 as long as the locking member 43Y is at its locking position in the attached state of the drum cartridge 5Y to the drawer 4.

On the other hand, as illustrated in FIG. 10, the lock guide 431 extends in the guiding direction in a state where the locking member 43Y is at the unlocking position. In other words, the lock guide 431 extends in the extending direction of the drawer guide 411Y in the state where the locking member 43Y is at the unlocking position. The lock guide 431 is connected to the drawer guide 411Y in the state where the locking member 43Y is at the unlocking position.

Hence, the sleeve portion 516A can be released from the lock guide 431 in case of displacement of the drum cartridge 5Y in the guiding direction in a state where the drum cartridge 5Y is attached to the drawer 4 and the locking member 43Y is at its unlocking position. Accordingly, the drum cartridge 5Y is capable of being released from the drawer 4 as long as the locking member 43Y is at its unlocking position in the attached state of the drum cartridge 5Y to the drawer 4.

3.4.2 Locking Portion 432

The locking portion 432 is a wall portion constituting a part of the locking member 43Y. The locking portion 432 has a surface defining the lock guide lock guide 431.

As illustrated in FIG. 9, the locking portion 432 extends in a direction crossing the guiding direction in the state where the locking member 43Y is at its locking position. In other words, the locking portion 432 extends in the direction crossing the extending direction of the drawer guide 411Y in the state where the locking member 43Y is at its locking position. The locking portion 432 is positioned between the one end portion of the photosensitive drum 11Y and the drawer guide 411Y in the state where the drum cartridge 5Y is attached to the drawer 4 and the locking member 43Y is at its locking position. Accordingly, the sleeve portion 516A is incapable of being released from the lock guide 431 in case of displacement of the drum cartridge 5Y in the guiding direction in the state where the drum cartridge 5Y is attached to the drawer 4 and the locking member 43Y is at its locking position. As a result, the locking portion 432 locks the photosensitive drum 11Y to the drawer 4 as long as the locking member 43Y is at its locking position in the attached state of the drum cartridge 5Y to the drawer 4.

On the other hand, as illustrated in FIG. 10, the locking portion 432 extends in the guiding direction in the state where the locking member 43Y is at the unlocking position. In other words, the lock guide 431 extends in the extending direction of the drawer guide 411Y in the state where the locking member 43Y is at the unlocking position. The locking portion 432 is retracted from a position between the one end portion of the photosensitive drum 11Y and the drawer guide 411Y in the state where the drum cartridge 5Y is attached to the drawer 4 and the locking member 43Y is at the unlocking position. Hence, the sleeve portion 516A can be released from the lock guide 431 in case of displacement of the drum cartridge 5Y in the guiding direction in the state where the drum cartridge 5Y is attached to the drawer 4 and the locking member 43Y is at its unlocking position.

3.4.3 Through-Hole 433

As illustrated in FIG. 8, the through-hole 433 is positioned at a center of the locking member 43Y. The through-hole 433 is positioned within the lock guide 431. The through-hole 433 has a circular shape. As illustrated in FIG. 7, the coupling 111Y of the photosensitive drum 11Y is exposed to an outside through the through-hole 433 in the attached state of the drum cartridge 5Y to the drawer 4. The through-hole 433 permits the main coupling (not illustrated) to extend therethrough to fit with the coupling 111Y in the attached state of the drum cartridge 5Y to the drawer 4 and in the state where the drawer 4 is at the inside position.

3.4.4 Pressure Member 434

As illustrated in FIG. 9, the pressure member 434 is attached to the locking portion 432. The pressure member 434 is positioned between the one end portion of the photosensitive drum 11Y and the drawer guide 411Y in the state where the drum cartridge 5Y is attached to the drawer 4 and the locking member 43Y is at the locking position. The pressure member 434 is positioned opposite to the positioning plate 42A with respect to the one end portion of the photosensitive drum 11Y in the state where the drum cartridge 5Y is attached to the drawer 4 and the locking member 43Y is at the locking position.

The pressure member 434 presses against the sleeve portion 516A of the drum cartridge 5Y toward the positioning plate 42A in the state where the drum cartridge 5Y is attached to the drawer 4 and the locking member 43Y is at the locking position. In other words, the pressure member 434 presses against the one end portion of the photosensitive drum 11Y toward the positioning plate 42A in the state where the drum cartridge 5Y is attached to the drawer 4 and the locking member 43Y is at the locking position. Specifically, the pressure member 434 presses against the one end portion of the photosensitive drum 11Y toward the recessed portion 421Y of the positioning plate 42A in the state where the drum cartridge 5Y is attached to the drawer 4 and the locking member 43Y is at the locking position.

On the other hand, as illustrated in FIG. 10, the pressure member 434 is retracted from a position between the one end portion of the photosensitive drum 11Y and the drawer guide 411Y in the state where the drum cartridge 5Y is attached to the drawer 4 and the locking member 43Y is at the unlocking position. Hence, the pressure applied from the pressure member 434 to the one end portion of the photosensitive drum 11Y is released in the state where the drum cartridge 5Y is attached to the drawer 4 and the locking member 43Y is at the unlocking position.

3.4.5 Spring 435

As illustrated in FIG. 9, the spring 435 urges the pressure member 434. Specifically, the spring 435 urges the pressure member 434 toward the one end portion of the photosensitive drum 11Y in the attached state of the drum cartridge 5Y to the drawer 4.

The spring 435 urges the pressure member 434 toward the positioning plate 42A in the state where the drum cartridge 5Y is attached to the drawer 4 and the locking member 43Y is at the locking position.

3.5 Levers 44Y, 44M, 44C, 44K

In the following description, only the lever 44Y will be described, since the description as to the lever 44Y is applicable to the levers 44M, 44C, 44K.

As illustrated in FIGS. 6 and 7, the lever 44Y is attached to the outer surface S41 of the locking member 43Y. Hence, the lever 44Y is movable along with the locking member 43Y. The lever 44Y is positioned outward of the outer surface S21 of the side plate 41A in the axial direction. In other words, the lever 44Y is positioned opposite to the side plate 41B with respect to the side plate 41A. The lever 44Y is operated by a user to move the locking member 43Y. Specifically, the lever 44Y is operated by the user to move the locking member 43Y between the locking position (see FIG. 9) and the unlocking position (see FIG. 10).

The lever 44Y has a function to lock the locking member 43Y at the locking position. Specifically, as illustrated in FIG. 6, the lever 44Y is movable between a first position and a second position in a state where the locking member 43Y is positioned at the locking position. The first position and the second position of the lever 44Y are indicated by a solid line and an imaginary line in FIG. 6, respectively.

The lever 44Y is locked to the side plate 41A in the state where the locking member 43Y is at the locking position and the lever 44Y is at the first position. Hence, the lever 44Y locks the locking member 43Y at the locking position. The lever 44Y extends along the outer surface S21 of the side plate 41A when the lever 44Y is at the first position.

On the other hand, the lever 44Y is unlocked from the side plate 41A in the state where the locking member 43Y is at the locking position and the lever 44Y is at the second position. Hence, the lever 44Y unlocks the locking member 43Y at the locking position. The locking member 43Y is movable between the locking position and the unlocking position when the lever 44Y is at the second position. The lever 44Y extends outward in the axial direction from the outer surface S21 of the side plate 41A when the lever 44Y is at the second position.

Incidentally, the lever 44Y is immovable from the second position to the first position in the state where the lever 44Y is at the second position and the locking member 43Y is moved from the locking position. Hence, the lever 44Y abuts against an abutment portion of the housing 2 in a case where the drawer 4 is moved from the outside position (see FIG. 2) to the inside position (see FIG. 1) in a state where the lever 44Y is at the second position. This can restrain the drawer 4 from being positioned at the inside position with the state where the locking member 43Y is not positioned at the locking position. As a result, this prompts the user to lock the locking member 43Y at the locking position. According to the present embodiment, the abutment portion is the opening 21 of the housing 2. That is, the housing 2 includes the abutment portion.

Figure 11:
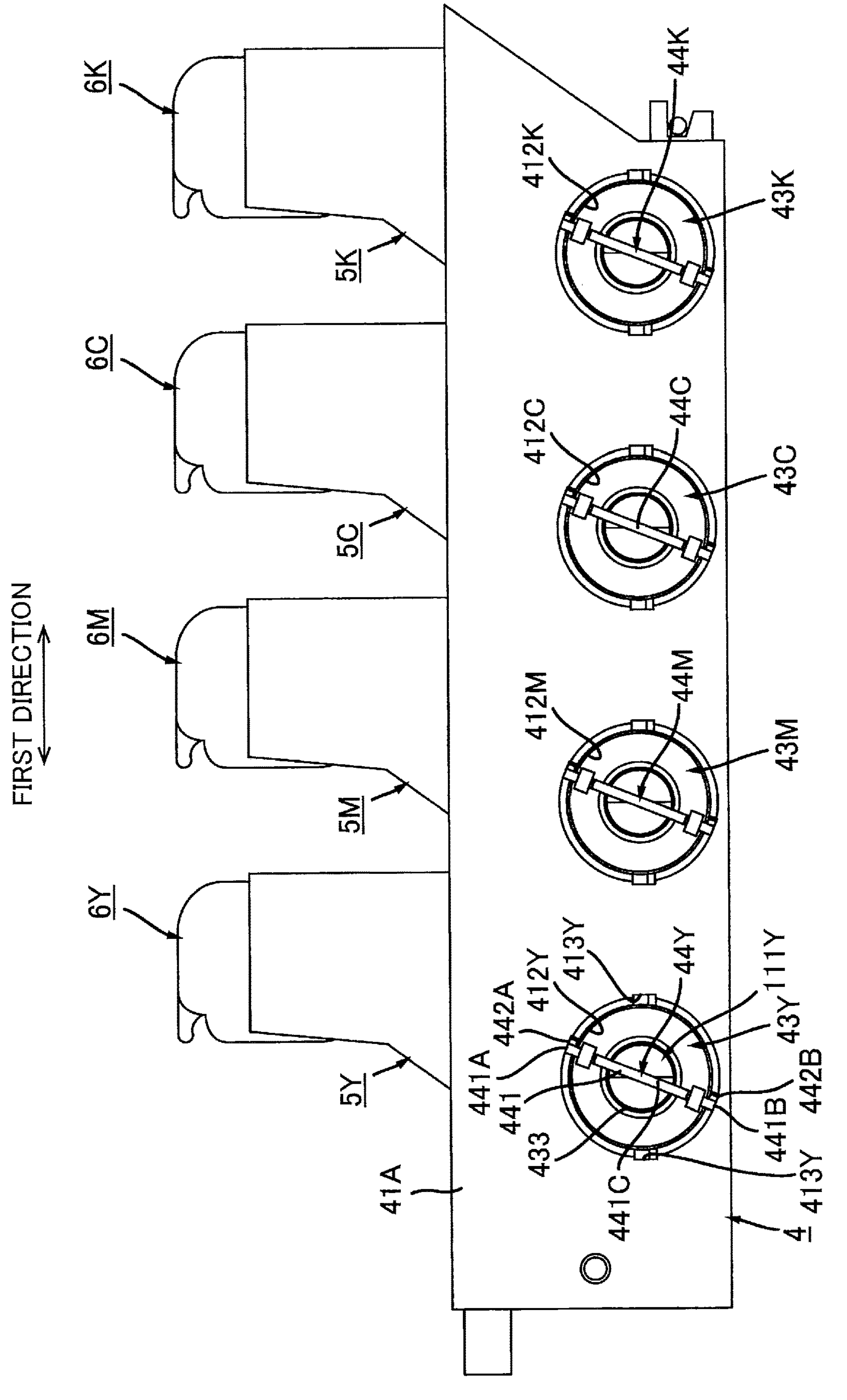
FIG. 11 is a side view of the drawer illustrated in FIG. 7 and particularly illustrating a state where the lock member is at the unlock position.

Further, as illustrated in FIGS. 6 and 11, the lever 44Y covers at least a part of the coupling 111Y in the axial direction in a state where the drum cartridge 5Y is attached to the drawer 4 and the lever 44Y is at the second position. This can restrain the main coupling (not illustrated) from being fitted with the coupling 111Y even in a case where the drawer 4 is positioned at the inside position with a state where the locking member 43Y is not positioned at the locking position. Hence, start of the image forming operation with the unlocking state of the photosensitive drum 11Y to the drawer 4 can be suppressed. The lever 44Y includes a lever body 441 and two protrusions 442A, 442B.

3.5.1 Lever Body 441

The lever body 441 extends in a diametrical direction of the photosensitive drum 11Y in a state where the drum cartridge 5Y is attached to the drawer 4 and the lever 44Y is at the second position. In other words, the lever 44Y extends in the diametrical direction of the photosensitive drum 11Y in the state where the drum cartridge 5Y is attached to the drawer 4 and the lever 44Y is at the second position. The lever body 441 includes a first end portion 441A, a second end portion 441B, and an arcuate portion 441C.

The first end portion 441A and the second end portion 441B are one end portion and another end portion in the extending direction of the lever 44Y, respectively. That is, the lever 44Y includes the first end portion 441A and the second end portion 441B in the extending direction thereof. The second end portion 441B is positioned opposite to the first end portion 441A with respect to the through-hole 433 of the locking member 43Y.

As illustrated in FIG. 7, the arcuate portion 441C is positioned along an edge of the through-hole 433 when the lever 44Y is at the first position. Hence, the lever 44Y is not positioned over the through-hole 433 of the locking member 43Y when the lever 44Y is at the first position.

3.5.2 Protrusions 442A, 442B

As illustrated in FIG. 11, the protrusion 442A protrudes from the first end portion 441A of the lever body 441. The protrusion 442A is integral with the lever body 441. However, a protrusion 442A which is a separate piece may be attached to the first end portion 441A of the lever body 441.

The protrusion 442B protrudes from the second end portion 441B of the lever body 441. The protrusion 442B is integral with the lever body 441. However, a protrusion 442B which is a separate piece may be attached to the second end portion 441B of the lever body 441.

As illustrated in FIG. 6, the protrusion 442A of the lever 44Y is engaged with one of the two holes 413Y of the side plate 41A and the protrusion 442B of the lever 44Y is engaged with remaining one of the two holes 413Y in the state where the locking member 43Y is at the locking position and the lever 44Y is at the first position. Hence, the lever 44Y is locked to the side plate 41A.

The protrusion 442A of the lever 44Y is disengaged from one of the two holes 413Y of the side plate 41A and the protrusion 442B of the lever 44Y is disengaged from remaining one of the two holes 413Y in the state where the locking member 43Y is at the locking position and the lever 44Y is at the second position. Hence, the lever 44Y is unlocked from the side plate 41A.

3.6 Locking Members 45Y, 45M, 45C, 45K

The locking member 45Y is positioned in the through-hole 415Y of the side plate 41B. The description as to the locking member 43Y is applicable to the locking member 45Y. Therefore, further description as to the locking member 45Y will be omitted. Further, the description as to the locking member 43Y is also applicable to the locking members 45M, 45C, 45K. Therefore, further description as to the locking members 45M, 45C, 45K will be omitted.

3.7 Levers 46Y, 46M, 46C, 46K

The lever 46Y is attached to an outer surface S51 of the locking member 45Y. The description as to the lever 44Y is applicable to the lever 46Y. Therefore, further description as to the lever 46Y will be omitted. Further, the description as to the lever 44Y is also applicable to the levers 46M, 46C, 46K. Therefore, further description as to the levers 46M, 46C, 46K will be omitted.

4. Details of Toner Cartridge 6Y

The toner cartridge 6Y will be described in detail with reference to FIGS. 12 through 16. In the following description, only the toner cartridge 6Y will be described, since the description as to the toner cartridge 6Y is applicable to the toner cartridges 6M, 6C, 6K. Further, the “axial direction” described below as to the toner cartridge 6Y is defined in the attached state of the toner cartridge 6Y to the drum cartridge 5Y.

Figure 12:
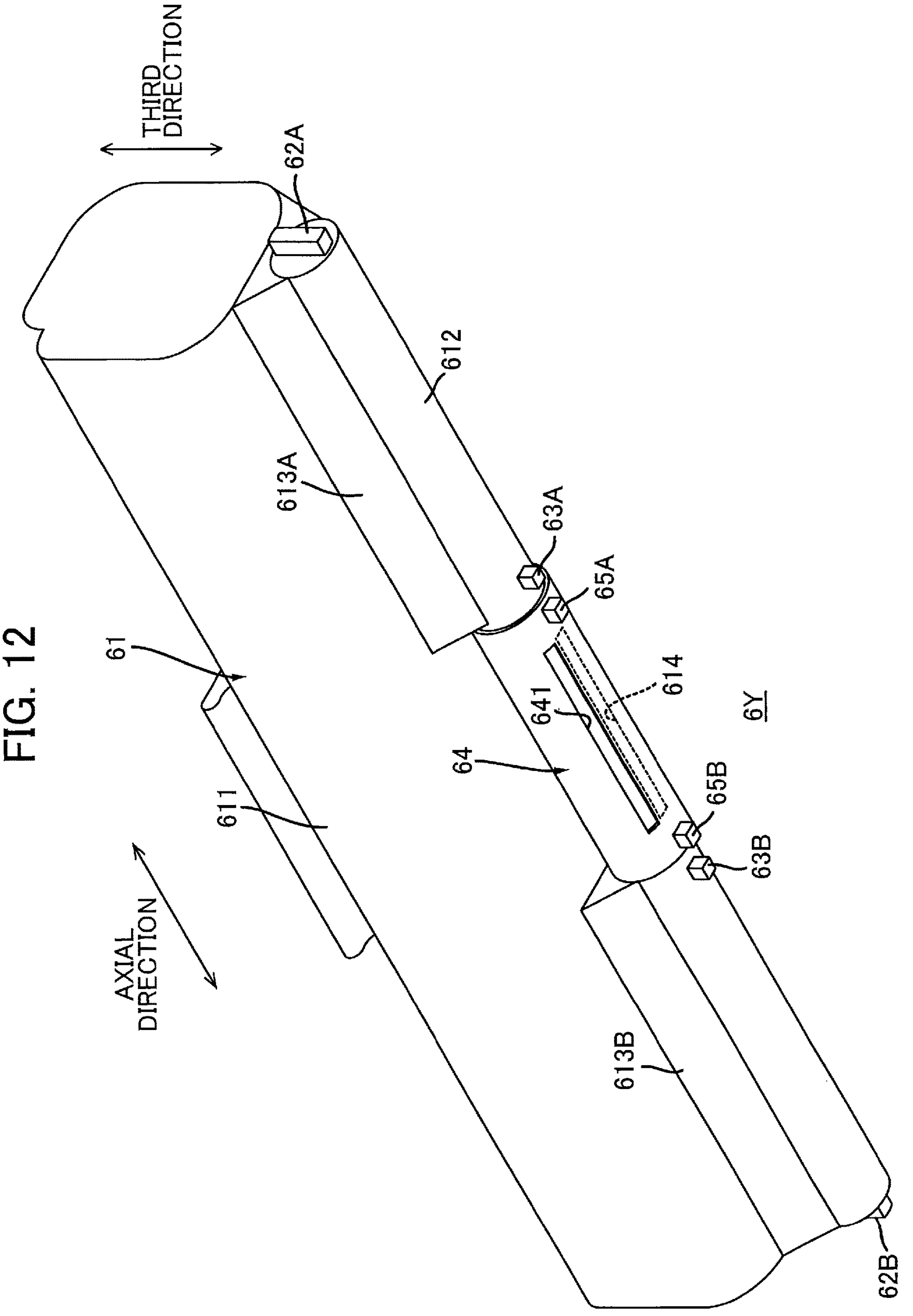
FIG. 12 is a perspective view of a toner cartridge, and particularly illustrating a state where a toner shutter of the toner cartridge is at its closed position.

As illustrated in FIG. 12, the toner cartridge 6Y extends in the axial direction. The toner cartridge 6Y includes a toner casing 61, a plurality of protrusions 62A 62B, a plurality of protrusions 63A, 63B, a toner shutter 64, a plurality of protrusions 65A, 65B, and a toner conveying member 66 (see FIG. 16).

4.1 Toner Casing 61

Figure 13:
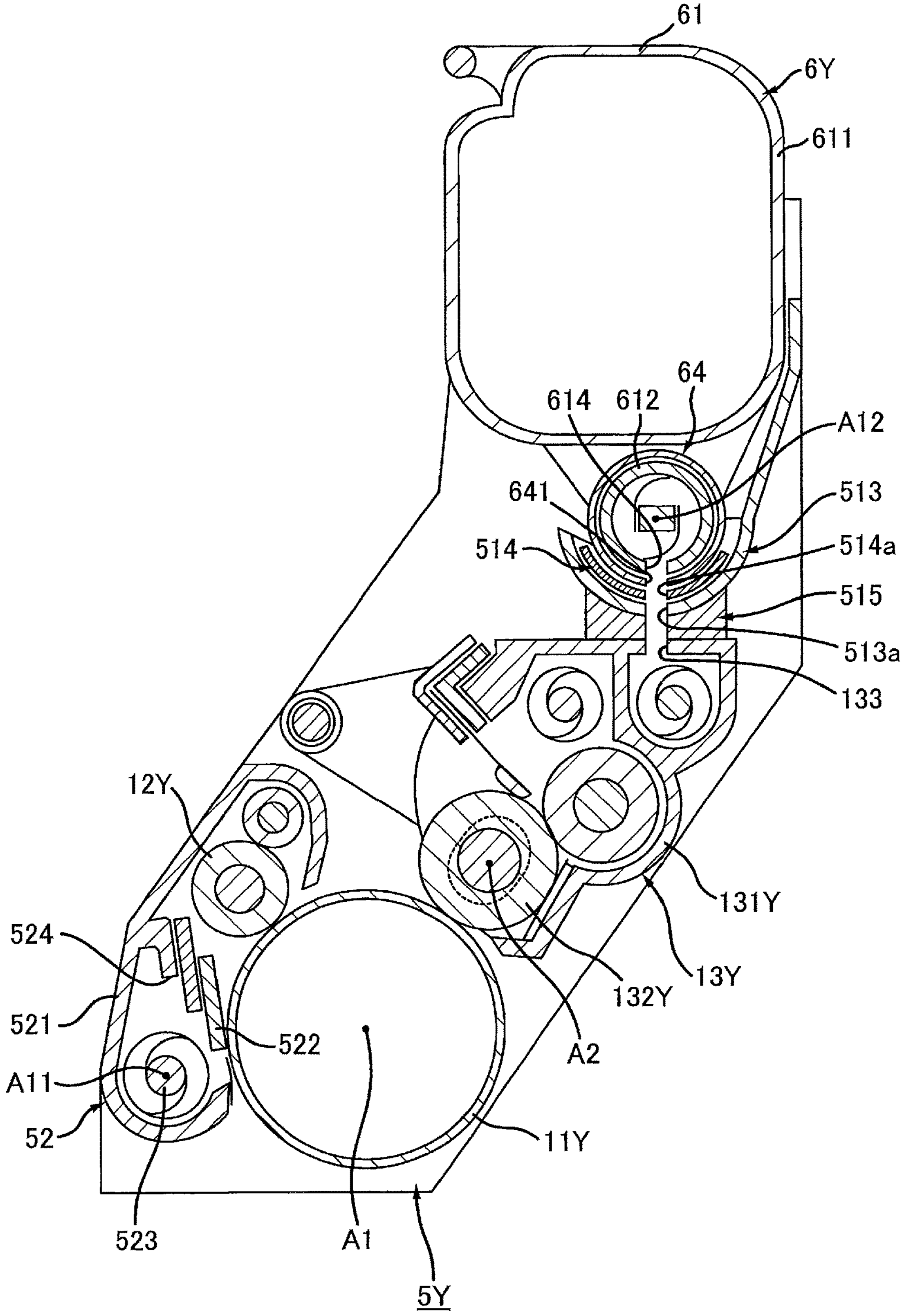
FIG. 13 is a cross-sectional view of the drum cartridge and the toner cartridge attached thereto, and particularly illustrating a state where the toner cartridge is at its first position.
Figure 14:
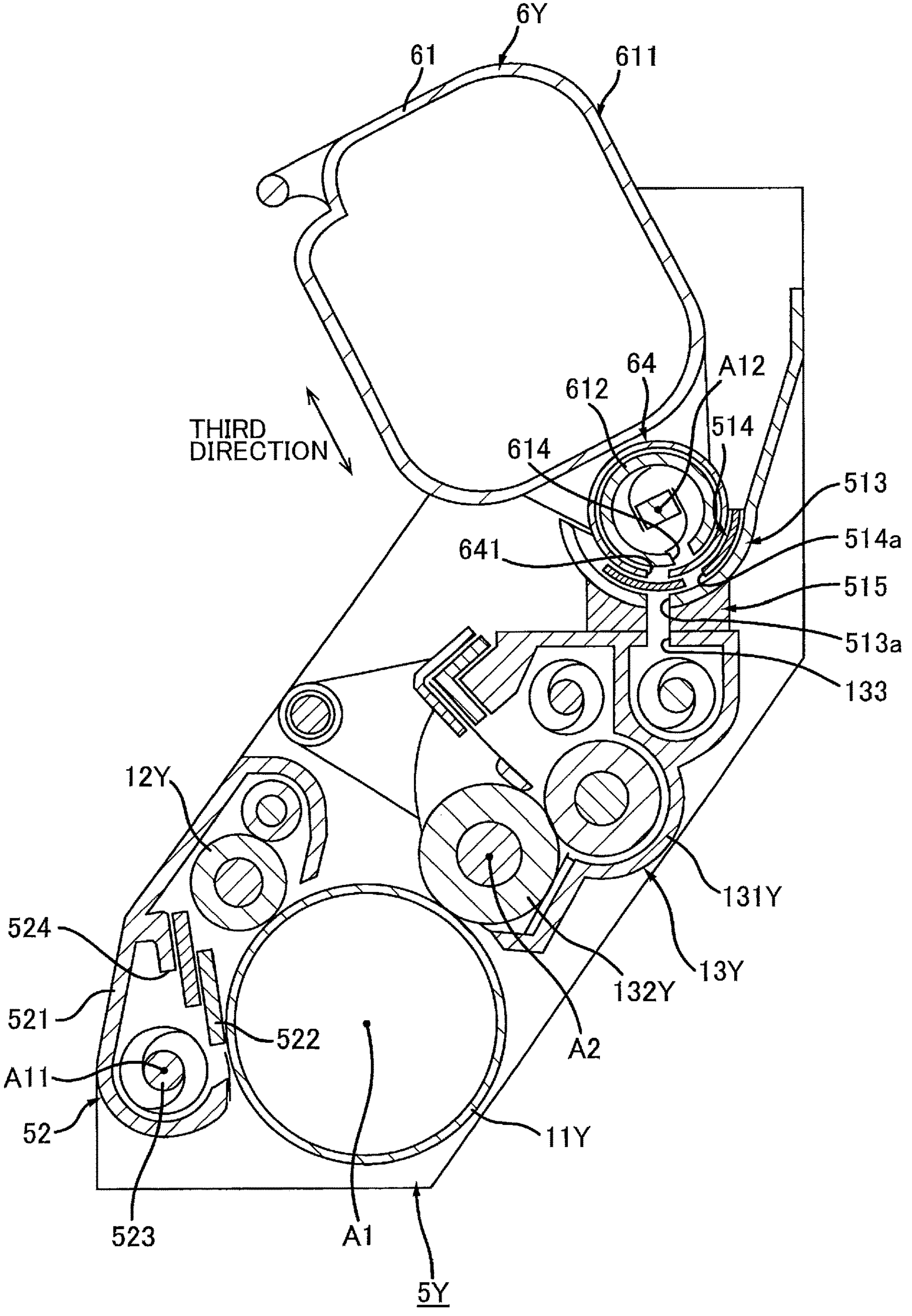
FIG. 14 is a cross-sectional view of the drum cartridge and the toner cartridge attached thereto, and particularly illustrating a state where the toner cartridge is at its second position.

In the attached state of the toner cartridge 6Y to the drum cartridge 5Y, the toner casing 61 is pivotally movable about a second axis A12 between a cartridge first position (see FIG. 13) and a cartridge second position (see FIG. 14). In other words, in the attached state of the toner cartridge 6Y to the drum cartridge 5Y, the toner cartridge 6Y is pivotally movable about the second axis A12 between the cartridge first position and the cartridge second position. The second axis A12 extends in the axial direction.

In the state where the toner casing 61 is at the cartridge first position illustrated in FIG. 13, the protrusions 62A and 62B (see FIG. 12) are engaged with the locking portions 512*b*A and 512*b*B (see FIG. 3) of the drum cartridge 5Y, respectively. Hence, the toner cartridge 6Y is locked to the drum cartridge 5Y in the state where the toner casing 61 is at the cartridge first position. The expression "the toner cartridge 6Y is locked to the drum cartridge 5Y" implies that toner cartridge 6Y is not separable from the drum cartridge 5Y.

In the state where the toner casing 61 is at the cartridge second position illustrated in FIG. 14, the protrusions 62A and 62B are disengaged from the locking portions 512*b*A and 512*b*B of the drum cartridge 5Y, respectively. Hence, the toner cartridge 6Y is unlocked from the drum cartridge 5Y in the state where the toner casing 61 is at the cartridge second position.

As illustrated in FIG. 12, the toner casing 61 extends in the axial direction. The toner casing 61 includes a first accommodating portion 611, the second accommodating portion 612, and a plurality of connecting portions 613A, 613B.

4.1.1 First Accommodating Portion 611

The first accommodating portion 611 extends in the axial direction. The first accommodating portion 611 has a hollow cylindrical shape. The first accommodating portion 611 is configured to accommodate therein toner. In other words, the toner casing 61 is configured to accommodate therein toner.

4.1.2 Second Accommodating Portion 612

The second accommodating portion 612 is positioned apart from the first accommodating portion 611 in a third direction. The second accommodating portion 612 defines the second axis A12. The third direction crosses the axial direction. Preferably, the third direction is perpendicular to the axial direction. The second accommodating portion 612 extends in the axial direction. The second accommodating portion 612 has a hollow cylindrical shape. The second accommodating portion 612 has an internal volume smaller than that of the first accommodating portion 611. The second accommodating portion 612 has a toner discharge opening 614. In other words, the toner casing 61 has the toner discharge opening 614.

The toner discharge opening 614 is positioned between the protrusions 63A and 63B in the axial direction. The toner discharge opening 614 is positioned at a center portion in the axial direction of the second accommodating portion 612. The toner discharge opening 614 extends in the axial direction. The toner discharge opening 614 is configured to discharge therethrough the toner in the toner casing 61.

4.1.3 Connecting Portions 613A, 613B

The connecting portion 613A is positioned between one end portion in the axial direction of the first accommodating portion 611 and one end portion in the axial direction of the second accommodating portion 612. The connecting portion 613A connects the one end portion in the axial direction of the first accommodating portion 611 to the one end portion in the axial direction of the second accommodating portion 612.

The connecting portion 613B is positioned between another end portion in the axial direction of the first accommodating portion 611 and another end portion in the axial direction of the second accommodating portion 612. The connecting portion 613B is positioned spaced away from the connecting portion 613A in the axial direction. The connecting portion 613B connects the other end portion in the axial direction of the first accommodating portion 611 to the other end portion in the axial direction of the second accommodating portion 612.

The second accommodating portion 612 is in communication with the first accommodating portion 611 through the connecting portions 613A and 613B. Toner accommodated in the first accommodating portion 611 is introduced into the second accommodating portion 612 through the connecting portions 613A and 613B.

4.2 Protrusions 62A 62B

The protrusion 62A is positioned at one end in the axial direction of the toner cartridge 6Y. Specifically, the protrusion 62A is positioned at one end in the axial direction of the second accommodating portion 612. The protrusion 62A protrudes outward in the axial direction from the one end in the axial direction of the second accommodating portion 612. The protrusion 62A extends in a diametrical direction of the second accommodating portion 612. The protrusion 62A extends in the third direction.

The protrusion 62B is positioned at another end in the axial direction of the toner cartridge 6Y. Specifically, the protrusion 62B is positioned at another end in the axial direction of the second accommodating portion 612. The protrusion 62A protrudes outward in the axial direction from the other end in the axial direction of the second accommodating portion 612. The protrusion 62B extends in the diametrical direction of the second accommodating portion 612. The protrusion 62B extends in the third direction.

4.3 Protrusions 63A, 63B

The protrusion 63A is positioned between the toner discharge opening 614 and the protrusion 62A in the axial direction. The protrusion 63A is positioned between the toner shutter 64 and the protrusion 62A in the axial direction. The protrusion 63A is positioned opposite to the first accommodating portion 611 with respect to the second accommodating portion 612 in the third direction. The protrusion 63A protrudes in the third direction from the outer peripheral surface of the second accommodating portion 612.

The protrusion 63B is positioned apart from the protrusion 63A in the axial direction. The protrusion 63B is positioned opposite to the protrusion 63A with respect to the toner discharge opening 614 in the axial direction. The protrusion 63B is positioned between the toner discharge opening 614 and the protrusion 62B in the axial direction. The protrusion 63B is positioned opposite to the protrusion 63A with respect to the toner shutter 64 in the axial direction. The protrusion 63B is positioned between the toner shutter 64 and the protrusion 62B in the axial direction. The protrusion 63B is positioned opposite to the first accommodating portion 611 with respect to the second accommodating portion 612 in the third direction. The protrusion 63B protrudes in the third direction from the outer peripheral surface of the second accommodating portion 612.

4.4 Toner Shutter 64

The toner shutter 64 is positioned between the connecting portions 613A and the 613B. The toner shutter 64 is positioned on the peripheral surface of the second accommodating portion 612. The toner shutter 64 is movable relative to the toner discharge opening 614 between a toner closing position (see FIG. 12) and a toner opening position (see FIG. 15). The toner shutter 64 closes the toner discharge opening 614 in a state where the toner shutter 64 is at the toner closing position as illustrated in FIG. 12.

Figure 15:
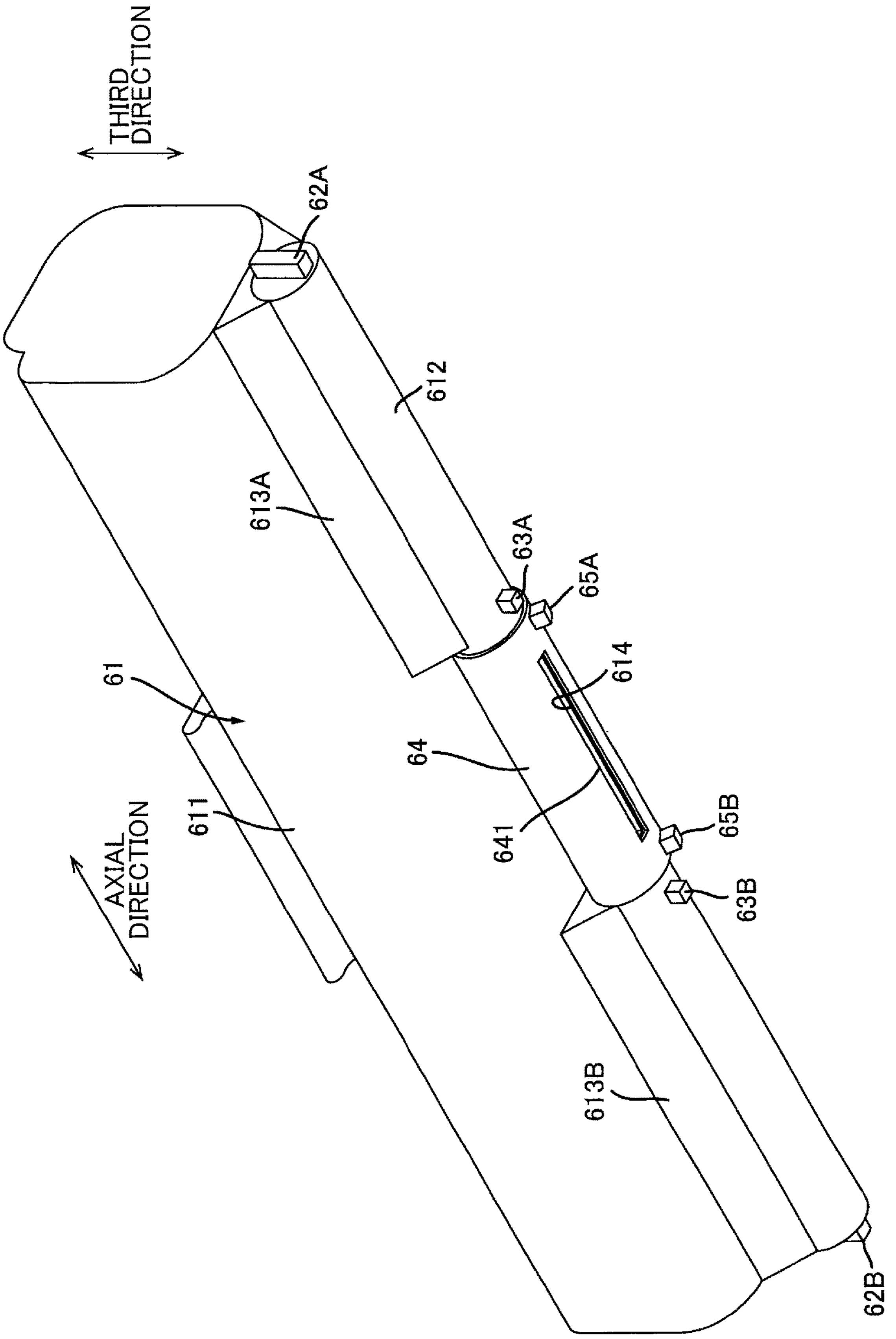
FIG. 15 is a perspective view of the toner cartridge illustrated in FIG. 12, and particularly illustrating a state where the toner shutter of the toner cartridge is at its open position.

As illustrated in FIG. 14, the toner shutter 64 is positioned at the toner closing position in a state where the toner cartridge 6Y is attached to the drum cartridge 5Y and the toner casing 61 is positioned at the cartridge second position. The toner shutter 64 opens the toner discharge opening 614 in a state where the toner shutter 64 is at the toner opening position as illustrated in FIG. 15. As illustrated in FIG. 13, the toner shutter 64 is at the toner opening position in a state where the toner cartridge 6Y is attached to the drum cartridge 5Y and the toner casing 61 is at the cartridge first position.

As illustrated in FIG. 12, the toner shutter 64 extends in the axial direction. The toner shutter 64 has a hollow cylindrical shape. The toner shutter 64 has an opening 641 extending in the axial direction. The opening 641 is displaced from the toner discharge opening 614 when the toner shutter 64 is at the toner closing position. On the other hand, at least a part of the opening 641 is communicated with the toner discharge opening 614 in a state where the toner shutter 64 is at the toner opening position.

4.5 Protrusions 65A, 65B

As illustrated in FIG. 12, the protrusion 65A is positioned on the outer peripheral surface of the toner shutter 64. The protrusion 65A protrudes outward from the outer peripheral surface of the toner shutter 64. The protrusion 65A is positioned between the opening 641 and the protrusion 63A in the axial direction.

The protrusion 65B is positioned apart from the protrusion 65A in the axial direction. The protrusion 65B is positioned opposite to the protrusion 65A with respect to the opening 641. The protrusion 65B is positioned on the outer peripheral surface of the toner shutter 64. The protrusion 65B protrudes outward from the outer peripheral surface of the toner shutter 64. The protrusion 65B is positioned between the opening 641 and the protrusion 63B in the axial direction.

4.6 Toner Conveying Member 66

Figure 16:
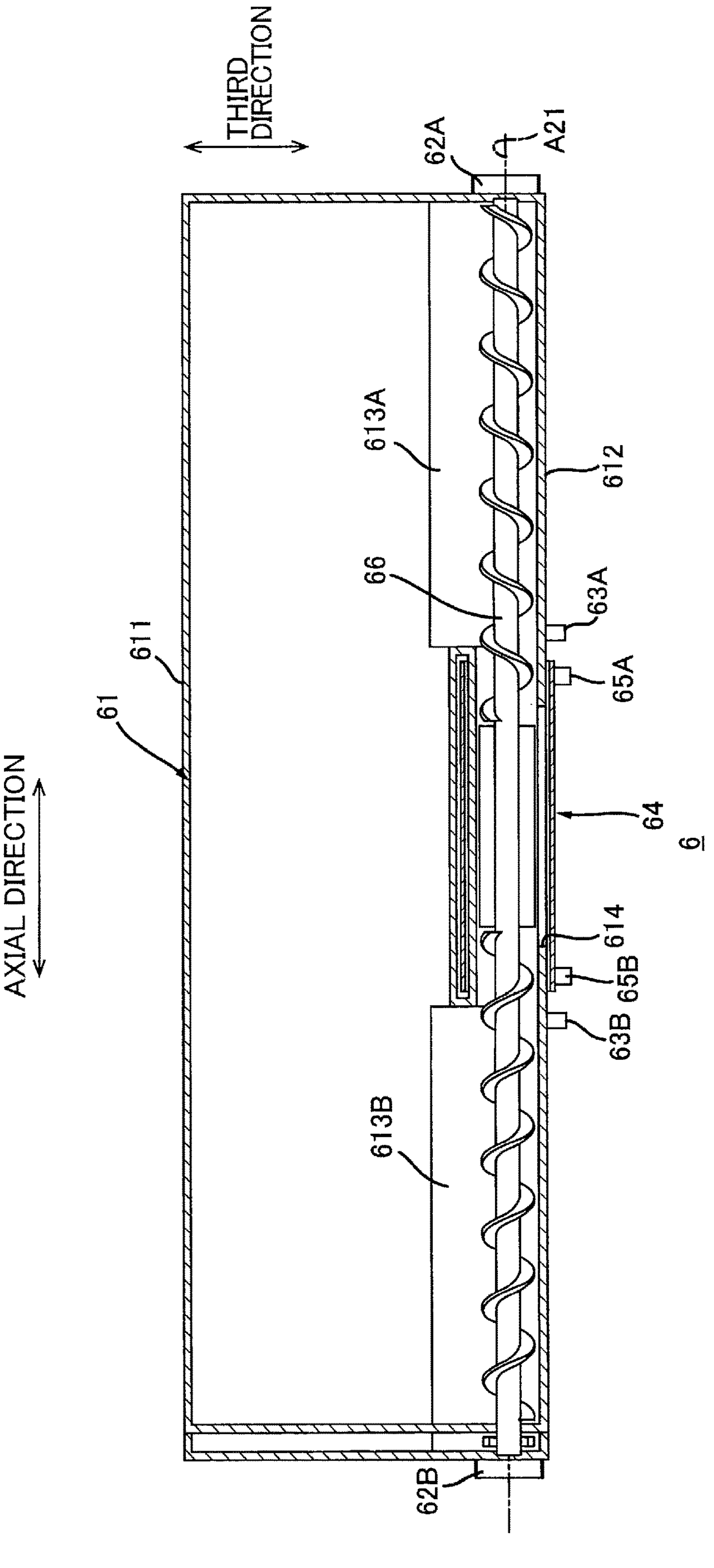
FIG. 16 is a cross-sectional view of the toner cartridge illustrated in FIG. 12 taken along a plane passing through a toner discharge opening.

As illustrated in FIG. 16, the toner conveying member 66 is positioned inside the second accommodating portion 612. The toner conveying member 66 is rotatable about an axis A21 extending in the axial direction. The toner conveying member 66 extends along the axis A21. The toner conveying member 66 is configured to convey toner introduced into the second accommodating portion 612 through the connecting portions 613A and the 613B toward the toner discharge opening 614.

5. Work for Exchanging Toner Cartridge 6Y

Next, the work for exchanging the toner cartridge 6Y for a new toner cartridge 6Y will be described with reference to FIGS. 1 through 3, 6, 7, and 12 through 14. As illustrated in FIGS. 1 and 2, firstly, the user moves the drawer 4 from the inside position (see FIG. 1) to the outside position (see FIG. 2) for exchanging the toner cartridge 6Y for a new toner cartridge 6Y.

As illustrated in FIGS. 6 and 7, the locking member 43Y is at the locking position and the lever 44Y is at the first position in the state where the drawer 4 is at the outside position. The locking member 43Y is locked at the locking position because of the first position of the lever 44Y. The photosensitive drum 11Y is locked to the drawer 4 because of the locking position of the locking member 43Y.

Then, the user moves the toner casing 61 from the cartridge first position (see FIG. 13) to the cartridge second position (see FIG. 14). As a result, as illustrated in FIG. 14, the toner shutter 64 of the toner cartridge 6Y is positioned at the toner closing position and the toner shutter 514 of the drum cartridge 5Y is positioned at the closed position with the state where the toner casing 61 is at the cartridge second position.

Then, the user pulls the toner cartridge 6Y in the third direction from the drum cartridge 5Y. Hence, the toner cartridge 6Y is released from the drum cartridge 5Y. At this time, displacement of the photosensitive drum 11Y relative to the drawer 4 can be suppressed, since the photosensitive drum 11Y is locked to the drawer 4.

Next, in order to attach the toner cartridge 6Y to the drum cartridge 5Y attached to the drawer 4 that is at the outside position, the user firstly engages the protrusions 62A and 62B (see FIG. 12) with the toner guides 512A and 512B (see FIG. 3), respectively.

With such engagements, the second accommodating portion 612 of the toner cartridge 6Y is guided toward the receiving portion 513 by the toner guides 512A and 512B. As a result, the second accommodating portion 612 is fitted with the receiving portion 513 as illustrated in FIG. 14, whereupon the toner cartridge 6Y is supported by the drum cartridge 5Y. At this time, the toner casing 61 is positioned at the cartridge second position.

In the state where the toner cartridge 6Y is supported by the toner cartridge 6Y and toner casing 61 is at the cartridge second position, the protrusion 65A (see FIG. 12) protrudes through the through-hole 514*b*A (see FIG. 3) of the toner shutter 514 and is fitted with the hole 513*b*A (see FIG. 3) of the receiving portion 513, and the protrusion 65B (see FIG. 12) protrudes through the through-hole 514*b*B (see FIG. 3) of the toner shutter 514 and is fitted with the hole 513*b*B (see FIG. 3) of the receiving portion 513. The toner shutter 64 is fixed to the receiving portion 513 upon fitting engagement of the protrusions 65A and 65B with the holes 513*b*A and 513*b*B of the receiving portion 513, respectively.

Further, the protrusions 63A and 63B (see FIG. 12) are fitted with the through-holes 514*c*A and 514*c*B (see FIG. 3) of the toner shutter 514, respectively. Because of this fitting engagement, the toner shutter 514 becomes movable along with the toner casing 61.

Then, the user moves the toner casing 61 from the cartridge second position as illustrated in FIG. 14 to the cartridge first position as illustrated in FIG. 13. That is, the toner casing 61 is pivotally moved about the second axis A12 of the second accommodating portion 612.

The toner shutter 64 is moved from the toner closing position to the toner opening position relative to the toner casing 61 because of the pivotal movement of the toner casing 61 from the cartridge second position to the cartridge first position. Further, the toner shutter 514 is moved from the closed position to the open position in accordance with the movement of the toner casing 61 from the cartridge second position to the cartridge first position.

As illustrated in FIG. 13, the toner shutter 64 is at the toner opening position, and the toner shutter 514 is at the open position as a result of movement of the toner casing 61 to the cartridge first position. Hence, the toner discharge opening 614 is brought into communication with the toner inlet opening 513*a*. Accordingly, the toner inlet opening 513*a* allows the toner discharged from the toner discharge opening 614 to pass through the toner inlet opening 513*a*.

Next, the user moves the drawer 4 from the outside position to the inside position. As such, exchange of the toner cartridge 6Y for the new toner cartridge 6Y is completed.

6. Work for Exchanging Drum Cartridge 5Y.

Next, the work for exchanging the drum cartridge 5Y for a new drum cartridge 5Y will be described with reference to FIGS. 1 through 3 and 6 through 11. Incidentally, the exchange of the drum cartridge 5Y may be performed with the attached state of the toner cartridge 6Y to the drum cartridge 5Y, or with the detached state of the toner cartridge 6Y from the drum cartridge 5Y.

As illustrated in FIGS. 1 and 2, firstly, the user moves the drawer 4 from the inside position (see FIG. 1) to the outside position (see FIG. 2) for exchanging the drum cartridge 5Y for a new drum cartridge 5Y.

As illustrated in FIGS. 6 and 7, the locking member 43Y is at the locking position and the lever 44Y is at the first position in the state where the drawer 4 is at the outside position. Further, the locking member 45Y is at the locking position and the lever 46Y is at the first position.

The locking member 43Y is locked at the locking position because of the first position of the lever 44Y. Further, the locking member 45Y is locked at the locking position because of the first position of the lever 46Y. The photosensitive drum 11Y is locked to the drawer 4 because of the locking positions of the locking member 43Y and the 45Y.

Then, the user pivotally moves the lever 44Y from the first position to the second position. The locking member 43Y is unlocked from the side plate 41A in accordance with the movement of the lever 44Y to the second position. Further, the user pivotally moves the lever 46Y from the first position to the second position. The locking member 45Y is unlocked from the side plate 41B in accordance with the movement of the lever 46Y to the second position.

Then, as illustrated in FIGS. 7 and 11, the user rotates the locking member 43Y from the locking position to the unlocking position. Further, the user rotates the locking member 45Y (see FIG. 6) from the locking position to the unlocking position. As a result, the photosensitive drum 11Y is unlocked from the drawer 4 in the state where the locking members 43Y and 45Y are positioned at the unlocking position.

Then, the user pulls the drum cartridge 5Y out of the drawer 4. As a result, the sleeve portion 516A (see FIGS. 3 and 10) of the drum cartridge 5Y is disengaged from the lock guide 431 (see FIG. 10) of the locking member 43Y, and the sleeve portion 516B (see FIG. 6) of the drum cartridge 5Y is disengaged from the lock guide 451 (see FIG. 6) of the locking member 45Y. Thus, the drum cartridge 5Y is released from the drawer 4.

Then, in order to attach the drum cartridge 5Y to the drawer 4 in the state where the drawer 4 is at the outside position, the user firstly engages the sleeve portions 516A and 516B with the drawer guides 411Y and 414Y of the drawer 4, respectively, as illustrated in FIG. 6. Hence, the drum cartridge 5Y is guided by the drawer guides 411Y and 414Y and is attached to the drawer 4.

After attachment of the drum cartridge 5Y to the drawer 4, the sleeve portion 516A of the drum cartridge 5Y is fitted with the lock guide 431 of the locking member 43Y and the sleeve portion 516B of the drum cartridge 5Y is fitted with the lock guide of the locking member 45Y.

Next, as illustrated in FIGS. 7 and 11, the user grasps the lever 44Y positioned at the second position, and rotates the locking member 43Y from the unlocking position to the locking position. Further, the user grasps the lever 46Y (see FIG. 6) positioned at the second position, and rotates the locking member 45Y (see FIG. 6) from the unlocking position to the locking position.

As a result, as illustrated in FIG. 9, the photosensitive drum 11Y is locked to the drawer 4 with the state where the locking member 43Y is at the locking position, and the locking member 45Y is at the locking position.

Then, the user moves the lever 44Y from the second position to the first position. Further, the user moves the lever 46Y from the second position to the first position. Then, the user moves the drawer 4 from the outside position to the inside position. As such, work for exchange of the drum cartridge 5Y for the new drum cartridge 5Y is completed.

Second Embodiment

Next, an image forming apparatus 1001 according to a second embodiment will be described with reference to FIG. 17. through 26, wherein like parts and components are designated by the same reference numerals as those shown in FIGS. 1 through 16 to avoid duplicating description.

7. Image Forming Apparatus 1001

A general structure of the image forming apparatus 1001 will be described with reference to FIGS. 17 through 19A.

The image forming apparatus 1001 according to the second embodiment is generally the same as the image forming apparatus 1 of the first embodiment except that in the second embodiment, developing cartridges 1006Y, 1006M, 1006C, 1006K are provided instead of the toner cartridges 6Y, 6M, 6C, 6K.

7.1 Housing 2

The housing 2 accommodates therein a drawer 1004, a plurality of drum cartridges 1005Y, 1005M, 1005C, 1005K, the plurality of developing cartridges 1006Y, 1006M, 1006C, 1006K, and positioning members 1023A, 1023B in addition to the above-described sheet cassette 3, the exposure unit 7, the belt unit 8, the transfer roller 9, and the fixing unit 10.

The positioning member 1023A is the same as the positioning member 23 of the first embodiment. The positioning member 1023A is configured to fix a position of one end portion in the first direction of the drawer 1004 to the housing 2 similar to the positioning member 23.

The other positioning member 1023B is positioned apart from the positioning member 1023A in the first direction. The positioning member 1023B has a notch. The positioning member 1023B is configured to fix a position of another end portion in the first direction of the drawer 1004 to the housing 2.

7.2 Drum Cartridges 1005Y, 1005M, 1005C, 1005K

The drum cartridges 1005Y, 1005M, 1005C, 1005K according to the second embodiment are different from the drum cartridges 5Y, 5M, 5C, 5K according to the first embodiment in that the drum cartridges 1005Y, 1005M, 1005C, 1005K do not include the developing units 13Y, 13M, 13C, 13K according to the first embodiment. Specifically, the drum cartridge 1005Y includes the photosensitive drum 11Y and the charger 12Y. Each of the drum cartridges 1005Y, 1005M, 1005C, 1005K is an example of the “first cartridge”.

7.3 Developing Cartridges 1006Y, 1006M, 1006C, 1006K

Each of the developing cartridges 1006Y, 1006M, 1006C, 1006K is attachable to and detachable from the drawer 1004. Specifically, each of the developing cartridges 1006Y, 1006M, 1006C, 1006K is attachable to and detachable from the drawer 1004 in a state where the drawer 1004 is at the outside position. Each of the developing cartridges 1006Y, 1006M, 1006C, 1006K is an example of the “second cartridge”.

The developing cartridge 1006Y is configured to supply toner to the photosensitive drum 11Y. The developing cartridge 1006M is configured to supply toner to the photosensitive drum 11M. The developing cartridge 1006C is configured to supply toner to the photosensitive drum 11C. The developing cartridge 1006K is configured to supply toner to the photosensitive drum 11K.

Incidentally, the description as to the developing cartridge 1006Y is applicable to the developing cartridges 1006M, 1006C, 1006K. Therefore, further description as to the developing cartridges 1006M, 1006C, 1006K will be omitted.

The developing cartridge 1006Y includes a developing casing 1061Y and a developing roller 1062Y. The developing casing 1061Y is configured to accommodate therein toner to be supplied to the photosensitive drum 11Y. The developing casing 1061Y supports the developing roller 1062Y.

8. Details of Drum Cartridge 1005Y

Figure 19A:
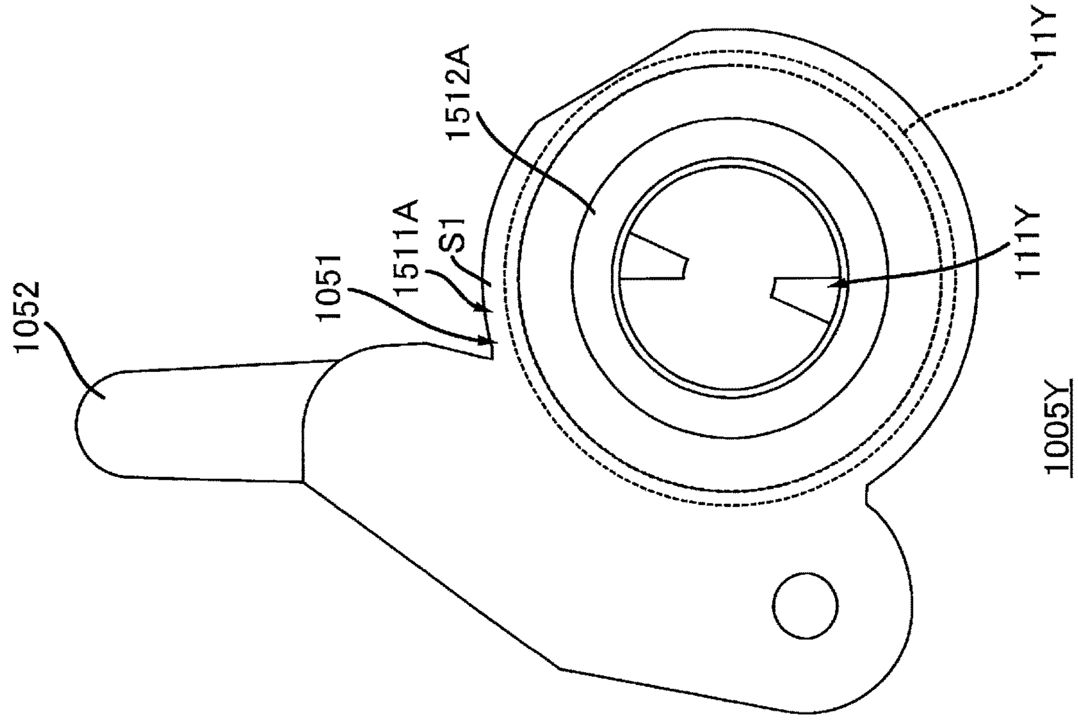
FIG. 19A is a side view of a drum cartridge provided in the image forming apparatus illustrated in FIG. 17.
Figure 19B:
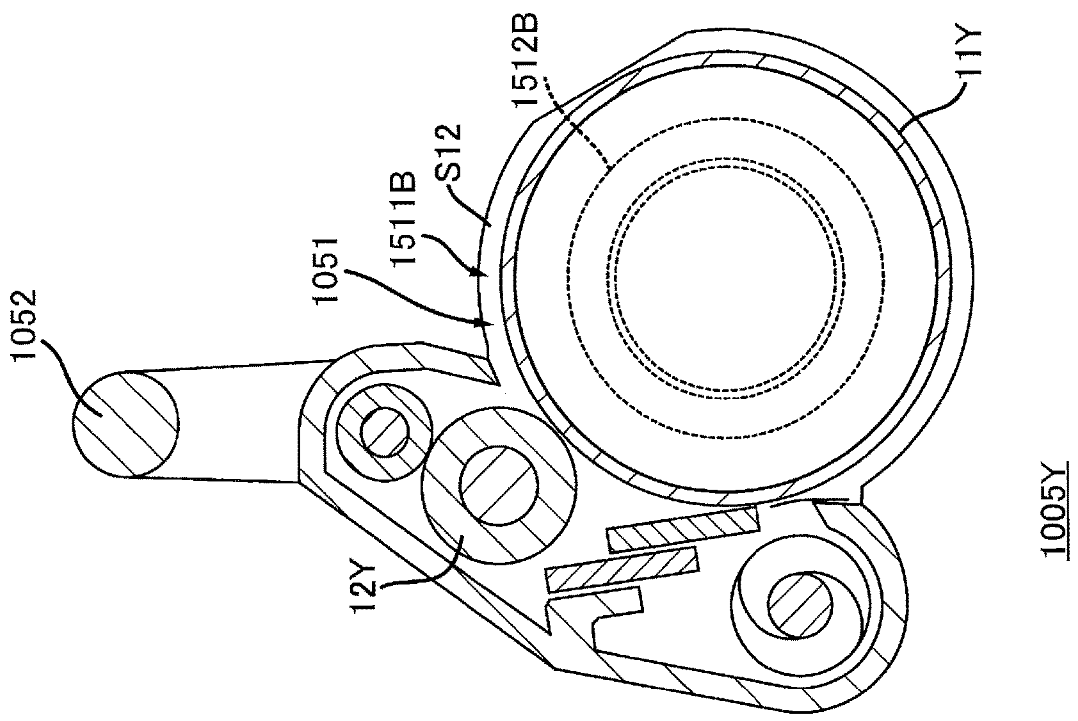
FIG. 19B is a cross-sectional view of the drum cartridge.

The drum cartridge 1005Y will be described in detail with reference to FIGS. 19A through 20. As illustrated in FIGS. 19A and 19B, the drum cartridge 1005Y includes a drum frame 1051 and a first handle 1052 in addition to the above-described photosensitive drum 11Y and the charger 12Y.

8.1 Drum Frame 1051

The drum frame 1051 supports the photosensitive drum 11Y and the charger 12Y. As illustrated in FIG. 20, the drum frame 1051 includes drum side plates 1511A, 1511B corresponding to the drum side plate 511A, 511B of the first embodiment and sleeve portions 1512A, 1512B.

8.1.1 Drum Side Plates 1511A, 1511B

The drum side plate 1511A constitutes one end portion in the axial direction of the drum cartridge 1005Y. The drum side plate 1511A has an outer surface S1 and an inner surface S2. The inner surface S2 is positioned between the outer surface S1 and the drum side plate 1511B in the axial direction.

Figure 20:
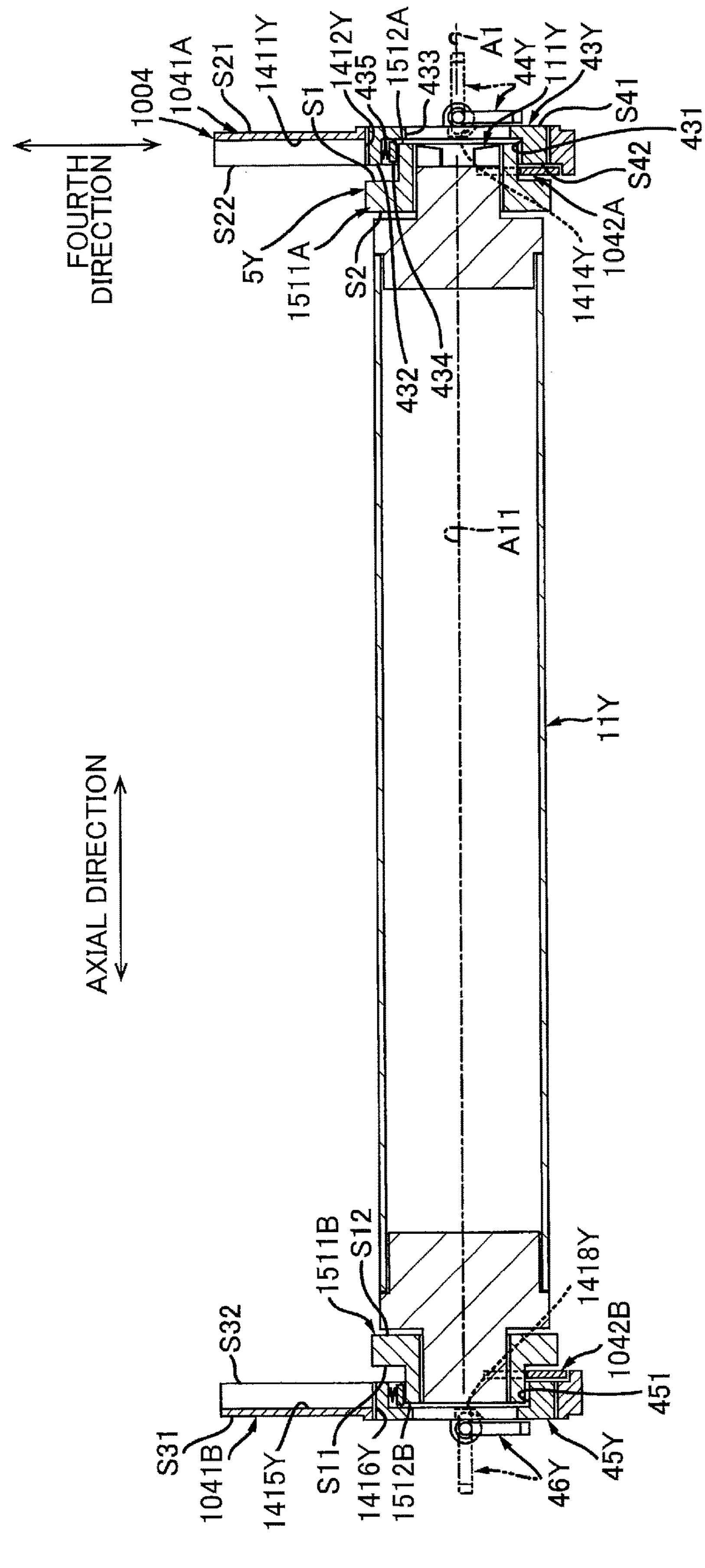
FIG. 20 is a cross-sectional view of the drum cartridge taken along the line XX-XX in FIG. 18.

As illustrated in FIGS. 19A and 20, the drum side plate 1511B constitutes another end portion in the axial direction of the drum cartridge 1005Y. The drum side plate 1511B is positioned apart from the drum side plate 1511A in the axial direction. The drum side plate 1511B has an outer surface S11 and an inner surface S12. The inner surface S12 is positioned between the outer surface S11 and the drum side plate 1511A in the axial direction.

8.1.2 Sleeve Portions 1512A, 1512B

Description as to the sleeve portions 516A, 516B in relation to the drum side plates 511A, 511B according to the first embodiment is also applicable to the sleeve portions 1512A, 1512B. Therefore, further description as to the sleeve portions 1512A, 1512B will be omitted.

8.2 First Handle 1052

As illustrated in FIGS. 19A and 19B, the first handle 1052 is positioned at an upper end of the drum frame 1051 in the attached state of the drum cartridge 1005Y to the drawer 1004. The first handle 1052 extends upward from the drum frame 1051 in the attached state of the drum cartridge 1005Y to the drawer 1004. The first handle 1052 is integral with the drum frame 1051. However, the first handle 1052 may be fixed to the drum frame 1051.

Figure 18:
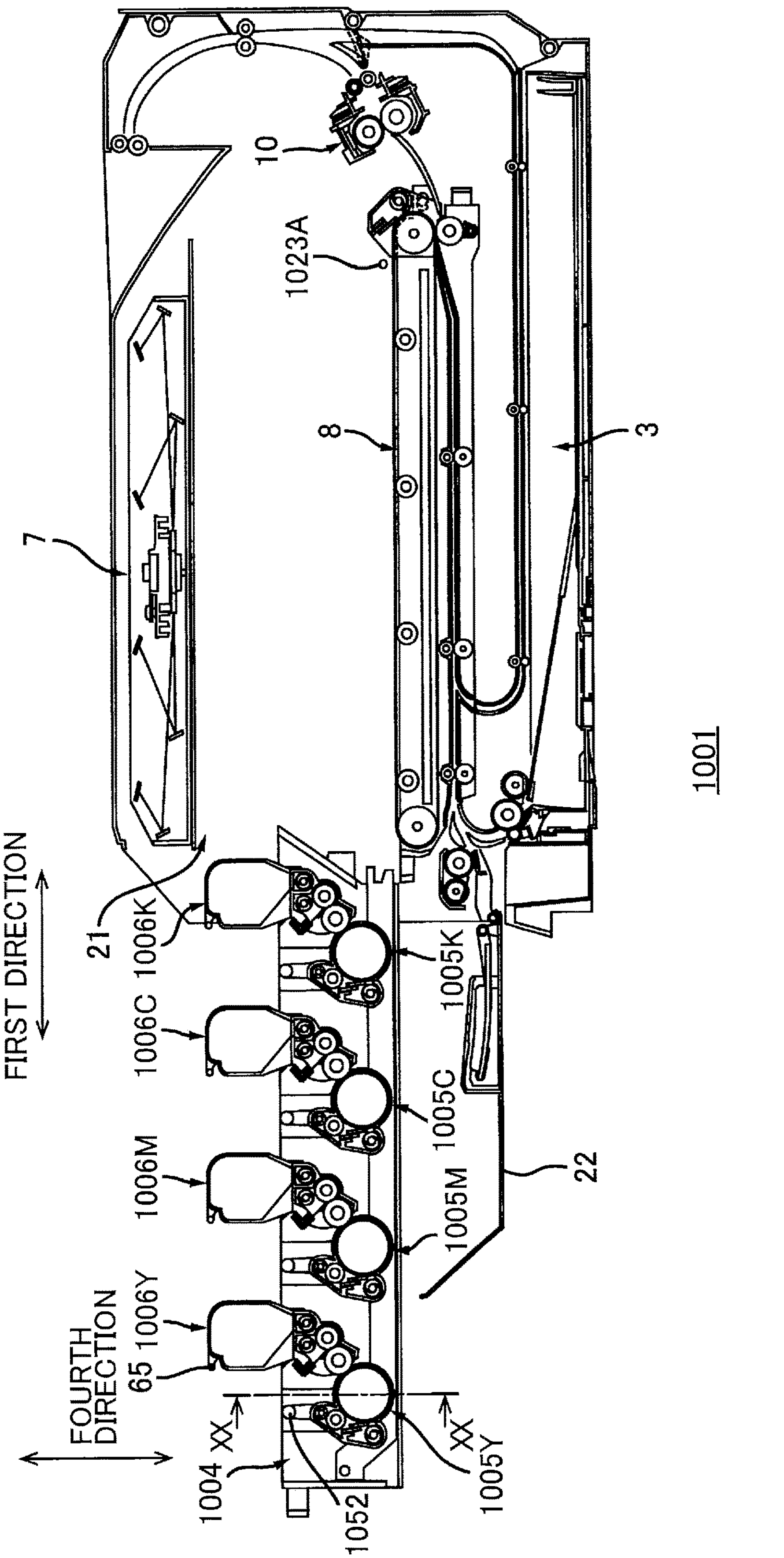
FIG. 18 is a schematic view for description of movement of a drawer illustrated in FIG. 17, and particularly illustrating a state where a cover is at its open position and the drawer is at its outside position.

As illustrated in FIG. 18, the first handle 1052 is accommodated in the drawer 1004 in the attached state of the drum cartridge 1005Y to the drawer 1004. In other words, the first handle 1052 is positioned below an upper end of the drawer 1004 in the attached state of the drum cartridge 1005Y to the drawer 1004. The first handle 1052 is gripped by a user for detaching the drum cartridge 1005Y from the drawer 1004.

9. Details of Drawer 1004

The drawer 1004 will be described in detail with reference to FIGS. 20 through 25. As illustrated in FIGS. 20 through 23, the drawer 1004 includes side plates 1041A,1041B (see FIG. 20) corresponding to the side plates 41A, 41B of the first embodiment, the, two positioning plates 1042A,1042B (see FIG. 20) corresponding to the side plates 41A, 41B of the first embodiment, the plurality of locking members 43Y, 43M, 43C, 43K (see FIG. 21), the plurality of levers 44Y, 44M, 44C, 44K (see FIG. 21), the plurality of locking members 45Y, 45M, 45C, 45K (see FIG. 23), and the plurality of levers 46Y (see FIG. 20), 46M, 46C, 46K.

Figure 22:
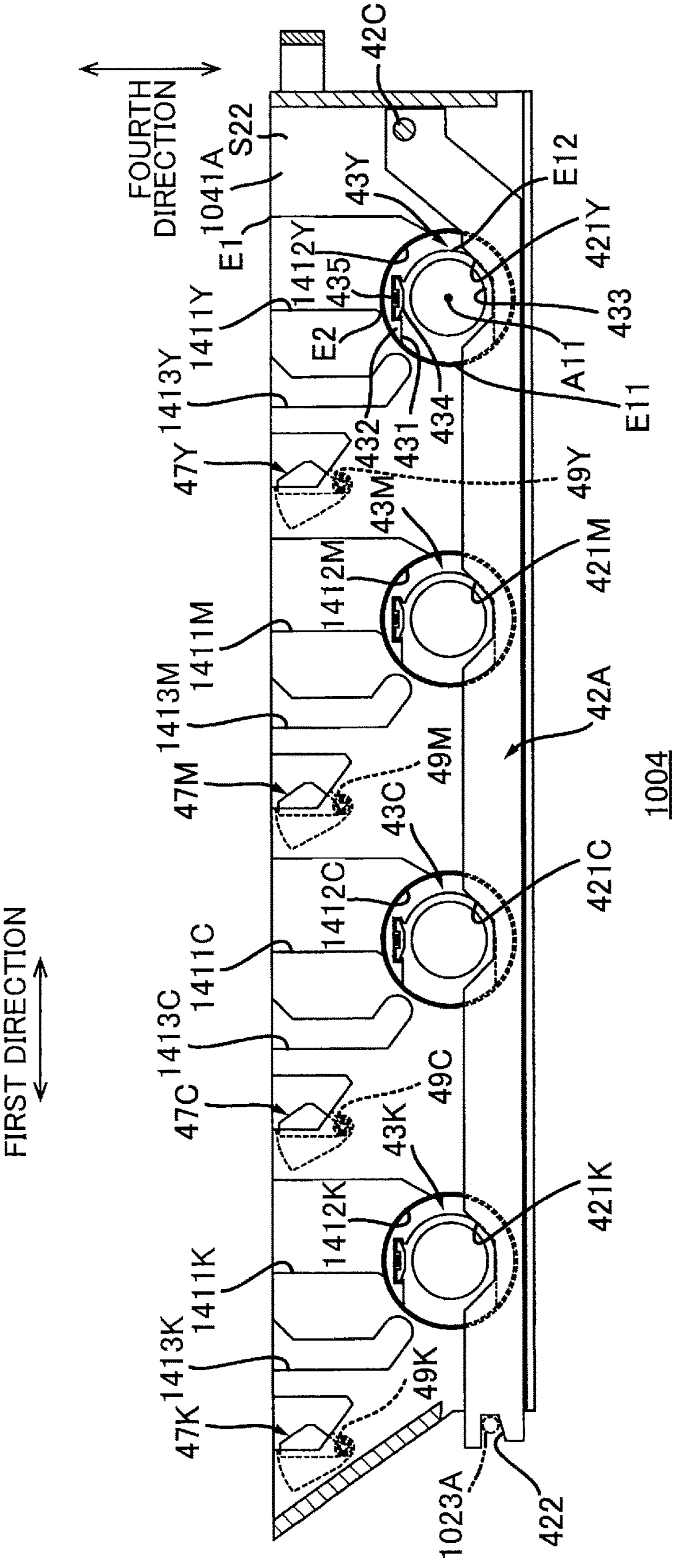
FIG. 22 is a cross-sectional view of the drawer illustrated in FIGS. 20A and 20B as viewed in a direction directing to an inner surface of a side plate 1041A.
Figure 23:
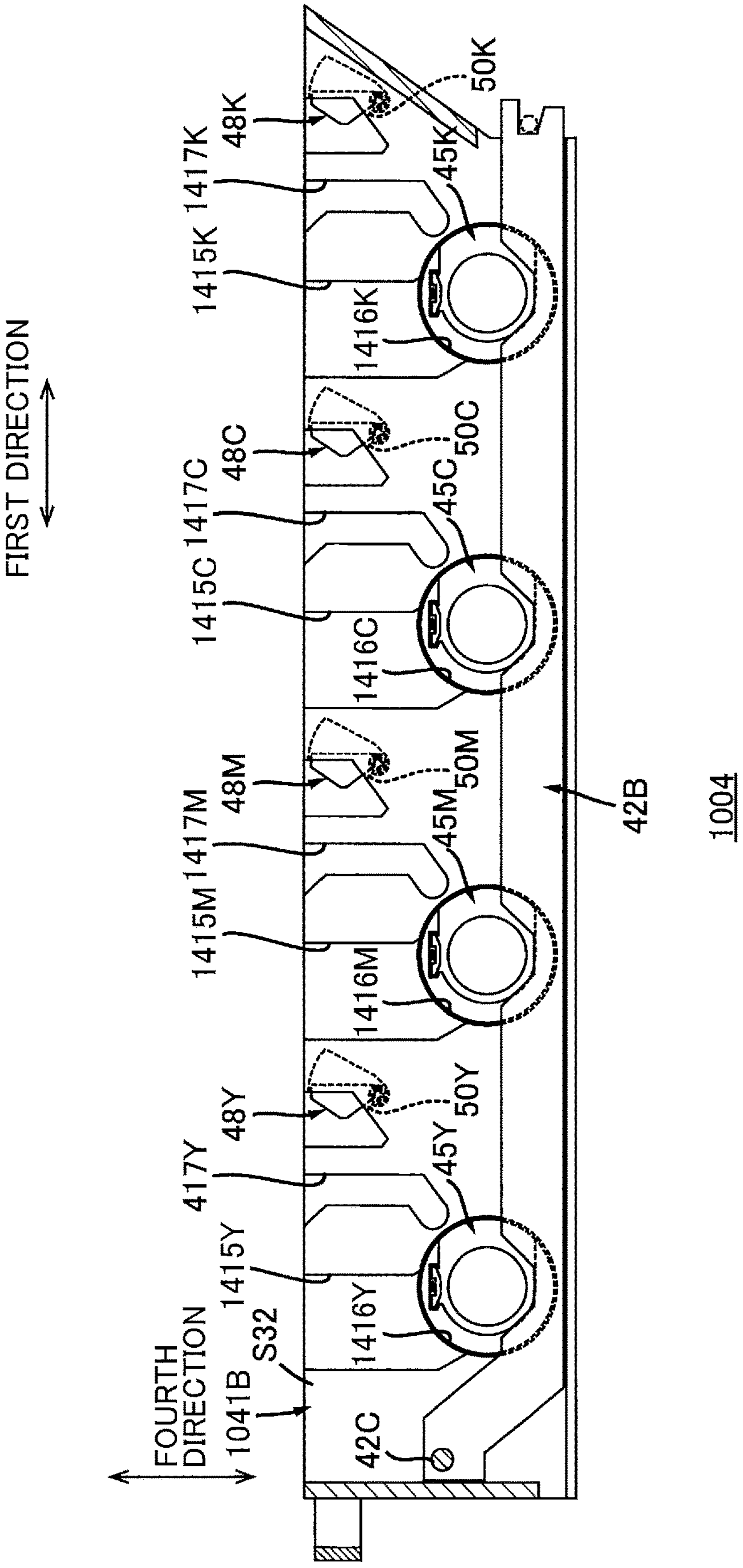
FIG. 23 is a cross-sectional view of the drawer illustrated in FIGS. 20A and 20B as viewed in a direction directing to an inner surface of another side plates 1041B.

In the second embodiment, the drawer 1004 further includes a positioning shaft 42C, a plurality of developing pressure members 47Y, 47M, 47C, 47K (see FIG. 22), a plurality of developing pressure members 48Y, 48M, 48C, 48K (see FIG. 23), a plurality of developing pressure springs 49Y, 49M, 49C, 49K (see FIG. 22), and a plurality of developing pressure spring 50Y, 50M, 50C, 50K (see FIG. 23). Incidentally, the levers 46M, 46C, 46K are not illustrated.

9.1 Side Plate 1041A

With reference to FIG. 20, the description as to the side plate 41A in relation to the drum side plate 511A, the outer surface S21, and the inner surface S22 is applicable to the side plate 1041A.

Figure 21:
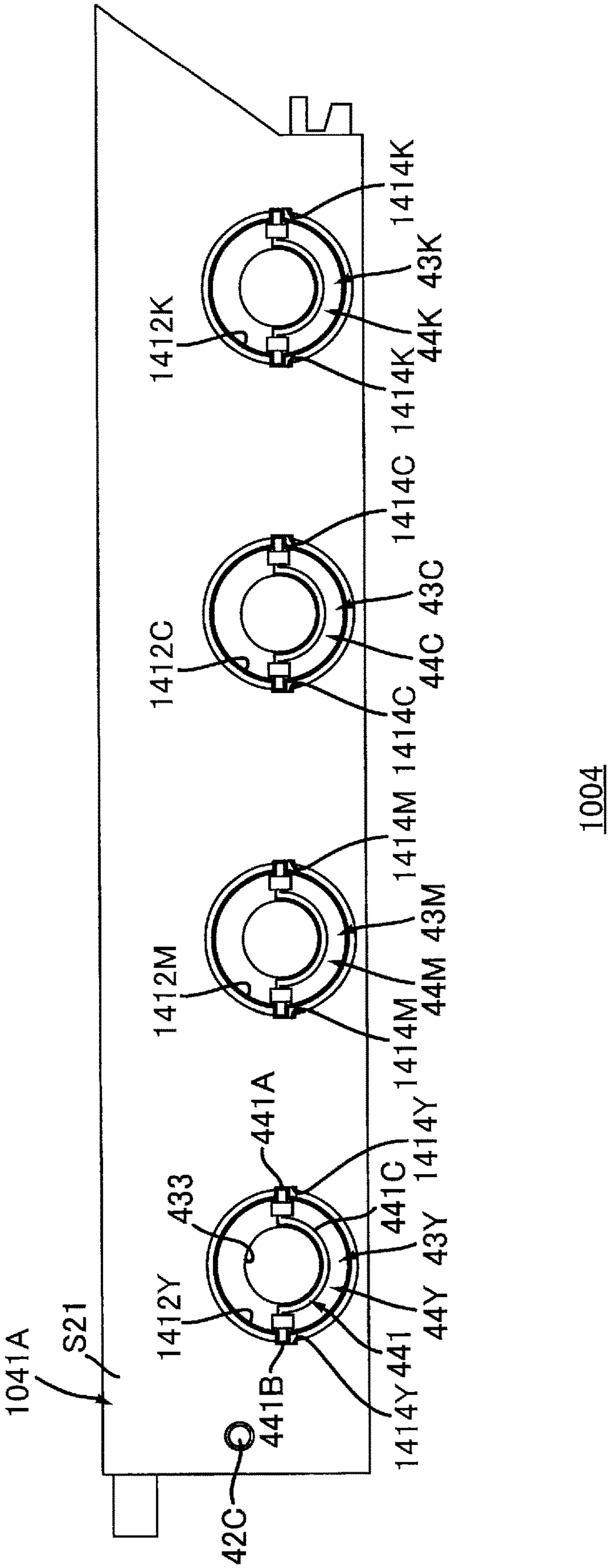
FIG. 21 is a side view of the drawer illustrated in FIGS. 20A and 20B.

As illustrated in FIGS. 21 and 22, the side plate 1041A has a plurality of drawer guides 1411Y, 1411M,1411C, 1411K (see FIG. 22), the plurality of through-holes 1412Y, 1412M, 1412C, 1412K (see FIG. 22), a plurality of developing guides 1413Y, 1413M, 1413C, 1413K (see FIG. 22), a plurality of holes 1414Y (see FIG. 21), a plurality of holes 1414M (see FIG. 21), a plurality of holes 1414C (see FIG. 21), and a plurality of holes 1414K (see FIG. 21). The drawer guides 1411Y, 1411M,1411C, 1411K correspond to the drawer guides 411Y, 411M, 411C, 411K of the first embodiment. The plurality of holes 1414Y, the plurality of holes 1414M, the plurality of holes 1414C, and the plurality of holes 1414K correspond to the plurality of holes 413Y, the plurality of holes 413M, the plurality of holes 413C, and the plurality of holes 413K of the first embodiment, respectively.

In other words, the drawer 1004 has the plurality of drawer guides 1411Y, 1411M, 1411C, 1411K, the plurality of through-holes 1412Y, 1412M, 1412C, 1412K, a plurality of developing guides 1413Y, 1413M, 1413C, 1413K, the plurality of holes 1414Y, the plurality of holes 1414M, the plurality of holes 1414C, and the plurality of holes 1414K.

9.1.1 Drawer Guides 1411Y, 1411M, 1411C, 1411K

The drawer guides 1411Y, 1411M, 1411C, 1411K are arrayed with each other at intervals in the first direction as illustrated in FIG. 22.

As illustrated in FIG. 20, the drawer guide 1411Y is configured to guide travel of the drum cartridge 1005Y relative to the drawer 1004. Specifically, the drawer guide 411Y guides travel of the one end portion in the axial direction of the photosensitive drum 11Y in the attached state of the drum cartridge 1005Y to the drawer 1004. The drawer guide 1411Y is positioned in the inner surface S22 of the side plate 1041A.

As illustrated in FIG. 22, the drawer guide 1411Y extends in a fourth direction crossing the first direction and the axial direction. Specifically, the fourth direction is perpendicular to the first direction and the axial direction. The drawer guide 1411Y has one end portion E1 and another end portion E2 in the fourth direction. The other end portion E2 is positioned between the one end portion E1 and the locking member 43Y in the fourth direction. The drawer guide 1411Y is in the form of a recess. However, the drawer guide 1411Y may be a rib. The sleeve portion 1512A (see FIG. 20)

of the drum cartridge 1005Y is fitted with the drawer guide 1411Y when the drum cartridge 1005Y is attached to the drawer 1004.

The drawer guides 1411M, 1411C, 1411K have configuration the same as that of the drawer guide 1411Y. Therefore, further description as to the drawer guides 1411M, 1411C, 1411K will be omitted.

9.1.2 Through-Holes 1412Y, 1412M, 1412C, 1412K

As illustrated in FIGS. 20 and 22, the through-hole 1412Y is positioned at a deep side of the drawer guide 1411Y in the fourth direction. In other words, the through-hole 1412Y is positioned opposite to the one end portion E1 of the drawer guide 1411Y with respect to the other end portion E2 of the drawer guide 1411Y in the fourth direction. The through-hole 1412Y has a circular shape. The through-hole 1412Y extends throughout the thickness of the side plate 1041A, i.e., from the inner surface S22 (see FIG. 20) to the outer surface S21 (see FIG. 20).

The through-hole 1412M, 1412C, 1412K each have a configuration the same as that of the through-hole 1412Y. Therefore, further description as to the through-hole 1412M, 1412C, 1412K will be omitted.

9.1.3 Developing Guides 1413Y, 1413M, 1413C, 1413K

As illustrated in FIG. 22, the developing guide 1413Y is positioned in the inner surface S22 of the side plate 1041A. The developing guide 1413Y is positioned between the drawer guide 1411Y and the drawer guide 1411M. The developing guide 1413Y is positioned between the drawer guide 1411Y and the developing pressure member 47Y. The developing guide 1413Y extends in the fourth direction.

The developing guide 1413Y is configured to guide the developing cartridge 1006Y when the developing cartridge 1006Y is attached to the drawer 1004. Specifically, a protrusion 1063A (see FIG. 26, described later) of the developing cartridge 1006Y is fitted with the developing guide 1413Y when the developing cartridge 1006Y is attached to the drawer 1004. The developing guide 1413Y is configured to guide the protrusion 1063A during attachment of the developing cartridge 1006Y to the drawer 1004. Hence, the developing guide 1413Y guides the one end portion in the axial direction of the developing roller 1062Y when the developing cartridge 1006Y is attached to the drawer 1004.

The developing guide 1413M is positioned between the drawer guide 1411M and the drawer guide 1411C. The developing guide 1413M is positioned between the drawer guide 1411M and the developing pressure member 47M. The developing guide 1413M is configured to guide the developing cartridge 1006M when the developing cartridge 1006M is attached to the drawer 1004.

The developing guide 1413C is positioned between the drawer guide 1411C and the drawer guide 1411H. The developing guide 1413C is positioned between the drawer guide 1411C and the developing pressure member 47C. The developing guide 1413C is configured to guide the developing cartridge 1006C when the developing cartridge 1006C is attached to the drawer 1004.

The developing guide 1413K is positioned opposite to the drawer guide 1411C with respect to the drawer guide 1411K. The developing guide 1413K is positioned between the drawer guide 1411K and the developing pressure member 47K. The developing guide 1413K is configured to guide the developing cartridge 1006K when the developing cartridge 1006K is attached to the drawer 1004.

The description as to the developing guide 1413Y is applicable to the developing guides 1413M, 1413C, 1413K. Therefore, further description as to the developing guides 1413M, 1413C, 1413K will be omitted.

9.1.4 Holes 1414Y, 1414M, 1414C, 1414K

As described above, the plurality of holes 1414Y correspond to the plurality of holes 1414Y of the first embodiment. As illustrated in FIGS. 20 and 21, the holes 1414Y are positioned in the outer surface S21 of the side plate 1041A. The holes 1414Y are positioned at an edge of the through-hole 1412Y. The holes 1414Y are recessed from the outer surface S21 toward the inner surface S22 in the axial direction. However, a through-hole is also available as the hole 1414Y.

As described above, the plurality of holes 1414M, the plurality of holes 1414C, and the plurality of holes 1414K correspond to the plurality of holes 413M, the plurality of holes 413C, and the plurality of holes 413K of the first embodiment, respectively. The description as to the holes 1414Y is also applied to the holes 1414M, 1414C, 1414K. Therefore, further description as to the holes 1414M, 1414C, 1414K will be omitted.

9.2 Side Plate 1041B

As illustrated in FIG. 20, the side plate 1041B is at the position the same as the side plate 41B of the first embodiment as is apparent from FIG. 6.

As illustrated in FIGS. 20 and 23, the side plate 1041B has a plurality of drawer guides 1415Y, 1415M, 1415C, 1415K (see FIG. 23), the plurality of through-holes 1416Y, 1416M, 1416C, 1416K (see FIG. 23), a plurality of developing guides 1417Y, 1417M, 1417C, 1417K (see FIG. 23), a plurality of holes 1418Y (see FIG. 20), a plurality of holes 1418M, a plurality of holes 1418C, and a plurality of holes 1418K. Incidentally, the holes 1418M, 1418C, 1418K are not illustrated.

The drawer guides 1415Y, 1415M, 1415C, 1415K correspond to the drawer guides 414Y, 414M, 414C, 414K of the first embodiment. The plurality of through-holes 1416Y, 1416M, 1416C, 1416K correspond to the plurality of through-holes 415Y (FIG. 6), 415M, 415C, 415K of the first embodiment. The plurality of holes 1418Y, the plurality of holes 1418M, the plurality of holes 1418C, and the plurality of holes 1418K correspond to the plurality of holes 416Y (FIG. 6), the plurality of holes 416M, the plurality of holes 416C, and the plurality of holes 416K of the first embodiment, respectively.

9.2.1 Drawer Guides 1415Y, 1415M, 1415C, 1415K

The drawer guides 1415Y, 1415M, 1415C, 1415K are arrayed with each other at intervals in the first direction.

The drawer guide 1415Y is configured to guide travel of the drum cartridge 1005Y relative to the drawer 1004 in cooperation with the drawer guide 1411Y. The drawer guide 1415Y is positioned in the inner surface S32 of the side plate 1041B. The drawer guide 1415Y extends in the fourth direction. The drawer guide 1415Y is in the form of a recess. However, the drawer guide 1415Y may be a rib. The sleeve portion 1512B of the drum cartridge 1005Y is fitted with the drawer guide 1415Y when the drum cartridge 1005Y is attached to the drawer 1004.

The drawer guides 1415M, 1415C, 1415K each have a configuration the same as that of the drawer guide 1415Y. Therefore, further description as to the drawer guides 1415M, 1415C, 1415K will be omitted.

9.2.2 Through-Holes 1416Y, 1416M, 1416C, 1416K

As described above the through-holes 1416Y, 1416M, 1416C, 1416K correspond to the through-holes 415Y (FIG. 6), 415M, 415C, 415K of the first embodiment. As illustrated in FIGS. 20 and 23, the through-hole 1416Y is positioned at a deep side of the drawer guide 1415Y in the fourth direction. The through-hole 1416Y has a circular shape. The through-hole 1416Y extends throughout the thickness of the side plate 1041B, i.e., from the inner surface S32 to the outer surface S31 of the side plate 1041B.

The description as to the through-hole 1416Y is also applicable to the through holes 1416M, 1416C, 1416K, and therefore, further description as to the through-holes 1416M, 1416C, 1416K will be omitted.

9.2.3 Developing Guides 1417Y, 1417M, 1417C, 1417K

As illustrated in FIG. 23, the developing guides 1417Y, 1417M, 1417C, 1417K are positioned in the inner surface S32 of the side plate 1041B. The description as to the developing guide 1413Y (see FIG. 22) is applicable to each of the developing guides 1417Y, 1417M, 1417C, 1417K, and therefore, further description as to the developing guides 1417Y, 1417M, 1417C, 1417K will be omitted.

9.2.4 Holes 1418Y, 1418M, 1418C, 1418K

As described above, the holes 1418Y, 1418M, 1418C, 1418K correspond to the holes 416Y (FIG. 6), holes 416M, the holes 416C, and the holes 416K of the first embodiment, respectively. As illustrated in FIG. 20, the hole 1418Y is positioned in the outer surface S31 of the side plate 1041B. Similar to the hole 1414Y (see FIG. 21), the hole 1418Y is positioned on the edge of the through-hole 1416Y. The hole 1418Y is recessed in the axial direction from the outer surface S31 to the inner surface S32. Alternatively, a through-hole may be available as the hole 1418Y.

The description as to the hole 1418Y is applicable to the holes 1418M, 1418C, 1418K, and therefore, further description as to the holes 1418M, 1418C, 1418K will be omitted.

9.3 Positioning Plate 1042A

With reference to FIGS. 20 and 22, the positioning plate 1042A is the same as the positioning plate 42A of the first embodiment. Specifically, as illustrated in FIG. 22, the positioning plate 1042A has the plurality of recessed portions 421Y, 421M, 421C, 421K and the counterpart positioning portion 422 similar to the positioning plate 42A. The counterpart positioning portion 422 is subjected to positioning by the positioning member 1023A provided in the housing 2 when the drawer 1004 is at its inside position. In other words, the positioning member 1023A of the housing 2 fixes a position of the positioning plate 1042A relative to the housing 2 when the drawer 1004 is at the inside position.

9.4 Positioning Plate 1042B

The description as to the positioning plate 42B of the first embodiment and the description as to the positioning plate 1042A are applicable to the positioning plate 1042B with reference to FIGS. 20 and 23. Therefore, further description as to the positioning plate 1042B will be omitted.

9.5 Positioning Shaft 42C

Figure 17:
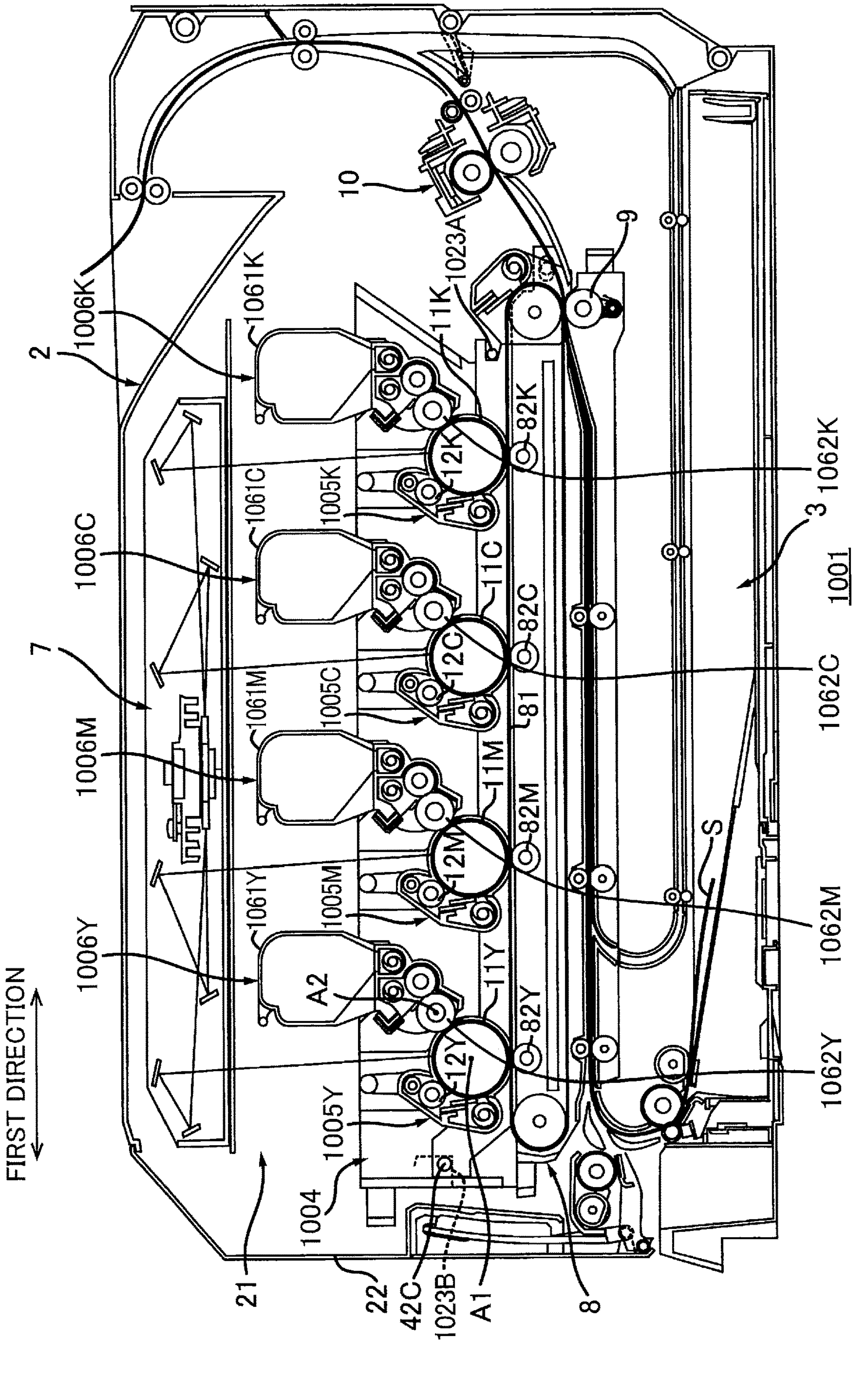
FIG. 17 is a schematic view illustrating a general structure of an image forming apparatus.

As illustrated in FIG. 17, the positioning shaft 42C is positioned at the other end portion in the first direction of the drawer 1004. The positioning shaft 42C extends in the axial direction. In a state where the drawer 1004 is at the inside position, the positioning shaft 42C is fitted with a notch of a positioning member 1023B of the housing 2. Hence, the other end portion in the first direction of the drawer 1004 is subjected to positioning with respect to the housing 2. The positioning shaft 42C has a solid cylindrical shape. The positioning shaft 42C is made from metal such as stainless steel and iron.

According to the second embodiment, the positioning shaft 42C extends throughout the thickness of the other end portion in the first direction of the positioning plate 1042A and the other end portion in the first direction of the side plate 1041A. The positioning shaft 42C may integrally extend from the side plate 1041A of the drawer 1004. The position of the counterpart positioning portion 422 of the positioning plates 1042A, 1042B is different from the position of the positioning shaft 42C in the fourth direction. In other words, corresponding positions of the positioning member 1023A of the housing 2 and the notch of the positioning member 1023B of the housing 2 are different from each other in the fourth direction.

9.6 Locking Members 43Y, 43M, 43C, 43K

Figure 24:
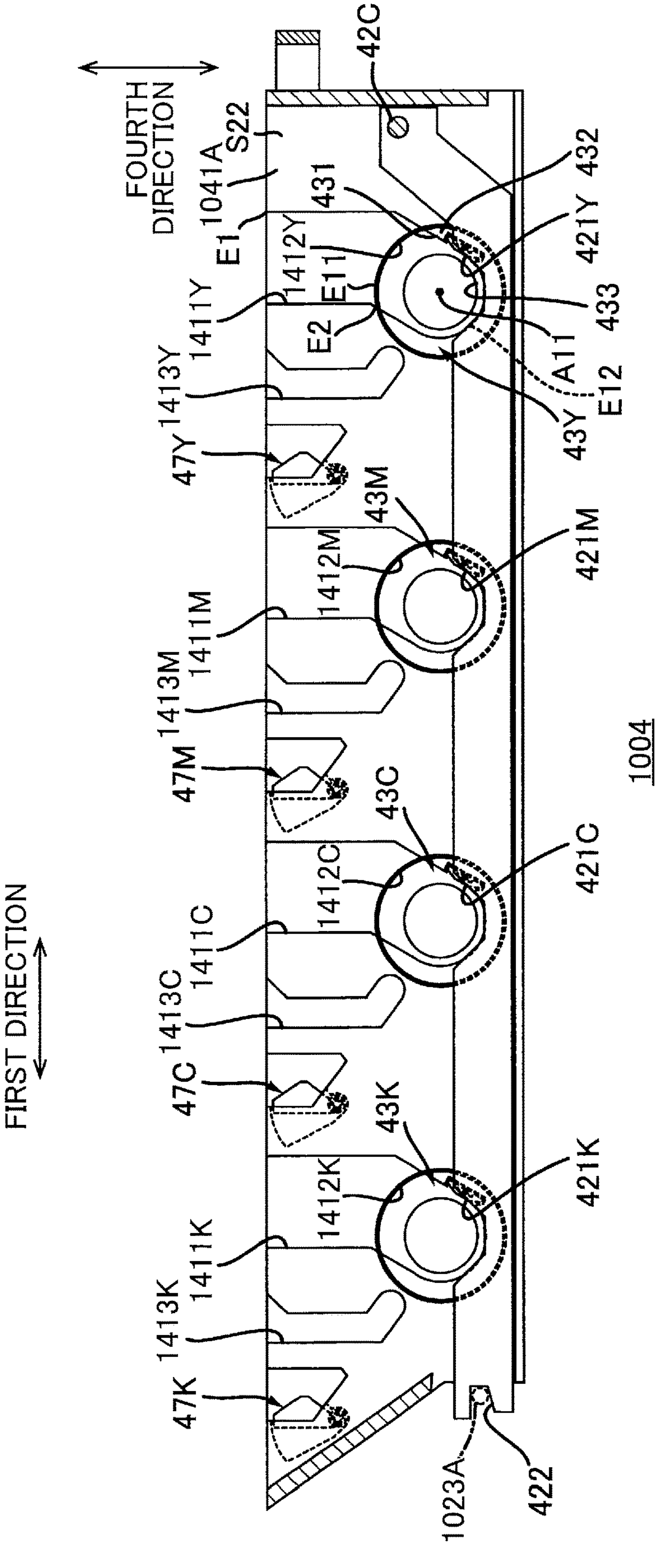
FIG. 24 is a cross-sectional view of the drawer illustrated in FIG. 22, and particularly illustrating a state where a locking member is positioned at an unlocking position.

The locking members 43Y, 43M, 43C, 43K are illustrated in FIG. 21. Locking position of the locking members 43Y, 43M, 43C, 43K is illustrated in FIG. 22. Unlocking position of the locking members 43Y, 43M, 43C, 43K is illustrated in FIG. 24. Details of the locking members 43Y, 43M, 43C, 43K are described in the description of the first embodiment.

9.6.1 Lock Guide 431

The configuration of the lock guide 431 is already described in the description of the first embodiment. According to the second embodiment, the lock guide 431 has a first end portion E11 and a second end portion E12 in an extending direction thereof. The second end portion E12 is positioned apart from the first end portion E11 in the extending direction of the lock guide 431. The sleeve portion 1512A (see FIG. 19A) of the drum cartridge 1005Y is fitted with the lock guide 431 in the attached state of the drum cartridge 1005Y to the drawer 1004. Hence, the one end portion in the axial direction of the photosensitive drum 11Y (see FIG. 20) is fitted with the lock guide 431 in the attached state of the drum cartridge 1005Y to the drawer 1004.

The lock guide 431 extends in the first direction in a state where the locking member 43Y is at its locking position. In other words, the lock guide 431 extends in a direction crossing the extending direction of the drawer guide 1411Y in the state where the locking member 43Y is at its locking position. The lock guide 431 is disconnected from the drawer guide 1411Y in the state where the locking member 43Y is at its locking position. In the state where the locking member 43Y is at its locking position, the first end portion E11 of the lock guide 431 is positioned between the second end portion E12 of the lock guide 431 and the developing pressure member 47Y in the extending direction of the lock guide 431.

Hence, the sleeve portion 1512A cannot be moved past the lock guide 431 in case of displacement of the drum cartridge 1005Y in the fourth direction in a state where the drum cartridge 1005Y is attached to the drawer 1004 and the locking member 43Y is at its locking position. Accordingly, the drum cartridge 1005Y is incapable of being released from the drawer 1004 as long as the locking member 43Y is at its locking position in the attached state of the drum cartridge 1005Y to the drawer 1004.

On the other hand, as illustrated in FIG. 24, the lock guide 431 extends in the extending direction of the drawer guide 1411Y in a state where the locking member 43Y is at the unlocking position. The lock guide 431 is connected to the drawer guide 1411Y in the state where the locking member 43Y is at the unlocking position. Specifically, the first end portion E11 of the lock guide 431 is connected to the drawer guide 1411Y in the state where the locking member 43Y is at its unlocking position.

Hence, the sleeve portion 1512A can be released from the lock guide 431 in case of displacement of the drum cartridge 1005Y in the fourth direction in a state where the drum cartridge 1005Y is attached to the drawer 1004 and the locking member 43Y is at its unlocking position. Accordingly, the drum cartridge 1005Y is capable of being released from the drawer 1004 as long as the locking member 43Y is at its unlocking position in the attached state of the drum cartridge 1005Y to the drawer 1004.

9.6.2 Locking Portion 432

The locking portion 432 is illustrated in FIGS. 20 and 22. Configuration of the locking portion 432 is already described in the description of the first embodiment.

The locking portion 432 extends in the first direction in the state where the locking member 43Y is at its locking position as illustrated in FIG. 22. In other words, the locking portion 432 extends in the direction crossing the extending direction of the drawer guide 1411Y in the state where the locking member 43Y is at its locking position. The locking portion 432 is positioned between the one end portion of the photosensitive drum 11Y and the drawer guide 1411Y in the state where the drum cartridge 1005Y is attached to the drawer 1004 and the locking member 43Y is at its locking position. Accordingly, the sleeve portion 1512A is incapable of being released from the lock guide 431 in case of displacement of the drum cartridge 1005Y in the fourth direction in the state where the drum cartridge 1005Y is attached to the drawer 1004 and the locking member 43Y is at its locking position. As a result, the locking portion 432 locks the photosensitive drum 11Y to the drawer 1004 as long as the locking member 43Y is at its locking position in the attached state of the drum cartridge 1005Y to the drawer 1004.

On the other hand, as illustrated in FIG. 24, the locking portion 432 extends in the extending direction of the drawer guide 1411Y in the state where the locking member 43Y is at the unlocking position. The locking portion 432 is retracted from a position between the one end portion of the photosensitive drum 11Y and the drawer guide 1411Y in the state where the drum cartridge 1005Y is attached to the drawer 1004 and the locking member 43Y is at the unlocking position. Hence, the sleeve portion 1512A can be released from the lock guide 431 in case of displacement of the drum cartridge 1005Y in the fourth direction in the state where the drum cartridge 1005Y is attached to the drawer 1004 and the locking member 43Y is at its unlocking position.

9.6.3 Through-Hole 433

The through-hole 433 is illustrated in FIGS. 20 and 22. The through-hole 433 is already described in the description of the first embodiment.

9.6.4 Pressure Member 434

The pressure member 434 is illustrated in FIGS. 20, 22 and 24. The pressure member 434 is already described in the description of the first embodiment. The pressure member 434 presses against the sleeve portion 1512A of the drum cartridge 1005Y toward the positioning plate 1042A in the state where the drum cartridge 5Y is attached to the drawer 4 and the locking member 43Y is at the locking position. Specifically, the pressure member 434 presses against the one end portion of the photosensitive drum 11Y toward the recessed portion 421Y of the positioning plate 1042A in the state where the drum cartridge 1005Y is attached to the drawer 1004 and the locking member 43Y is at the locking position.

On the other hand, as illustrated in FIG. 24, the pressure member 434 is retracted from a position between the one end portion of the photosensitive drum 11Y and the drawer guide 1411Y in the state where the drum cartridge 1005Y is attached to the drawer 1004 and the locking member 43Y is at the unlocking position. Hence, the pressure applied from the pressure member 434 to the one end portion of the photosensitive drum 11Y is released in the state where the drum cartridge 1005Y is attached to the drawer 1004 and the locking member 43Y is at the unlocking position.

9.6.5 Spring 435

The spring 435 is illustrated in FIGS. 20 and 22. The spring 435 is already described in the description of the first embodiment.

9.7 Levers 44Y, 44M, 44C, 44K

Figure 25:
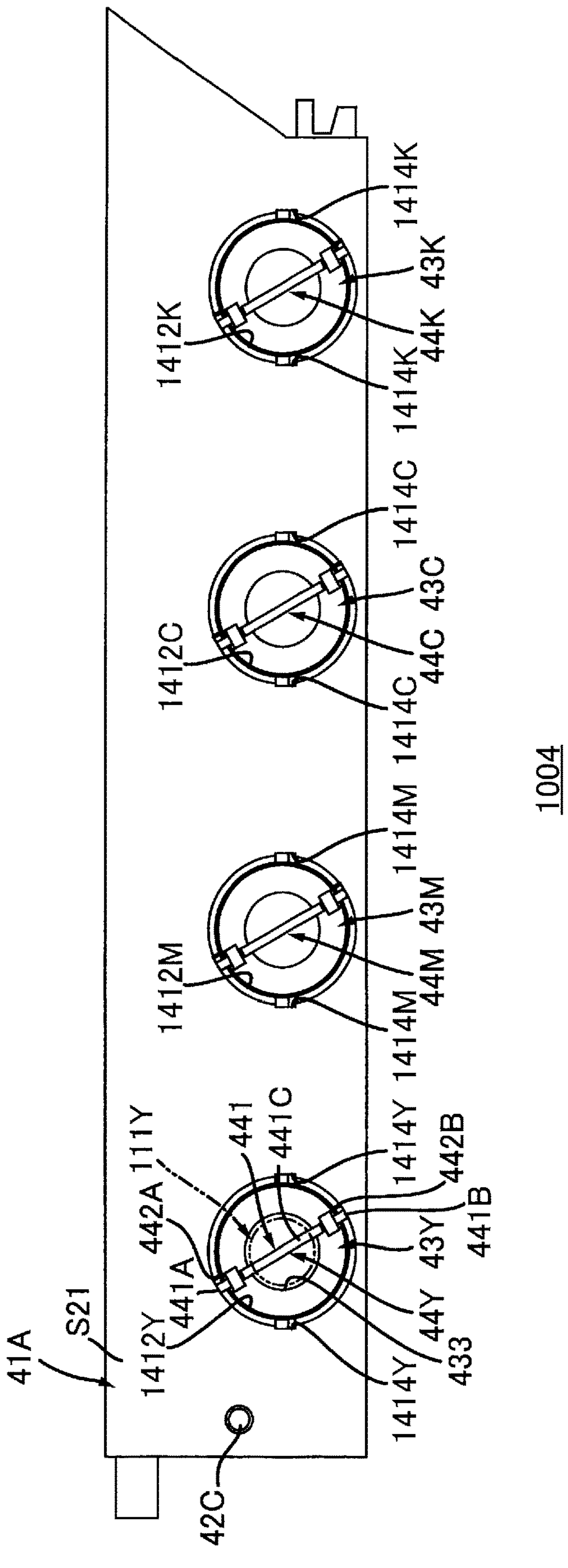
FIG. 25 is a side view of the drawer illustrated in FIG. 21, and particularly illustrating a state where the locking member is positioned at the unlocking position.

The lever levers 44Y, 44M, 44C, 44K are illustrated in FIGS. 20, 21, and 25. The levers 44Y, 44M, 44C, 44K are already described in the description of the first embodiment.

9.7.1 Lever Body 441

The lever body 441 is illustrated in FIGS. 21 and 25. The lever body 441 is already described in the description of the first embodiment.

9.7.2 Protrusions 442A, 442B

The protrusions 442A, 442B are illustrated in FIG. 25. The protrusions 442A, 442B are already described in the description of the first embodiment.

As illustrated in FIG. 20, the protrusion 442A of the lever 44Y is engaged with one of the two holes 1414Y of the side plate 1041A and the protrusion 442B of the lever 44Y is engaged with remaining one of the two holes 1414Y in the state where the locking member 43Y is at the locking position and the lever 44Y is at the first position. Hence, the lever 44Y is locked to the side plate 41A.

The protrusion 442A of the lever 44Y is disengaged from one of the two holes 1411Y of the side plate 1041A and the protrusion 442B of the lever 44Y is disengaged from remaining one of the two holes 1414Y in the state where the locking member 43Y is at the locking position and the lever 44Y is at the second position. Hence, the lever 44Y is unlocked from the side plate 1041A.

9.8 Locking Members 45Y, 45M, 45C, 45K

The locking member 45Y is positioned in the through-hole 1416Y of the side plate 1041B. The description as to the locking member 43Y is applicable to the locking member 45Y. Therefore, further description as to the locking member 45Y will be omitted. Further, the description as to the locking member 43Y is also applicable to the locking members 45M, 45C, 45K. Therefore, further description as to the locking members 45M, 45C, 45K will be omitted.

9.9 Levers 46Y, 46M, 46C, 46K

The lever is illustrated in FIG. 20. The lever 46Y is attached to the outer surface of the locking member 45Y. The description as to the lever 44Y is applicable to the lever 46Y. Therefore, further description as to the lever 46Y will be omitted. Further, the description as to the lever 44Y is also applicable to the levers 46M, 46C, 46K. Therefore, further description as to the levers 46M, 46C, 46K will be omitted.

9.10 Developing Pressure Members 47Y, 47M, 47C, 47K

As illustrated in FIG. 22, the developing pressure member 47Y is attached to the side plate 1041A. The developing pressure member 47Y is positioned between the drawer guide 1411Y and the drawer guide 1411M in the first direction. The developing pressure member 48Y is positioned opposite to the drawer guide 1411Y with respect to the developing guide 1413Y in the first direction. Further, in the attached state of the drum cartridge 1005Y and the developing cartridge 1006Y to the drawer 1004, the developing pressure member 47Y is positioned opposite to the photosensitive drum 11Y with respect to the developing roller 1062Y in a direction from the drum axis A1 (see FIG. 17) to the developing axis A2 (see FIG. 17).

In the attached state of the drum cartridge 1005Y and the developing cartridge 1006Y to the drawer 1004, the developing pressure member 47Y is configured to urge the developing cartridge 1006Y toward the photosensitive drum 11Y. Specifically, in the attached state of the developing cartridge 1006Y to the drawer 1004, the developing pressure member 47Y presses against a protrusion 1064A (see FIG.

26) of the developing cartridge 1006Y toward the photosensitive drum 11Y. The protrusion 1064A will be described later.

The developing pressure member 47M is attached to the side plate 1041A. The developing pressure member 47M is positioned between the drawer guide 1411M and the drawer guide 1411C in the first direction. In the attached state of the drum cartridge 1005M and the developing cartridge 1006M to the drawer 1004, the developing pressure member 47M is configured to urge the developing cartridge 1006M toward the photosensitive drum 11M.

The developing pressure member 47C is attached to the side plate 1041A. The developing pressure member 47C is positioned between the drawer guide 1411C and the drawer guide 1411K in the first direction. In the attached state of the drum cartridge 1005C and the developing cartridge 1006C to the drawer 1004, the developing pressure member 47C is configured to urge the developing cartridge 1006C toward the photosensitive drum 11C.

The developing pressure member 47K is attached to the side plate 1041A. The developing pressure member 47K is positioned opposite to the drawer guide 1411C with respect to the drawer guide 1411K in the first direction. In the attached state of the drum cartridge 1005K and the developing cartridge 1006K to the drawer 1004, the developing pressure member 47K is configured to urge the developing cartridge 1006K toward the photosensitive drum 11K.

The description as to the developing pressure member 47Y is applicable to the developing pressure members 47M, 47C, 47K. Therefore, further description as to the developing pressure members 47M, 47C, 47K will be omitted.

9.11 Developing Pressure Members 48Y, 48M, 48C, 48K

As illustrated in FIG. 23, the developing pressure members 48Y, 48M, 48C, 48K are attached to the side plate 1041B. The description as to the developing pressure member 47Y is applicable to the developing pressure members 48Y, 48M, 48C, 48K. Therefore, further description as to the developing pressure members 48Y, 48M, 48C, 48K will be omitted.

9.12 Developing Pressure Springs 49Y, 49M, 49C, 49K

As illustrated in FIG. 22, the developing pressure spring 49Y is configured to urge the developing pressure member 47Y. In the attached state of the developing cartridge 1006Y to the drawer 1004, the developing pressure spring 49Y urges the developing pressure member 47Y toward the protrusion 1064A (see FIG. 26) of the developing cartridge 1006Y. A torsion spring is one example of the developing pressure spring 49Y. The description as to the developing pressure spring 49Y is applicable to the developing pressure springs 49M, 49C, 49K. Therefore, further description as to the developing pressure springs 49M, 49C, 49K will be omitted.

9.13 Developing Pressure Spring 50Y, 50M, 50C, 50K

As illustrated in FIG. 23, the developing pressure spring 50Y is configured to urge the developing pressure member 48Y. In the attached state of the developing cartridge 1006Y to the drawer 1004, the developing pressure spring 50Y is configured to urge the developing pressure member 48Y toward a protrusion 1064B (see FIG. 26) of the developing cartridge 1006Y. The protrusion 1064B will be described later. A torsion spring is one example of the developing pressure spring 50Y. The description as to the developing pressure spring 50Y is applicable to the developing pressure spring 50M, 50C, 50K. Therefore, further description as to the developing pressure spring 50M, 50C, 50K will be omitted.

10. Details of Developing Cartridge 1006Y

The developing cartridge 1006Y will be described in detail with reference to FIG. 26. Incidentally, the following description as to the developing cartridge 1006Y is applicable to the developing cartridges 1006M, 1006C, 1006K. Therefore, further description as to the developing cartridges 1006M, 1006C, 1006K will be omitted. Further, the "axial direction" described below as to the developing cartridge 1006Y is defined in the attached state of the developing cartridge 1006Y to the drum cartridge 1005Y.

The developing cartridge 1006Y includes the protrusion 1063A, a protrusion 1063B, the protrusion 1064A, the protrusion 1064B, and a second handle 1065 in addition to the above-described developing casing 1061Y and the developing roller 1062Y.

10.1 Protrusions 1063A, 1063B

The protrusion 1063A extends from one side surface S61 in the axial direction of the developing casing 1061Y. The protrusion 1063A is integral with the developing casing 1061Y. Alternatively, the protrusion 1063A may be attached to the side surface S61. The protrusion 1063A extends in the axial direction. The protrusion 1063A has a hollow cylindrical shape. The protrusion 1063A receives one end portion of the shaft of the developing roller 1062Y.

The protrusion 1063B extends from another side surface S62 in the axial direction of the developing casing 1061Y. The protrusion 1063B is positioned opposite to the protrusion 1063A with respect to the developing casing 1061Y in the axial direction. The protrusion 1063B is integral with the developing casing 1061Y, or may be attached to the side surface S62. The protrusion 1063B extends in the axial direction. The protrusion 1063B has a hollow cylindrical shape. The protrusion 1063B receives another end portion of the shaft of the developing roller 1062Y.

10.2 Protrusions 1064A, 1064B

The protrusion 1064A extends from the one side surface S61 in the axial direction of the developing casing 1061Y. The protrusion 1064A is integral with the developing casing 1061Y. Alternatively, the protrusion 1064A may be attached to the side surface S61. The protrusion 1064A is positioned apart from the protrusion 1063A in the fourth direction. In the attached state of the drum cartridge 1005Y and the developing cartridge 1006Y to the drawer 1004, the protrusion 1064A is positioned opposite to the photosensitive drum 11Y with respect to the protrusion 1063A in the direction from the drum axis A1 to the developing axis A2. In the attached state of the developing cartridge 1006Y to the drawer 1004, the protrusion 1064A is urged toward the photosensitive drum 11Y by the developing pressure member 47Y (see FIG. 22). The protrusion 1064A extends in the axial direction. The protrusion 1064A has a hollow cylindrical shape.

The protrusion 1064B extends from the other side surface S62 in the axial direction of the developing casing 1061Y. The protrusion 1064B is integral with the developing casing 1061Y. Alternatively, the protrusion 1064B may be attached to the side surface S62. The protrusion 1064B is positioned apart from the protrusion 1063B in the fourth direction. In the attached state of the drum cartridge 1005Y and the developing cartridge 1006Y to the drawer 1004, the protrusion 1064B is positioned opposite to the photosensitive drum 11Y with respect to the protrusion 1063B in the direction from the drum axis A1 to the developing axis A2. In the attached state of the developing cartridge 1006Y to the drawer 1004, the protrusion 1064B is urged toward the photosensitive drum 11Y by the developing pressure member 48Y (see FIG. 23). The protrusion 1064B extends in the axial direction. The protrusion 1064B has a hollow cylindrical shape.

10.3 Second Handle 1065

Figure 26:
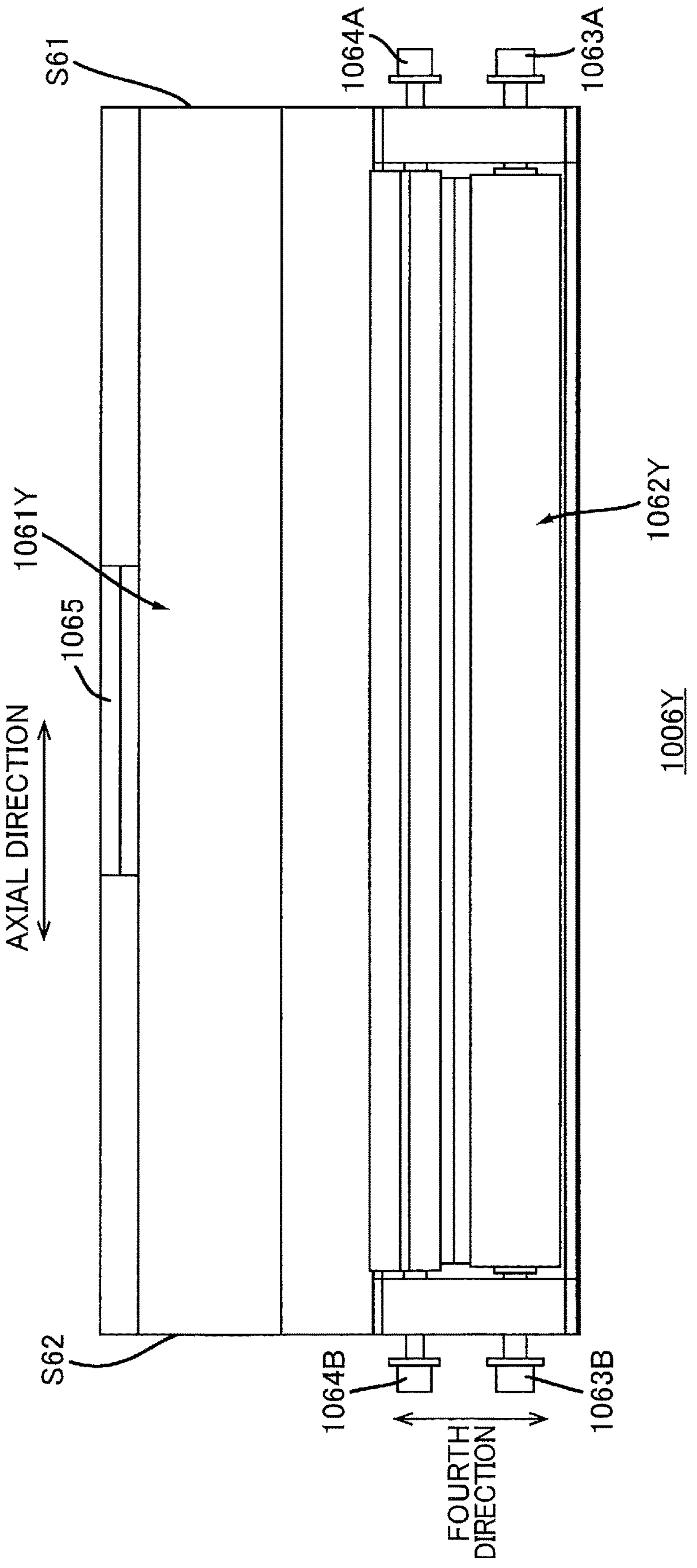
FIG. 26 is a front view of a developing cartridge provided in the image forming apparatus illustrated in FIG. 17.

As illustrated in FIGS. 18 and 26, the second handle 1065 is positioned at an upper end of the developing casing 1061Y in the attached state of the developing cartridge 1006Y to the drawer 1004. The second handle 1065 is integral with the developing casing 1061Y. Alternatively, the second handle 1065 may be attached to the developing casing 1061Y.

As illustrated in FIG. 18, the second handle 1065 protrudes out of the drawer 1004 in the attached state of the developing cartridge 1006Y to the drawer 1004. In other words, the second handle 1065 is positioned above the upper end of the drawer 1004 in the attached state of the developing cartridge 1006Y to the drawer 1004. More specifically, in the attached state of the drum cartridge 1005Y and the developing cartridge 1006Y to the drawer 1004, the second handle 1065 is positioned above the first handle 1052 of the drum cartridge 1005Y. The second handle 1065 is configured to be grasped by the user for detaching the developing cartridge 1006Y from the drawer 1004 in the attached state of the developing cartridge 1006Y to the drawer 1004.

11. Work for Exchanging Developing Cartridge 1006Y.

Next, the work for exchanging the developing cartridge 1006Y for a new developing cartridge 1006Y will be described with reference to FIGS. 17 through 23 and 26. As illustrated in FIGS. 17 and 18, firstly, the user moves the drawer 1004 from the inside position (see FIG. 17) to the outside position (see FIG. 18) for exchanging the developing cartridge 1006Y for a new developing cartridge 1006Y.

As illustrated in FIGS. 21 and 22, the locking member 43Y is at the locking position and the lever 44Y is at the first position in the state where the drawer 4 is at the outside position. Further, as illustrated in FIGS. 20 and 23, the locking member 45Y is at the locking position and the lever 46Y is at the first position.

The locking member 43Y is locked at the locking position because of the first position of the lever 44Y. Further, the locking member 45Y is locked at the locking position because of the first position of the lever 46Y. The photosensitive drum 11Y is locked to the drawer 1004 because of the locking positions of the locking members 43Y and 45Y.

Then, the user grasps the second handle 1065 to pull the developing cartridge 1006Y in the fourth direction from the drawer 1004 as illustrated in FIG. 18. Hence, the developing cartridge 1006Y is released from the drawer 1004. At this time, displacement of the photosensitive drum 11Y relative to the drawer 1004 can be suppressed, since the photosensitive drum 11Y is locked to the drawer 1004.

Next, in order to attach the developing cartridge 1006Y to the drum cartridge 1005Y attached to the drawer 1004 that is at the outside position, the user firstly engages the protrusions 1063A and 1063B (see FIG. 26) with the developing guide 1413Y (see FIG. 22) and the developing guide 1417Y (see FIG. 23), respectively. With such engagements, the developing cartridge 1006Y is guided by the developing guides 1413Y, 1417Y and is attached to the drawer 1004.

Next, the user moves the drawer 1004 from the outside position (see FIG. 18) to the inside position (see FIG. 17). As such, exchange of the developing cartridge 1006Y for the new developing cartridge 1006Y is completed.

12. Work for Exchanging Drum Cartridge 1005Y

Next, work for exchanging the drum cartridge 1005Y for a new drum cartridge 1005Y will be described with reference to FIGS. 17 through 24. Incidentally, the exchange of the drum cartridge 1005Y may be performed with the attached state of the developing cartridge 1006Y to the drum cartridge 1005Y, or with the detached state of the developing cartridge 1006Y from the drum cartridge 1005Y.

As illustrated in FIGS. 17 and 18, firstly, the user moves the drawer 1004 from the inside position (see FIG. 17) to the outside position (see FIG. 18) for exchanging the drum cartridge 1005Y for a new drum cartridge 1005Y.

As illustrated in FIGS. 21 and 22, the locking member 43Y is at the locking position and the lever 44Y is at the first position in the state where the drawer 1004 is at the outside position. Further, the locking member 45Y is at the locking position and the lever 46Y is at the first position as illustrated in FIGS. 20 and 23.

The locking member 43Y is locked at the locking position because of the first position of the lever 44Y. Further, the locking member 45Y is locked at the locking position because of the first position of the lever 46Y. The photosensitive drum 11Y is locked to the drawer 1004 because of the locking positions of the locking members 43Y and 45Y.

Then, the user pivotally moves the lever 44Y from the first position to the second position. The locking member 43Y is unlocked from the side plate 1041A in accordance with the movement of the lever 44Y to the second position. Further, the user pivotally moves the lever 46Y from the first position to the second position. The locking member 45Y is unlocked from the side plate 1041B in accordance with the movement of the lever 46Y to the second position.

Then, as illustrated in FIGS. 22 and 24, the user rotates the locking member 43Y from the locking position to the unlocking position. Further, the user rotates the locking member 45Y (see FIG. 23) from the locking position to the unlocking position. As a result, the photosensitive drum 11Y is unlocked from the drawer 1004 in the state where the locking members 43Y and 45Y are positioned at the unlocking position.

Then, the user grasps the first handle 1052 and pulls the first handle 1052 to detach the drum cartridge 1005Y out of the drawer 1004. As a result, the sleeve portion 1512A (see FIG. 20) of the drum cartridge 1005Y is disengaged from the lock guide 431 (see FIGS. 20 and 24) of the locking member 43Y, and the sleeve portion 1512B (see FIG. 20) of the drum cartridge 5Y is disengaged from the lock guide 451 (see FIG. 20) of the locking member 45Y. Thus, the drum cartridge 1005Y is released from the drawer 1004.

Then, in order to attach the drum cartridge 1005Y to the drawer 1004 in the state where the drawer 1004 is at the outside position, the user firstly engages the sleeve portions 1512A, 1512B with the drawer guides 1411Y and 1415Y of the drawer 1004, respectively, as illustrated in FIG. 20. Hence, the drum cartridge 1005Y is guided by the drawer guides 1411Y and 1415Y and is attached to the drawer 1004.

After attachment of the drum cartridge 1005Y to the drawer 1004, the sleeve portion 1512A of the drum cartridge 1005Y is fitted with the lock guide 431 of the locking member 43Y and the sleeve portion 1512B of the drum cartridge 1005Y is fitted with the lock guide 451 of the locking member 45Y.

Next, as illustrated in FIGS. 21 and 25, the user grasps the lever 44Y positioned at the second position, and rotates the locking member 43Y from the unlocking position to the locking position. Further, the user grasps the lever 46Y (see FIG. 20) positioned at the second position, and rotates the locking member 45Y (see FIG. 20) from the unlocking position to the locking position.

As a result, as illustrated in FIGS. 22 and 23, the photosensitive drum 11Y is locked to the drawer 1004 with the state where the locking member 43Y is at the locking position, and the locking member 45Y is at the locking position.

Then, the user moves the lever 44Y from the second position to the first position. Further, the user moves the lever 46Y from the second position to the first position. Then, the user moves the drawer 4 from the outside position to the inside position. As such, work for exchange of the drum cartridge 1005Y for the new drum cartridge 1005Y is completed.

13. Functions and Advantages (1) In the image forming apparatus 1 according to the first embodiment, in case of exchange of the toner cartridge 6Y for the new toner cartridge 6Y with the state where the drum cartridge 5Y is attached to the drawer 4, as illustrated in FIG. 2, the exchanging work of the toner cartridge 6Y relative to the drum cartridge 5Y can be performed with the state where the photosensitive drum 11Y is locked to the drawer 4 by the locking member 43Y as illustrated in FIG. 9. Therefore, displacement of the photosensitive drum 11Y relative to the drawer 4 can be suppressed during exchanging work of the toner cartridge 6Y. As a result, lowering positioning accuracy of the photosensitive drum 11Y relative to the housing 2 can be suppressed.

(2) In the image forming apparatus 1001 according to the second embodiment, in case of exchange of the developing cartridge 1006Y for the new developing cartridge 1006Y with the state where the drum cartridge 1005Y is attached to the drawer 1004, as illustrated in FIG. 18, the exchanging work of the developing cartridge 1006Y relative to the drawer 1004 can be performed with the state where the photosensitive drum 11Y is locked to the drawer 1004 by the locking member 43Y. Therefore, displacement of the photosensitive drum 11Y relative to the drawer 1004 can be suppressed during exchanging work of the developing cartridge 1006Y. As a result, lowering positioning accuracy of the photosensitive drum 11Y relative to the housing 2 can be suppressed similar to the first embodiment.

(3) In the image forming apparatus according to the first and second embodiments, as illustrated in FIGS. 9, 10, 22, and 24, the locking member 43Y is rotatable about the first axis A11 extending in the axial direction between the locking position (see FIGS. 9 and 22) and the unlocking position (see FIGS. 10 and 24). Therefore, the locking member 43Y does not need to be moved in the axial direction for moving the locking member 43Y between the locking position and the unlocking position. As a result, a space saving in the axial direction is attainable.

(4) In the image forming apparatus according to the first and second embodiments, as illustrated in FIGS. 9, 10, 22, and 24, the locking member 43Y is rotatable about the drum axis A1 between the locking position (see FIGS. 10 and 22) and the unlocking position (see FIGS. 10 and 24). Therefore, movable range of the locking member 43Y relative to the photosensitive drum 11Y can be reduced. As a result, an increase in size of the drawer 4, 1004 due to the provision of the locking member 43Y can be suppressed.

(5) In the image forming apparatus according to the first and second embodiments, as illustrated in FIGS. 10 and 24, the extending direction of the lock guide 431 is coincident with the extending direction of the drawer guide 411Y, 1411Y and the lock guide 431 is connected to the drawer guide 411Y, 1411Y in the state where the locking member 43Y is at the unlocking position. Therefore, in case of attachment of the drum cartridge 5Y, 1005Y to the drawer 4, 1004 with the state where the locking member 43Y is at the unlocking position, the one end portion in the axial direction of the photosensitive drum 11Y can be guided not only by the drawer guide 411Y, 1411Y but also by the lock guide 431, so that the one end portion can be smoothly fitted with the locking member 43Y.

Further, as illustrated in FIGS. 9 and 22, the lock guide 431 extends in the direction crossing the extending direction of the drawer guide 411Y, 1411Y in the state where the locking member 43Y is at the locking position. Therefore, the one end portion in the axial direction of the photosensitive drum 11Y can be locked to the drawer 4, 1004 with the state where the drum cartridge 5Y, 1005Y is attached to the drawer 4, 1004 and the locking member 43Y is at the locking position.

(6) In the image forming apparatus according to the first and second embodiments, as illustrated in FIGS. 9 and 22, in the state where the drum cartridge 5Y, 1005Y is attached to the drawer 4, 1004 and the locking member 43Y is at the locking position, the locking portion 432 is positioned between the one end portion of the photosensitive drum 11Y and the drawer guide 411Y, 1411Y. With this structure, the one end portion in the axial direction of the photosensitive drum 11Y can be locked to the drawer 4, 1004 by the locking portion 432 in the state where the drum cartridge 5Y, 1005Y is attached to the drawer 4, 1004 and the locking member 43Y is at the locking position.

(7) In the image forming apparatus according to the first and second embodiments, as illustrated in FIGS. 9 and 22, the locking member 43Y includes the pressure member 434. The pressure member 434 presses against the one end portion of the photosensitive drum 11Y toward the positioning plate 42A, 1042A in the attached state of the drum cartridge 5Y, 1005Y to the drawer 4, 1004. Hence, the one end portion of the photosensitive drum 11Y can be pressed toward the positioning plate 42A, 1042A by making use of the locking member 43Y.

(8) In the image forming apparatus according to the first and second embodiments, as illustrated in FIGS. 6 and 20, the lever 44Y is positioned outward of the outer surface S21 of the side plate 41A, 1041A. Hence, the lever 44Y is easily accessible to the user, i.e., the user can operate the locking member 43Y at the outside of the side plate 41A, 1041A, and as a result, the user can smoothly move the locking member 43Y.

(9) In the image forming apparatus according to the first and second embodiments, as illustrated in FIGS. 6, 7, 20 and 21, the lever 44Y is locked to the side plate 41A, 1041A in the state where the locking member 43Y is at the locking position and the lever 44Y is at the first position. Therefore, the locking member 43Y can be locked at the locking position by making use of the lever 44Y.

(10) In the image forming apparatus according to the first and second embodiments, as indicated by the imaginary line illustrated in FIGS. 6 and 20, the lever 44Y abuts on the abutment portion of the housing 2 in case of movement of the drawer 4, 1004 from the outside position toward the inside position with the state where the lever 44Y is at the second position. This abutment can suppress the drawer 4, 1004 from further moving toward the inside position with the state that the lever 44Y is at the second position. As a result, this abutment prompts the user to move the locking member 43Y to the locking position and to move the lever 44Y to the first position in case of moving the drawer 4, 1004 from the outside position toward the inside position.

(11) In the image forming apparatus according to the first and second embodiments, as illustrated in FIGS. 11 and 25, the lever 44Y covers at least the part of the coupling 111Y in the axial direction of the photosensitive drum 11Y in the state where the drum cartridge 5Y, 1005Y is attached to the drawer 4, 1004 and the lever 44Y is at the second position. Therefore, the lever 44Y protruding from the side plate 41A, 1041A can restrain the main coupling from fitting with the coupling 111Y in case where the drawer 4, 1004 is positioned at the inside position with the state where the lever 44Y is at the second position. As a result, start of the image forming operation with the state where the photosensitive drum 11Y is unlocked from the drawer 4, 1004 can be suppressed.

(12) In the image forming apparatus according to the second embodiment, as illustrated in FIG. 22, the first end portion E11 of the lock guide 431 is positioned between the second end portion E12 of the lock guide and the developing pressure member 47Y in the extending direction of the lock guide 431 in the state where the locking member 43Y is at the locking position.

Hence, the force transmitted from the developing pressure member 47Y to the drum cartridge 1005Y through the developing cartridge 1006Y is directed in the direction from the first end portion E11 to the other end portion E12 of the lock guide 431. This can restrain the one end portion of the photosensitive drum 11Y from being inadvertently released from the lock guide 431 due to the force applied from the developing pressure member 47Y.

(13) In the image forming apparatus according to the second embodiment, as illustrated in FIG. 18, the first handle 1052 of the drum cartridge 1005Y is accommodated in the internal space of the drawer 1004 in the attached state of the drum cartridge 1005Y to the drawer 1004. On the other hand, the second handle 1065 of the developing cartridge 1006Y protrudes out of the drawer 1004 in the attached state of the developing cartridge 1006Y to the drawer 1004.

Hence, in a case where the user is about to exchange the developing cartridge 1006Y for the new developing cartridge 1006Y in the state where the drum cartridge 1005Y and the developing cartridge 1006Y are attached to the drawer 1004, the second handle 1065 of the developing cartridge 1006Y is more accessible to the user than the first handle 1052 is to the user. As a result, unwanted detachment of the drum cartridge 1005Y can be suppressed when the user is about to exchange the developing cartridge 1006Y in the state where both the drum cartridge 1005Y and the developing cartridge 1006Y are attached to the drawer 1004.

14. Modifications

The drum cartridges 5Y, 5M, 5C, 1005Y, 1005M, 1005C may not be provided in the image forming apparatus 1 and 1001, so that the image forming apparatus functions as a monochromatic printer. Further, the locking member 43Y may be a linearly movable component instead of the rotationally movable component.

While the description has been made in detail with reference to the specific embodiments, it would be apparent to those skilled in the art that various changes and modifications may be made therein without departing from the scope of the disclosure.

What is claimed is:

1. An image forming apparatus comprising:
a housing;
a drum cartridge as a first cartridge comprising a photosensitive drum;
a second cartridge in which toner is accommodatable; and
a drawer movable between an inside position where the drawer in its entirety is positioned inside the housing and an outside position where at least a part of the drawer is positioned outside the housing, the drum cartridge being attachable to and detachable from the drawer, the drawer comprising:
a side plate configured to receive the photosensitive drum; and
a locking surface supported by the side plate and movable relative to the side plate, the locking surface being movable between a locking position where the locking surface locks the photosensitive drum to the side plate and an unlocking position where the locking surface unlocks the photosensitive drum from the side plate in an attached state of the drum cartridge to the drawer.

2. The image forming apparatus according to claim 1,
wherein the photosensitive drum is rotatable about a drum axis extending in an axial direction, and
wherein the locking surface is rotatable about a first axis extending in the axial direction between the locking position and the unlocking position.

3. The image forming apparatus according to claim 1,
wherein the photosensitive drum is rotatable about a drum axis extending in an axial direction, and
wherein the locking surface is rotatable about the drum axis between the locking position and the unlocking position.

4. The image forming apparatus according to claim 1,
wherein the photosensitive drum is rotatable about a drum axis extending in an axial direction, and
wherein the drawer further includes a locking member having a disc shape and including the locking surface, the locking member having a lock guide configured to guide one end portion in the axial direction of the photosensitive drum in the attached state of the drum cartridge to the drawer, the locking member having a through-hole having a circular shape and positioned at a radially center portion of the locking member and within the lock guide.

5. The image forming apparatus according to claim 1,
wherein the photosensitive drum is rotatable about a drum axis extending in an axial direction,
wherein the drawer further comprises a drawer guide configured to guide one end portion in the axial direction of the photosensitive drum when the drum cartridge is attached to the drawer,
wherein the drawer further includes a lock guide with which the one end portion of the photosensitive drum is fitted in the attached state of the drum cartridge to the drawer, the lock guide including the locking surface, and
wherein the lock guide extends in a direction crossing an extending direction of the drawer guide in the state where the locking surface is at the locking position, and the lock guide extends in the extending direction of the drawer guide and is communicated with the drawer guide in the state where the locking surface is at the unlocking position.

6. The image forming apparatus according to claim 1,
wherein the photosensitive drum is rotatable about a drum axis extending in an axial direction,
wherein the drawer further comprises a drawer guide configured to guide one end portion in the axial direction of the photosensitive drum when the drum cartridge is attached to the drawer,
wherein the drawer further includes a locking wall, the locking wall having the locking surface, the locking wall being configured such that in the attached state of the drum cartridge to the drawer, the locking wall extends parallel with the axial direction of the photosensitive drum and selectively locks the photosensitive drum to the side plate of the drawer, wherein the locking wall is configured to be positioned between the one end portion in the axial direction of the photosensitive drum and the drawer guide in a state where the drum cartridge is attached to the drawer and the locking surface is at the locking position, and wherein the locking wall is configured to be retracted from the position between the one end portion in the axial direction of the photosensitive drum and the drawer guide in a state where the drum cartridge is attached to the drawer and the locking surface is at the unlocking position.

7. The image forming apparatus according to claim 6, wherein the drawer further comprises a positioning plate configured to be in contact with the one end portion in the axial direction of the photosensitive drum to fix a position of the photosensitive drum in the attached state of the drum cartridge to the drawer, and wherein the drawer further comprises a pressure plate configured to press the one end portion in the axial direction of the photosensitive drum toward the positioning plate in the attached state of the drum cartridge to the drawer.

8. The image forming apparatus according to claim 7, wherein the drawer further comprises a spring configured to urge the pressure plate toward the one end portion in the axial direction of the photosensitive drum in the attached state of the drum cartridge to the drawer.

9. The image forming apparatus according to claim 7, wherein the positioning plate has a recessed portion configured to fit with the one end portion in the axial direction of the photosensitive drum in the attached state of the drum cartridge to the drawer, and wherein the pressure plate is configured to press the one end portion in the axial direction of the photosensitive drum toward the recessed portion in the attached state of the drum cartridge to the drawer.

10. The image forming apparatus according to claim 7, wherein the housing comprises a positioning member configured to fix a position of the positioning plate in a state where the drawer is at the inside position, and wherein the positioning plate further has a counterpart positioning portion configured to be in contact with the positioning member in the state where the drawer is at the inside position.

11. The image forming apparatus according to claim 10, wherein the positioning member has a solid cylindrical shape, and wherein the counterpart positioning portion is in a form of a notch with which the positioning member is fitted in the state where the drawer is at the inside position.

12. The image forming apparatus according to claim 6, wherein the drawer further comprises a positioning plate configured to be in contact with the one end portion in the axial direction of the photosensitive drum to fix a position of the photosensitive drum in the attached state of the drum cartridge to the drawer, and wherein the drawer further comprises a spring configured to urge the one end portion in the axial direction of the photosensitive drum toward the positioning plate in the attached state of the drum cartridge to the drawer.

13. The image forming apparatus according to claim 1, wherein the drawer further comprises a lever configured to move the locking surface between the locking position and the unlocking position, the lever being movable along with the locking surface.

14. The image forming apparatus according to claim 13, wherein the side plate of the drawer has:

an inner surface facing the drum cartridge in the attached state of the drum cartridge to the drawer;

an outer surface positioned opposite to the drum cartridge with respect to the inner surface in the attached state of the drum cartridge to the drawer; and a through-hole extending from the inner surface to the outer surface, wherein the drawer further comprises a locking wall extending in a direction parallel with a direction defined from the inner surface to the outer surface, the locking wall including the locking surface, wherein the locking wall is positioned within the through-hole of the side plate, and wherein the lever is positioned outward of the outer surface.

15. The image forming apparatus according to claim 14, wherein the lever is movable between a first position where the lever extends along the outer surface and a second position protruding outward from the outer surface with the state where the locking surface is at the locking position, wherein the lever is configured to be locked to the side plate in a state where the locking surface is at the locking position and the lever is at the first position, and wherein the lever is configured to be unlocked from the side plate in a state where the locking surface is at the locking position and the lever is at the second position.

16. The image forming apparatus according to claim 15, wherein the lever comprises a protrusion, wherein the side plate has a hole, wherein the protrusion of the lever is configured to be engaged with the hole to lock the lever to the side plate in the state where the locking surface is at the locking position and the lever is at the first position, and wherein the protrusion of the lever is configured to be disengaged from the hole to unlock the lever from the side plate in the state where the locking surface is at the locking position and the lever is at the second position.

17. The image forming apparatus according to claim 15, wherein the housing comprises an abutment portion configured to be abutted by the lever when the drawer moves from the outside position toward the inside position in the state where the lever is at the second position.

18. The image forming apparatus according to claim 15, wherein the photosensitive drum is rotatable about a drum axis extending in an axial direction and the photosensitive drum comprises a coupling positioned at the one end portion in the axial direction of the photosensitive drum, wherein the locking wall has a through-hole permitting the coupling to be exposed to an outside in the attached state of the drum cartridge to the drawer, and wherein the lever is configured to cover at least a part of the coupling in the axial direction in the state where the drum cartridge is attached to the drawer and the lever is at the second position.

19. The image forming apparatus according to claim 18, wherein the lever extends in a diametrical direction of the photosensitive drum in the state where the drum cartridge is attached to the drawer and the lever is at the second position, the lever having a first end portion and a second end portion positioned opposite to the first end portion with respect to the through-hole of the locking member in an extending direction of the lever.

20. The image forming apparatus according to claim 1, wherein the second cartridge is a toner cartridge attachable to and detachable from the drum cartridge.

21. The image forming apparatus according to claim 20, wherein the photosensitive drum is rotatable about a drum axis extending in an axial direction, and wherein the toner cartridge is pivotally movable about a second axis extending in the axial direction of the photosensitive drum between a cartridge first position at which the toner cartridge is locked to the drum cartridge and a cartridge second position at which the toner cartridge is unlocked from the drum cartridge in the attached state of the toner cartridge to the drum cartridge.

22. The image forming apparatus according to claim 1, wherein the second cartridge is a developing cartridge comprising a developing roller.

23. The image forming apparatus according to claim 22, wherein the drawer further comprises a developing guide configured to guide the developing cartridge when the developing cartridge is attached to the drawer.

24. The image forming apparatus according to claim 22, wherein the drawer further comprises a developing pressure surface configured to press the developing cartridge toward the photosensitive drum in a state where the drum cartridge and the developing cartridge are attached to the drawer.

25. The image forming apparatus according to claim 24, wherein the drawer further comprises a developing pressure spring configured to urge the developing pressure surface toward the developing cartridge in a state where the developing cartridge is attached to the drawer.

26. The image forming apparatus according to claim 24, wherein the photosensitive drum is rotatable about a drum axis extending in an axial direction, wherein the drawer further comprises a drawer guide configured to guide one end portion in the axial direction of the photosensitive drum when the drum cartridge is attached to the drawer, and wherein the drawer further comprises a lock guide with which the one end portion of the photosensitive drum is fitted in the attached state of the drum cartridge to the drawer, the lock guide having the lock surface, the lock guide having:

a first end portion connected to the drawer guide in a state where the lock member is at the unlocking position; and a second end portion positioned apart from the first end portion in an extending direction of the lock guide, the first end portion being positioned between the second end portion and the developing pressure surface in the extending direction of the lock guide in a state where the locking surface is at the locking position.

27. The image forming apparatus according to claim 22, wherein the drum cartridge comprises a first handle configured to be accommodated within the drawer in a state where the drum cartridge is attached to the drawer, and wherein the developing cartridge comprises a second handle configured to protrude out of the drawer in a state where the developing cartridge is attached to the drawer.

28. The image forming apparatus according to claim 1, wherein the second cartridge is a developing cartridge comprising a developing roller, and wherein the drawer further comprises a pressure spring provided at the side plate, and configured to press the developing cartridge toward the photosensitive drum in a state where the drum cartridge and the developing cartridge are attached to the drawer.

29. The image forming apparatus according to claim 28, wherein the drawer further comprises a drawer guide configured to guide the one end portion in the axial direction of the photosensitive drum when the drum cartridge is attached to the drawer, and wherein the drawer further comprises a lock guide with which the one end portion of the photosensitive drum is fitted in the attached state of the drum cartridge to the drawer, the lock guide having the locking surface, the lock guide having:

a first end portion connected to the drawer guide in a state where the locking surface is at the unlock position; and a second end portion positioned apart from the first end portion in an extending direction of the lock guide, the first end portion being positioned between the second end portion and the developing pressure spring in the extending direction of the lock guide in a state where the locking surface is at the locking position.

* * * * *